United States Patent [19]

Yong et al.

[11] Patent Number: 5,749,079

[45] Date of Patent: *May 5, 1998

[54] END USER QUERY FACILITY INCLUDING A QUERY CONNECTIVITY DRIVER

[75] Inventors: Dennis Yong; Viktor Choong-Hung Cheng; Christopher Leng-Hong Yo; Liat Lim, all of Singapore, Singapore

[73] Assignee: Singapore Computer Systems Limited, Singapore

[*] Notice: The term of this patent shall not extend beyond the expiration date of Pat. No. 5,701,466.

[21] Appl. No.: 378,744

[22] Filed: Jan. 26, 1995

Related U.S. Application Data

[63] Continuation-in-part of Ser. No. 346,507, Nov. 29, 1994, Pat. No. 5,701,466, which is a continuation-in-part of Ser. No. 154,343, Nov. 17, 1993, abandoned, which is a continuation-in-part of Ser. No. 846,522, Mar. 4, 1992, Pat. No. 5,325,465.

[51] Int. Cl.[6] .................................................. G06F 17/30
[52] U.S. Cl. ........................... 707/100; 395/700; 707/3
[58] Field of Search ............................. 395/600, 50, 54, 395/52, 63, 77, 51

[56] References Cited

U.S. PATENT DOCUMENTS

| | | | |
|---|---|---|---|
| 4,631,664 | 12/1986 | Bachman | 364/200 |
| 4,815,005 | 3/1989 | Oyanagi | 395/63 |
| 4,982,340 | 1/1991 | Oyanagi | 395/63 |
| 5,043,929 | 8/1991 | Kramer | 364/578 |
| 5,072,406 | 12/1991 | Ammon | 395/64 |
| 5,123,103 | 6/1992 | Ohtaki et al. | 395/600 |
| 5,193,185 | 3/1993 | Lanter | 395/600 |
| 5,224,206 | 6/1993 | Simoudis | 395/77 |
| 5,283,856 | 2/1994 | Gross et al. | 395/51 |
| 5,325,465 | 6/1994 | Hung et al. | 395/63 |
| 5,386,571 | 1/1995 | Kurz | 395/700 |

FOREIGN PATENT DOCUMENTS

| | | | |
|---|---|---|---|
| 0 589 070 A1 | 3/1994 | European Pat. Off. | G06F 15/40 |

OTHER PUBLICATIONS

Higa et al. "Object–Oriented Methodology for Knowledge base/Database coupling"; communications of the ACM, V35, n6, p99(15); Jun. 1992.

Tu et al. "Episodic Skeletal–plan refinement based on temporal data"; communications of the ACM vol. 32; pp. 1439–1451 Dec. 1989.

(List continued on next page.)

Primary Examiner—Thomas G. Black
Assistant Examiner—Jean G. Corrielus
Attorney, Agent, or Firm—Steven F. Caserza; Flehr Hohbach Test Albritton & Herbert LLP

[57] ABSTRACT

An end user query technology is taught which is capable of automatically understanding the database model and guiding the user to scout for the desired information, thereby increasing productivity and ease of information access. The user is freed from the need to understanding the database model, with the end user query facility of this invention quickly guiding the user to acquire the information. This is made possible by the end user query facility of this invention first recapturing the application semantics from the existing database model to provide a set of derived semantics. The derived semantics are then used by the end user query facility to intelligently guide the user to scout for the desired information in the database. In addition, the derived semantics can be easily updated by the end user query facility when the database model is changed.

82 Claims, 28 Drawing Sheets

OTHER PUBLICATIONS

Roger Jennings "Using Access for windows" pp. 1–7 Jan. 1989.

Russ Holden Digital's DB Integrator: A Commercial Multi-Database Management System (Digital Equipment Corporation) Sep. 1992.

Proceedings of the Third International Conference on Parallel and Distributed Information Systems (Cat. No. 94TH0668–4), Proceedings of 3rd International Conference on Parallel and Distributed Information Systems, Austin, TX, USA, 28–30 Sep. 1994, ISBN 0–8186–6400–2, 1994, Los Alamitos, CA, USA, IEEE Comput. Soc. Press, USA, pp. 267–268, Holden, R., "Digital's DB Integrator: A Commercial Multi-Database Management System".

Sixth International Conference on Data Engineering (Cat. No. 90CH2840–7), Los Angeles, CA, USA, 5–9 Feb. 1990, ISBN 0–8186–2025–0, 1990, Los Alamitos, CA, USA, IEEE Comput. Soc., USA, pp. 2–10, Kaul, M., et al., "ViewSystem: Integrating Heterogeneous Information Bases by Object–Oriented Views".

USENIX C++ Technical Conference Proceedings, Portland, OR, USA, 10–13 Aug. 1992, Berkeley, CA, USA, USENIX Assoc., USA, pp. 151–169, Alashqur, A., et al., "O–R Gateway: A System for Connecting C++ Application Programs and Relational Databases".

Journal of Information Science, 1994, UK, vol. 20, No. 4, ISSN 1352–7460, pp. 295–299, Sreenivasa, Ravi, et al. "An E–Mail–Based Bibliographic Information Server".

A Survey of the Universal Relation Model, Leymann, Data & Knowledge Engineering, vol. 4, 1989, pp. 305–320.

The Universal Relation as a user Interface, Ullinson, Principles of Database and Knowledge Based Systems, vol. II, Chpter 17, 1989.

Consequences of Assuming a Universal Relation, W. Kent, 1981 ACM Transactions on Database Systems, vol. 6, No. 4, pp. 539–556.

EasyTalk Product Backgrounder from Intelligent Business Systems (no date).

SQL Software Interfaces Brochure (no date).

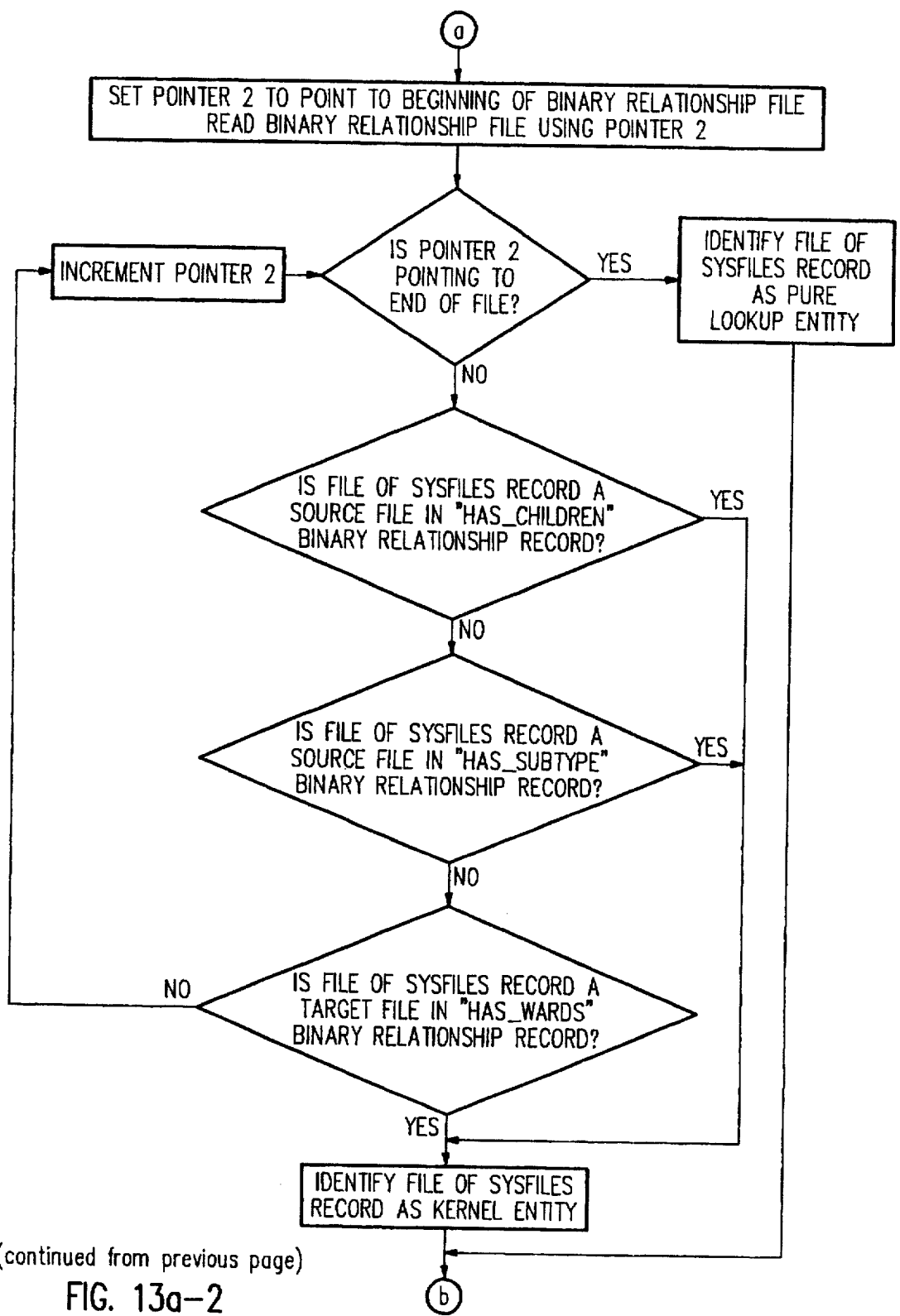
(continued from previous page)
FIG. 13a-2

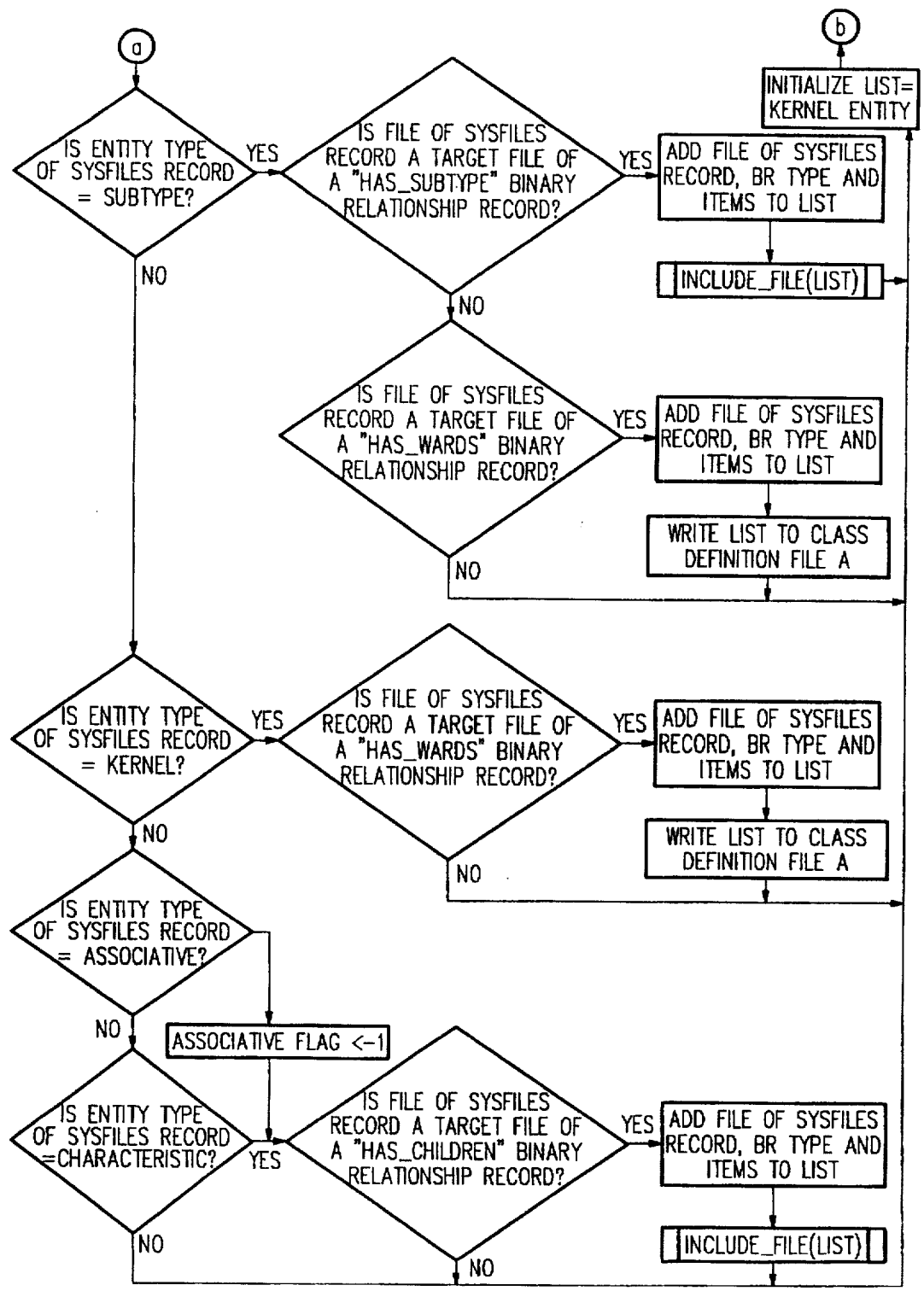
FIG. 15b (continued from previous page)

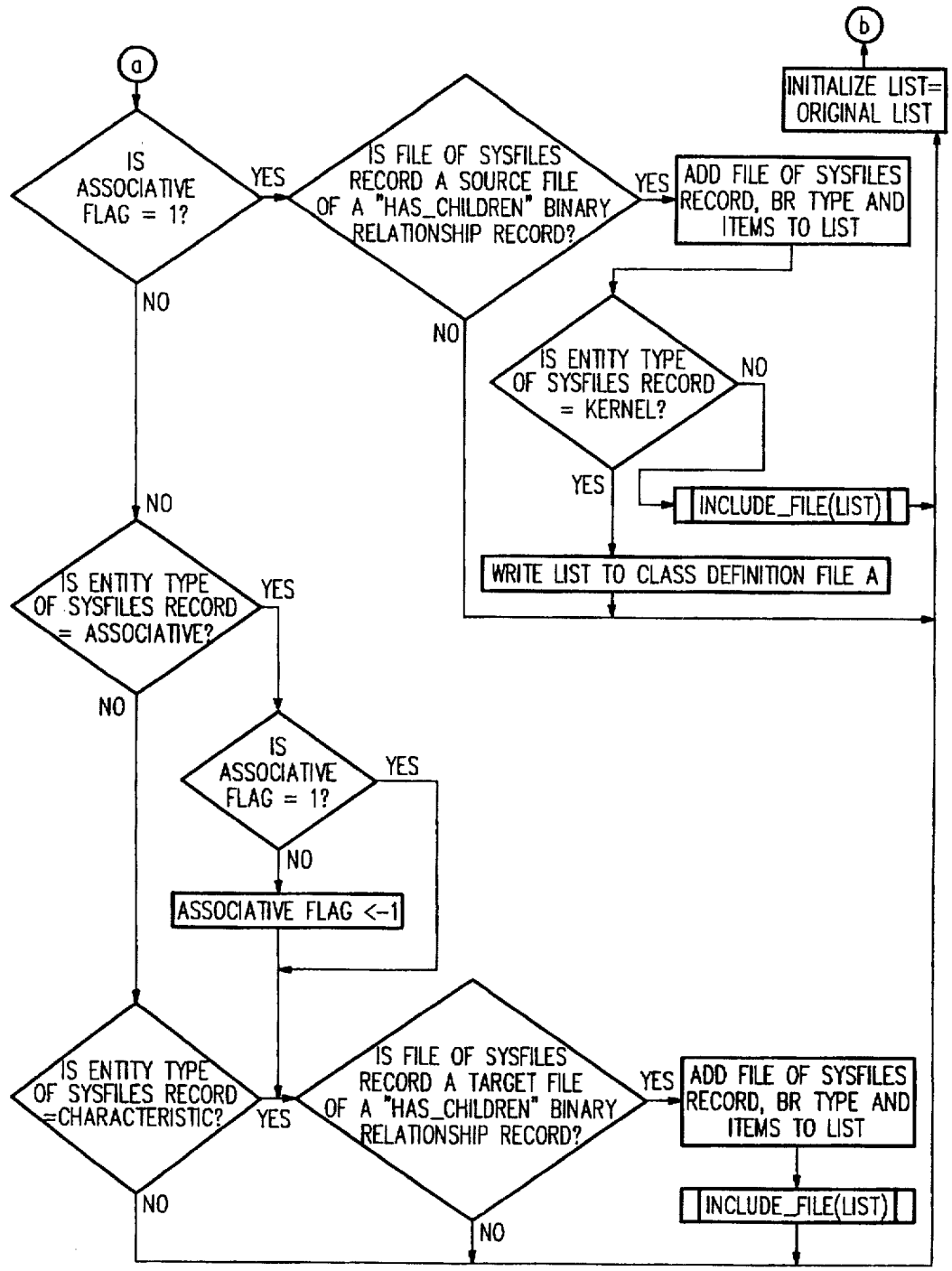
(continued from previous page)
FIG. 16b

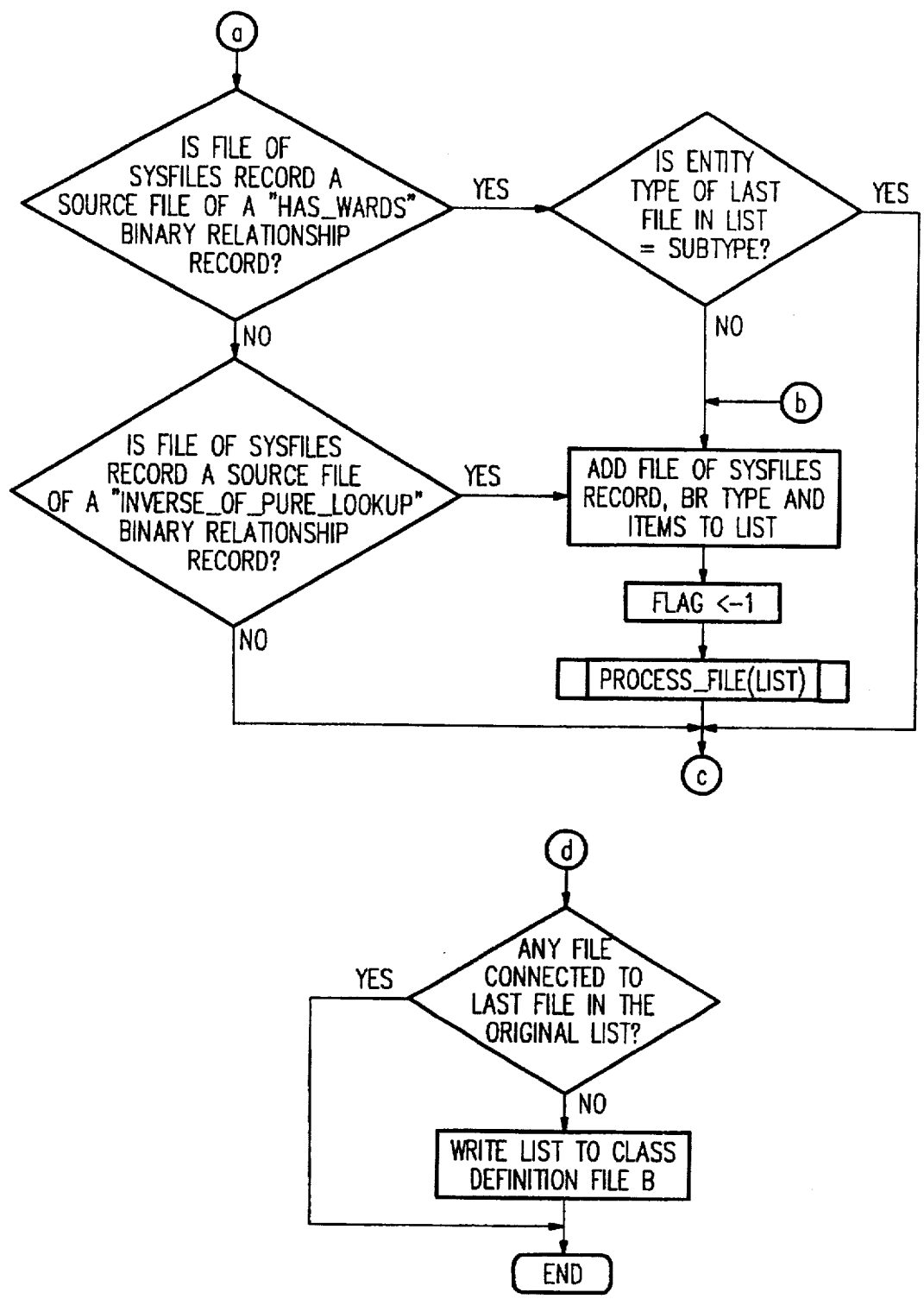
(continued from previous page)
FIG. 18b

2

END USER QUERY FACILITY INCLUDING A QUERY CONNECTIVITY DRIVER

CROSS-REFERENCE TO RELATED APPLICATIONS

This application is a continuation-in-part application of U.S. patent application Ser. No. 08/346,507, filed Nov. 29, 1994, (now U.S. Pat. No. 5,701,466), which is a continuation-in-part application of U.S. patent application Ser. No. 08/154,343 filed Nov. 17, 1993 (now abandoned in favor of continuation application Ser. No. 08/348,742, filed Nov. 30, 1994, now U.S. Pat. No. 5,487,132, issued Jan. 23, 1996), which in turn is a continuation-in-part of U.S. patent application Ser. No. 07/846,522, filed Mar. 4, 1992, (now U.S. Pat. No. 5,325,465, issued Jun. 28, 1994).

TECHNICAL FIELD

This invention pertains to end user query technology, and more specifically to an end user query facility which scouts for information by understanding the database model and guiding the user.

BACKGROUND

This invention pertains to end user query technology, introducing a novel approach to end user information access. Current end user query techniques require the user to understand database models in order to access information. For example, using prior art database models in which it is not uncommon to have dozens if not in excess of a hundred separate data base files interrelated, it is necessary for the database programmer to know in which file the desired piece of information is located, and then appropriately connect the files to achieve an orderly access of the specific file containing the desired information. This requires a fair amount of skill on the part of the database programmer and intimate familiarity of that programmer with the structure of the database which may be extremely complex. Furthermore, training new database programmers on an existing database model requires considerable amount of time and effort. One example of a prior art knowledge-based information retrieval system is the EASY-TALK product available from Intelligent Business Systems of Milford, Conn. However, it appears that the EASY-TALK product requires the database developer to explicitly input to the EASY-TALK system the semantics of the database.

SUMMARY OF THE INVENTION

In accordance with the teachings of this invention, it has been determined that there would be great usefulness in providing an end user query technology which is capable of automatically understanding the database model and guiding the user to scout for the desired information, thereby increasing productivity and ease of information access. In accordance with the teachings of this invention, the user is freed from the need to understanding the database model, with the end user query facility of this invention quickly guiding the user to acquire the information. This is made possible by the end user query facility of this invention first recapturing the application semantics from the existing database model to provide a set of derived semantics. The derived semantics are then used by the end user query facility to intelligently guide the user to scout for the desired information in the database. In addition, the derived semantics can be easily updated by the end user query facility when the database model is changed.

In accordance with further teachings of this invention, the user is provided with a "natural" description of the database model to further ease his effort in information access. The "natural" description includes classes with an entity-relationship (E-R) model describing each class. The classes represent the different types of high-level objects whose information are contained in the database. The description of these classes is made possible by the end-user query facility first recapturing additional application semantics from the existing database model to provide a richer set of derived semantics. This enriched set of derived semantics is then used to identify the classes and generate their definitions. The definition of each class is then subsequently translated into an E-R model of the class. In addition these classes and their E-R models can be easily updated by the end-user query facility when the database model is changed.

In accordance with the teachings of this invention, it has also been determined that there would be some usefulness in providing an end-user query technology that allows a user at a remote site with no on-line access to the database to still be able to make a query. This is made possible by integrating the end-user query facility of this invention with an electronic mail system so that the user at the remote site can send his query as a mail message and have the result of his query posted to him also as a mail message. In addition, a log of all query requests and their processing can be kept and analyzed to track usage and performance of the end-user query facility.

A key benefit of an additional embodiment of the present invention allows the many millions of existing applications used by many organizations such as Microsoft Excel spreadsheet, Microsoft Access DBMS, Lotus 123 spreadsheet, Powersoft PowerViewer or InfoMaker, Gupta Quest, Q+E Database Editor, etc. that are ODBC compliant or compliant to other data access interface standard to be reused for making powerful ad-hoc queries easily through seamless integration of a novel Query Facility provided by this invention, thus saving on the cost of purchasing new tools to have more powerful ad-hoc queries as well as the cost of training users to use the new tools.

BRIEF DESCRIPTION OF THE DRAWING

FIGS. 13a-1 and 13a-2 form a flow chart depicting one embodiment of a procedure to identify kernel entities, suitable for use in the step of identify entity type of each file in the embodiment of FIG. 12;

FIGS. 15a and 15b depict a flow chart of one embodiment of a procedure to generate class definition file A, suitable for use by the class generator in the embodiment of FIG. 11;

FIGS. 18a and 18b depict a flow chart of one embodiment of a procedure for Process_File suitable for use with the embodiment of FIG. 17.

DETAILED DESCRIPTION

Overview

The following briefly describes one embodiment of this invention which is in the reporting language known as QUIZ. The language is part of a fourth generation language known as POWERHOUSE from COGNOS Incorporated of Canada. However, it is to be understood that the teachings of this invention are equally applicable to any end user query technology, including languages other than QUIZ.

Figure 1:
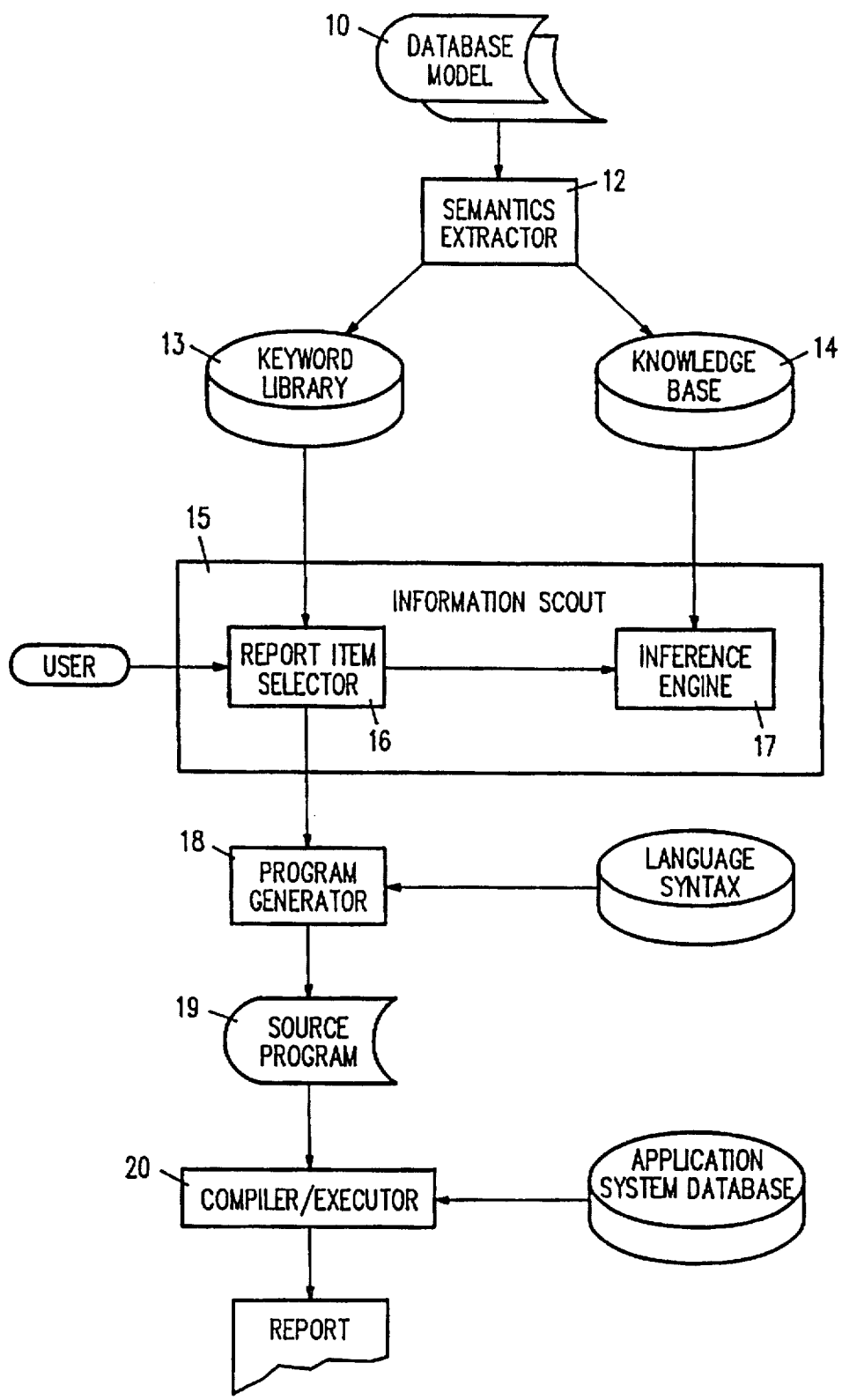
FIG. 1 is a flow chart depicting one embodiment of an end user query facility constructed in the accordance with the teachings of this invention.

FIG. 1 depicts the operation of and interaction between the following modules:

a. The Semantics Extractor. Semantics Extractor 12 reads Database Model 10 of an application system and extracts the semantics of the database model. The semantics are stored in Keyword Library 13 as a list of keywords based on the item definitions and in Knowledge Base 14 as a list of file linkages of the database model. This is a key feature of the present invention and differs from the prior art in that prior art systems require a database developer or manager to explicitly define and provide the semantics of the database to the end user query facility.

b. The Information Scout. Information Scout 15 guides the user to specify the items to be reported in order to obtain the information he wants. This is carried out in two steps. First, Report Item Selector 16 prompts the user for keywords that suggest the desired data item, for example DATE. Using a look-alike keyword search method, all items in Keyword Library 13 containing DATE are listed. The user then makes the appropriate selection. After selecting the items, Inference Engine 17 identifies the files containing the selected items. Inference Engine 17 then searches for the linkage(s) in Knowledge Base 14 connecting the identified files.

c. The Program Generator. Program Generator 18 accesses the linkages obtained by Information Scout 15 and generates the corresponding Source Program 19 to extract the information requested by the User.

d. The Compiler/Executor. The source program is compiled and executed against the database to generate the report using Compiler/Executor 20.

A more detailed description of one embodiment of these modules is now provided.

The Semantics Extractor

Figure 2:
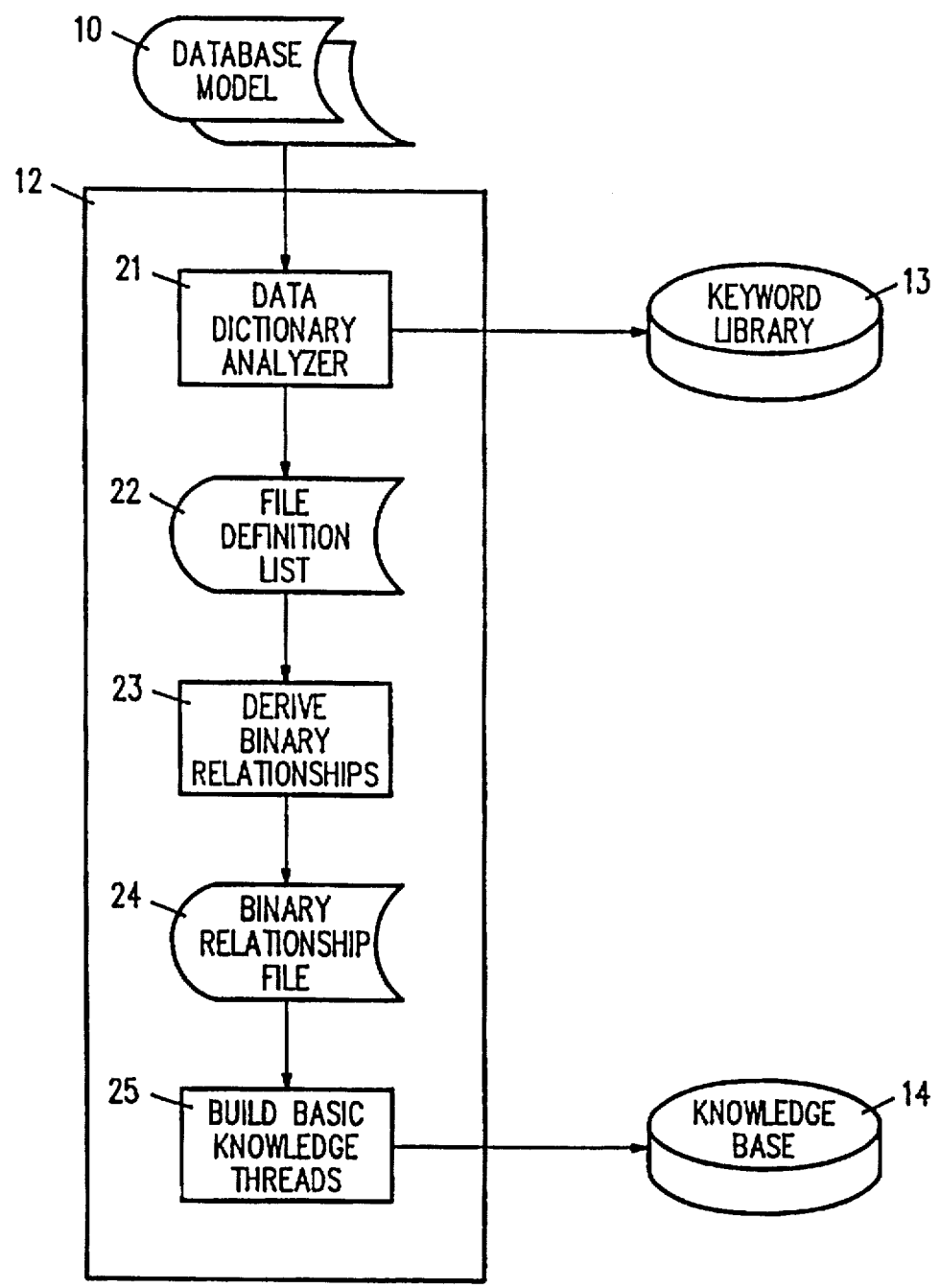
FIG. 2 is a flow chart depicting one embodiment of semantics extractor 12 of FIG. 1.

FIG. 2 shows a flow chart of Semantics Extractor 12. In order to extract the semantics of an application, an application system must have a data dictionary that represents the application data model. In the POWERHOUSE fourth generation language which is used in one embodiment, all data dictionaries are available and can be found in "QDD" or "PDL" formats. They are created by the analyst when developing an application system. The data dictionary is made up of system options, security and definitions of each element, file, record and item used in an application system. The data dictionary of Database Model 10 is parsed by Data Dictionary Analyzer 21 in order to obtain the keywords and the information about each file and item in Database Model 10.

The keywords are derived from the item definitions in the data dictionary in the following manner. The name of each item may be in the form of one complete word (e.g. SALARY) or may use more than one word separated with a hyphen (e.g. DATE-JOINED). Hyphens are removed from those item names with hyphens by Data Dictionary Analyzer 21. The resulting individual words obtained from the item names are then stored as keywords in Keyword Library 13, e.g. SALARY, DATE, and JOINED. These keywords are used later by Report Item Selector 16 (FIG. 1).

Next, Knowledge Base 14 is built. The first step involves extracting the following information from each file in Database Model 10:

a. File name
b. For every item in each file
  i) Item name
  ii) Item type (e.g. character, numeric, date)
  iii) Item size
  iv) If an item is a key, its key type (e.g. unique key, repeating key) or non-key These files make up File Definition List 22 which is then used to determine the file relationships using the step Derive Binary Relationships 23. This step involves comparing each file definition in File Definition List 22 with the other file definitions in the same list to obtain its binary relationships with other files. A binary relationship consists of two files that can be linked. Two files can be linked if:

(i) both files have one item with the same name, AND (ii) the item in the target (second) file is a unique or repeating key.

For example, in a Personnel Information System, the EMPLOYEES file would have an item called Emp-no which is a unique key to identify each employee and the SKILLS file would also have an item called Emp-no. Each record in a SKILLS file would contain a particular skill an employee has. As a single employee would have many different skills the Emp-no would be repeated for each skill and so would be a repeating key. These two files would form a binary relationship since Emp-no is the common item and Emp-no in SKILLS file is a repeating key. The item Emp-no in the source (first) file which in this example is the EMPLOYEES file need not be a key.

Often two items could be coded differently but mean the same thing, for example, both P-NO and PART-NO could be used to represent a part number in a Inventory Control System. P-NO may occur in some files and PART-NO in others. These two items are said to be in the same "domain" called P-NO as shown below:

| File name | Item name | Domain |
|---|---|---|
| A-PARTS-FILE | P-NO | P-NO |
| B-PARTS-FILE | PART-NO | P-NO |

In such a case, we would not be able to establish a file relationship between the two files as the item names are different. But it would still be meaningful to establish a link between the two files with such items as the items are in the same domain.

In the example above, both A-PARTS-FILE and B-PARTS-FILE have items in the same domain called P-NO though the item names are different. A-PARTS-FILE and B-PARTS-FILE should therefore be linked. The linkage rule defined earlier is thus modified as follows to take into account items with not only the same name but with different names in the same domain:

(i) both files have one item in the same domain, AND (ii) the item in the target (second) file is a unique or repeating key.

For every linkage between two files, the item in the source file can be a unique key, repeating key or non-key while the target file must either be a unique or repeating key. From this restriction we can derive six possible valid types of file linkages. These are as follows:

| | Source file | Target file | Notation |
|---|---|---|---|
| a. | Unique key | Unique key | UU |
| b. | Unique key | Repeating key | UR |
| c. | Repeating key | Unique key | RU |
| d. | Repeating key | Repeating key | RR |
| e. | Non-Key | Unique key | NU |
| f. | Non-Key | Repeating key | NR |

However, in one embodiment the repeating to repeating (RR) combination which is item d above is not stored because this represents a bad file design. A repeating to repeating relationship indicates a many to many relationship which preferably should not exist in a normalized data model. The analyst is informed of such a finding and attempt to rectify it.

All the binary relationships found using the above rules are stored as follows:

a. Source file b. Source file item to link to target file c. Target file d. Target file item to link to source file e. Relationship (e.g. UU,UR,RU,NU,NR)

From the earlier example using EMPLOYEES and SKILLS files, the binary relationship are stored as:

| Source file | Item | Target file | Item | Relationship |
|---|---|---|---|---|
| EMPLOYEES | Emp-no | SKILLS | Emp-no | UR |

The set of binary relationships derived from the above step is stored in a Binary Relationship File 24. The next step, namely Build Basic Knowledge Threads 25, involves deriving knowledge of Database Model 10 of an application system from these binary relationships which is then stored in Knowledge Base 14 in the form of knowledge threads. Each thread represents a linkage of many files. The following is an example of a knowledge thread:

EMPLOYEES→BRANCHES→EXPENSES

It contains an EMPLOYEES file linked to BRANCHES file which is then linked to EXPENSES file. Inference Engine 17 (FIG. 1) in Information Scout 15 later uses these threads in isolation or combination to infer the access paths in order to obtain the information requested by the user. For example, when the user wants to report the employees and their expenses in each branch, the above thread is used to generate the required path to navigate through an application database in order to acquire the required information.

Knowledge Base 14 is made up of basic and acquired knowledge threads. The following describes the derivation of basic knowledge threads by joining binary relationships from Binary Relationship File 24. The derivation of acquired knowledge threads is described later.

Figure 3:
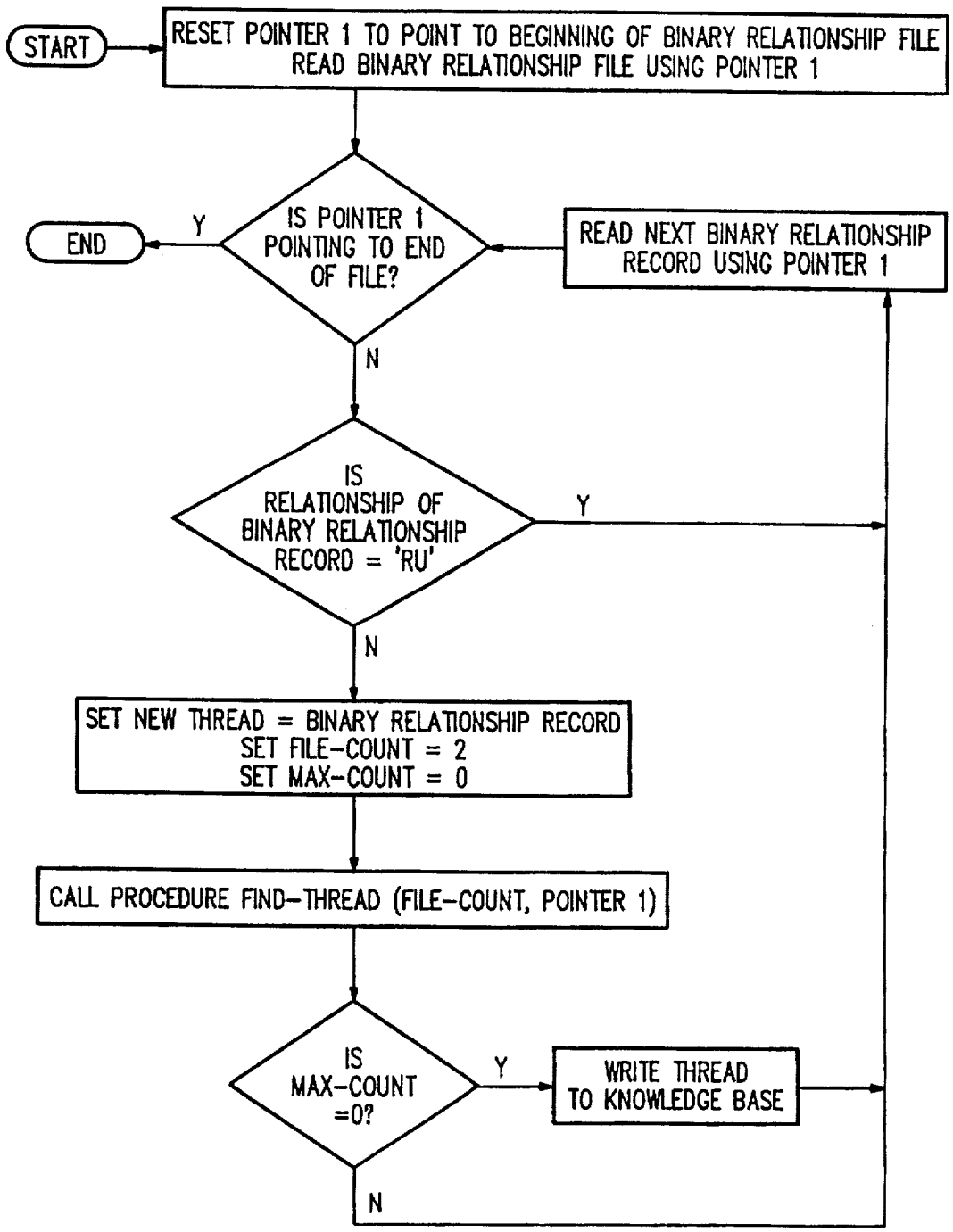
FIG. 3 is a flow chart depicting one embodiment of a method suitable for use to build basic knowledge threads step 25 of semantics extractor 12 of FIG. 2.

FIG. 3 is a flow chart of one method suitable for use as Build Basic Knowledge Threads 25 of FIG. 2. The following describes how a single basic knowledge thread is built using the method of FIG. 3, with reference to the following example of a procedure Find-Thread:

```
Procedure Find-Thread (file-count, pointer 2)
begin
    old-file-count = file-count
    while (pointer 2 <> end of file)
    begin
        read binary relationship file using pointer 2
        until (thread-end = source file of binary relation record)
              or (end of binary relationship file)
        if (binary relation record exists) and
           (target-file of record not exist in current-thread)
        then begin
            call Procedure Find-Thread(file-count, pointer 2)
            file-count = file-count + 1
            if (max-count < file-count)
            then max-count = file-count
            current-thread = current-thread + target-file
            reset pointer 2 to start of binary relationship
        file endif
    endwhile
    if file-count <> old-file-count
    then write current-thread into Basic Knowledge file
end
```

Note: Parameters file-count and pointer 2 are passed by value Current-thread, max-count are global variables The formation of each thread begins with a first binary relationship record read from Binary Relationship File 24. This record forms an initial thread. However, if the first binary relationship record is of type 'RU' (repeating to unique) relationship, it is ignored and no initial thread is formed from it. The next record is then read and if it still is of type 'RU', it is again ignored until the next record is found that is not of type 'RU', which is then used to form the initial thread. The reason for doing this is that it is only necessary to form threads using either 'RU' or 'UR' types and not both as they lead to the same access path being inferred by Inference Engine 17. In this embodiment we are using 'UR' types. To keep track of the next record to read from Binary Relationship File 24, a pointer called pointer 1 is used.

The initial thread can be extended by linking with other valid binary relationship records. To do so, Binary Relationship File is searched. This time another pointer, namely pointer 2, is used to keep track of the next record to read from Binary Relationship File 24 to link to the thread to be extended. A link to extend the thread is said to be found if the first file of the binary relationship record and the file at the end of the thread, called the thread-end file, are the same, or else the next binary relationship record is read using pointer 2. If a valid binary relationship record is found, we then examine if the target (second) file of this record is already in the thread. If it is not, it is added to the end of the thread, to become the thread-end. If it is, the next binary relationship record is read using pointer 2. The search ends when the end of Binary Relationship File 24 is reached using pointer 2. The formation of a single thread is then complete and is stored in Knowledge Base 14 as follows:

Thread-Head:
    file name
    file item to link to next file
Thread-Body:
    file name
        file item to link to the previous file
        relationship to the previous file
    file item to link to the next file
Thread-End:
    file name
        file item to link to the previous file
        relationship to the previous file The thread-head contains the first file and the first file item. It is linked to the next file using the thread-body or thread-end. The thread-body is made up of a file, its item which has the same domain as the item of the previous file it is linked to and the relationship to that file. It also contains another item which is used to link to the next file. The thread-end is similar to the thread-body except that it does not have the item to link to the next file.

The following example briefly shows how Knowledge Base 14 is built up with basic knowledge threads using the above procedure. Assume that Binary Relationship File 24 contains the following records:

| Source file | Item | Targret file | Item | Relationship |
| --- | --- | --- | --- | --- |
| 1. EMPLOYEES | Br-no | BRANCHES | Br-no | NU |
| 2. BRANCHES | Br-no | EXPENSES | Br-no | UR |
| 3. EMPLOYEES | Emp-no | BILLINGS | Emp-no | UR |
| 4. BILLINGS | Emp-no | EMPLOYEES | Emp-no | RU |
| 5. PROJECTS | Proj-no | BILLINGS | Proj-no | UR |
| 6. BILLINGS | Proj-no | PROJECTS | Proj-no | RU |

The method of this example is then as follows:

| | |
| --- | --- |
| Pointer 1 at 1st record of above file | Thread Formed<br>Use the first binary relationship record EMPLOYEES link to BRANCHES as the valid binary relationship record to form the initial thread. Next, examine whether this thread can be extended by searching through the same Binary Relationship File, this time using pointer 2. It can be linked to the second binary relationship record, namely BRANCHES link to EXPENSES to form the final thread:<br>EMPLOYEES → BRANCHES → EXPENSES |
| 2nd record | Similarly, using the next binary relationship BRANCHES link to EXPENSES record, form the initial thread:<br>BRANCHES → EXPENSES<br>This thread cannot be extended as the EXPENSES file cannot be linked to other binary relationship records. |
| 3rd record Using the 3rd binary relationship the third thread EMPLOYEES→ BILLINGS→ PROJECTS is formed as follows: EMPLOYEES links to BILLINGS via Emp-no BILLINGS links to PROJECTS via Proj-no This thread uses different items, namely Emp-no and Proj-no to link the two binary relationship records. | |
| 4th record | No thread is formed as relationship is 'RU'. |
| 5th record | Thread formed is PROJECTS → BILLINGS → EMPLOYEES as follows:<br>PROJECTS links to BILLINGS via Proj-no<br>BILLINGS links to EMPLOYEES via Emp-no<br>This thread uses different items, namely Proj-no and Emp-no, to link the two binary relationship records. |
| 6th record | No thread is formed as relationship is 'RU'. |

Figure 4:
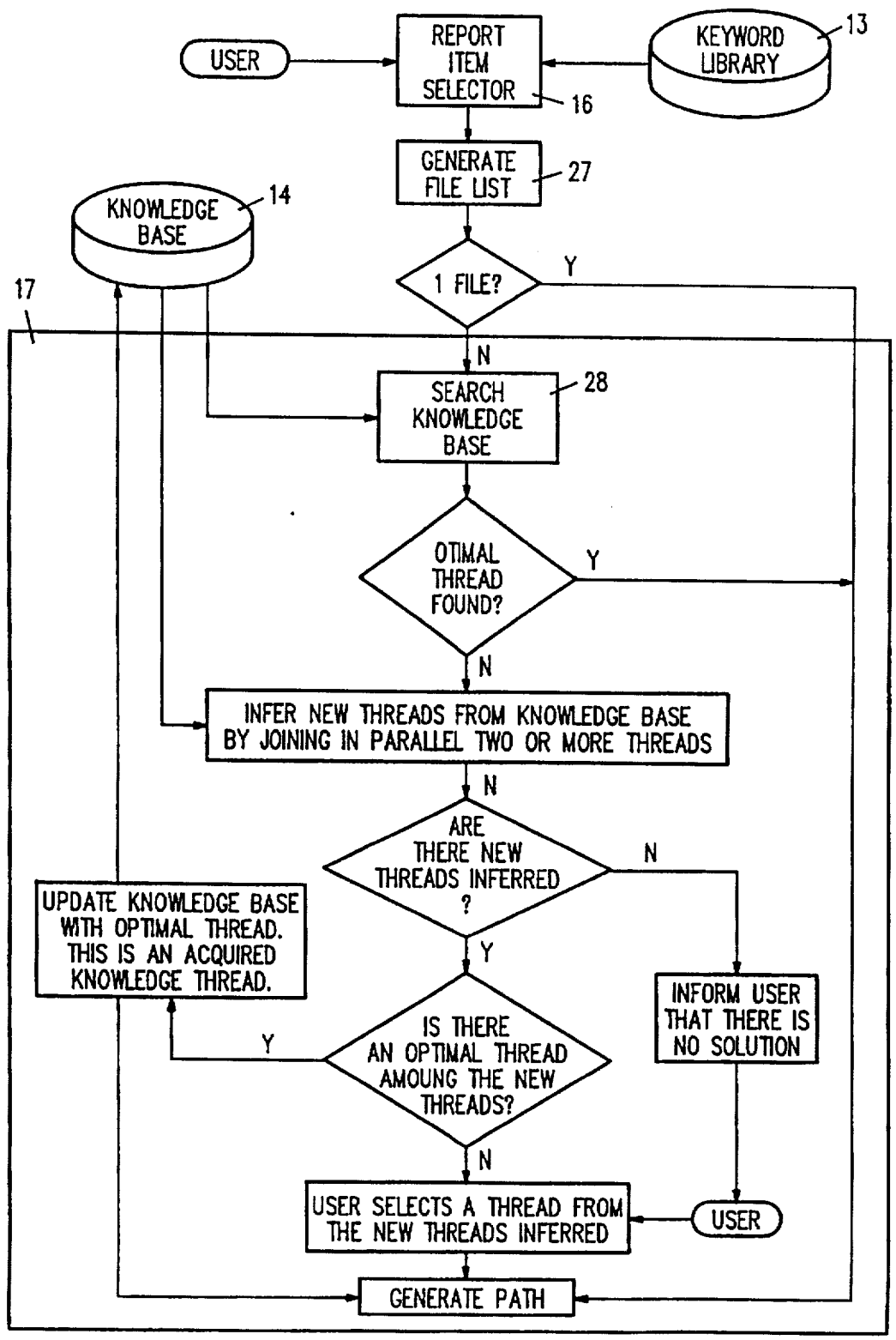
FIG. 4 is a flow chart depicting one embodiment of a method suitable for use as information scout 15 of the embodiment to FIG. 1.

Each thread is stored in Knowledge Base 14 as follows, using the third thread above as example:
    Thread-Head file = EMPLOYEES
        item = Emp-no
    Thread-Body file = BILLINGS
        item-1 = Emp-no
        relationship = UR
        item-2 = Proj-no
    Thread-End file = PROJECTS
        item = Proj-no
        relationship = RU Information Scout FIG. 4 is a flow chart of one method suitable for use as Information Scout 15 of FIG. 1. Report Item Selector 16 first guides the user to select the items to be reported. Inference Engine 17 then infers the access path based on the items selected.

Report Item Selector

The user is prompted for a keyword or presented with a list of all the words in Keyword Library 13 to choose from. When the user chooses to provide a keyword, Report Item Selector 16 lists all the items that match the keyword provided. For example, the keyword DATE could return the following list of items containing the word DATE.

DATE BIRTH
DATE JOINED
DELIVERY DATE
LAST DATE UPDATE

The user then selects the desired item from the list. In one embodiment, an explanation of each item is also displayed. This explanation is either extracted from the data dictionary of an application system by Data Dictionary Analyzer 21 or entered by a programmer analyst maintaining the application system.

Using the above method, the user selects all the items to be reported. For each item, the file containing it is automatically identified and added to the file list using Generate File List Step 27. When two or more items are selected from the same file, only one entry is made in the file list. This file list is sorted such that the first file is the file which has the highest number of items selected and the other files are in descending order of items selected. When there is only one file in the list (that is, all the items selected come from the same file), no search of access paths is required. Otherwise, inference engine 17 is invoked to infer the access path.

Inference Engine

The first step involves searching for the optimal knowledge thread in Knowledge Base 14 to be used to generate an access path. If no optimal knowledge thread is found, the next step is to infer new knowledge threads, one of which is used to generate an access path (See FIG. 4). However, if no new threads can be inferred, then the user is informed that there is no solution.

Knowledge base 14 comprises two sections: basic and acquired knowledge threads. The basic knowledge section contains the knowledge threads that are generated by Semantics Extractor 12. The acquired knowledge section also contains knowledge threads but these are knowledge threads that have been inferred by Inference Engine 17. The process of acquiring these knowledge threads is explained later.

Figure 5:
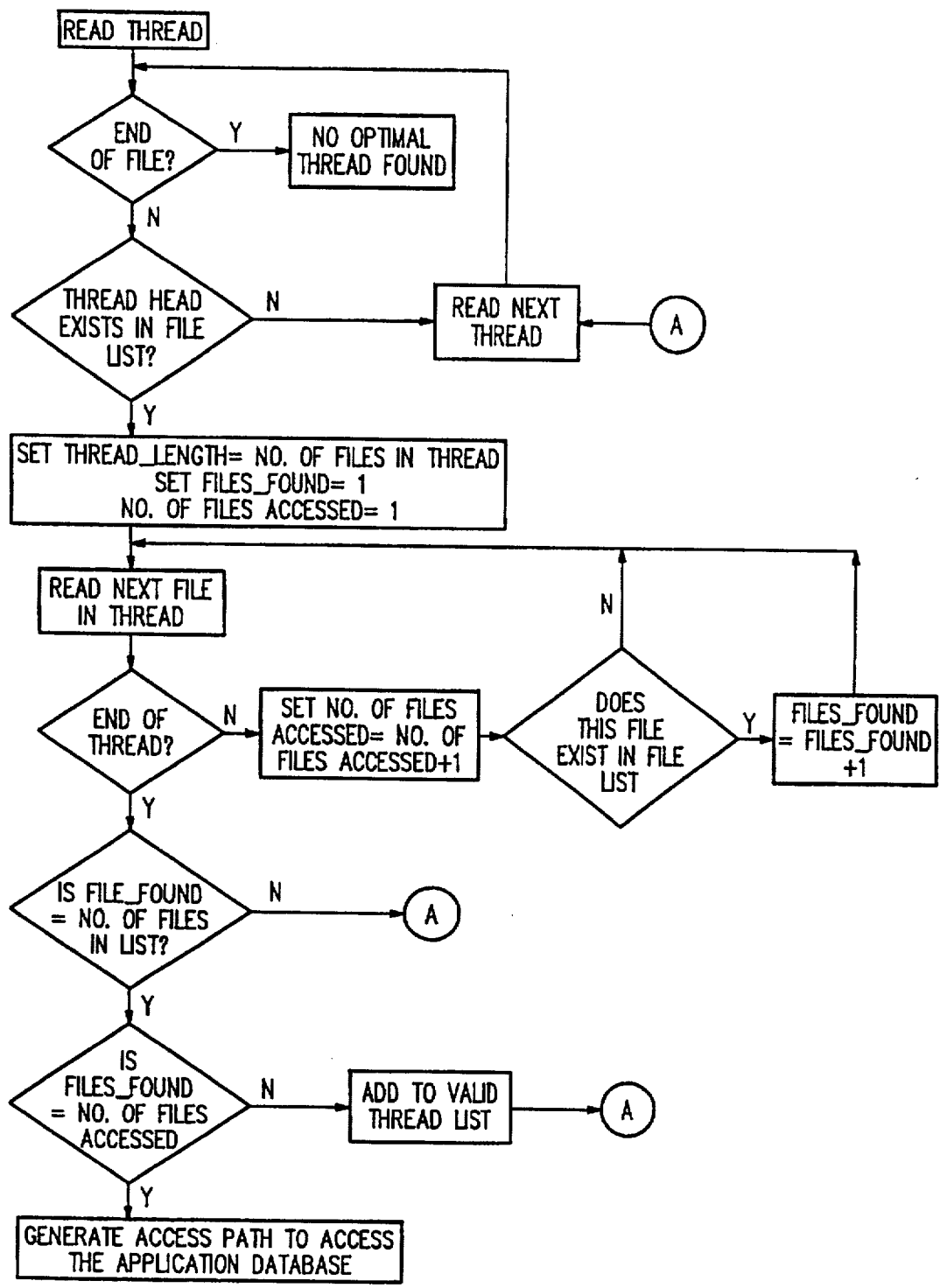
FIG. 5 is a flow chart depicting one embodiment of a method suitable for use as the search knowledge base step of the embodiment to FIG. 4.

In this embodiment, the search is made on the acquired knowledge section first. If a thread is found where all the files in the file list using step 27 of FIG. 4 exists on the thread, this thread used to generate the access path. When the search is unsuccessful, i.e. no acquired knowledge thread is found which can match all the files in the file list, the search proceeds using the basic knowledge section. FIG. 5 shows a flow chart of one method of performing the search for a knowledge thread from the basic knowledge section to be used to generate an access path.

The following example illustrates this search. Assume the file list from Step 27 in FIG. 4 has been build up from the items the user has selected and it contains two files as follows:

File list:
EMPLOYEES
BRANCHES

Assume that the basic knowledge section has the following three basic knowledge threads with EMPLOYEES as the thread-head:

Thread 1: EMPLOYEES→BRANCHES→EXPENSES
Thread 2: EMPLOYEES→PAY
Thread 3: EMPLOYEES→BILLINGS We define the number of files accessed as the number of files in the thread which exists in the file list starting from the thread head.

Thread 1 has files which match all those in the file list, namely EMPLOYEES and BRANCHES. The number of files accessed in this case is two (EMPLOYEES→BRANCHES) and is equal to the number of files in the file list. This thread is considered an "optimal thread" as all the files in the file list exist contiguously on the thread starting from the thread-head. Thread 2 and 3 are invalid because BRANCHES is not found on the thread.

When an optimal thread is found, the search ceases and the optimal thread is used to generate the access path. In the above example, the thread EMPLOYEES→BRANCHES→EXPENSES is used to generate the access path but only up to the BRANCHES file with the EXPENSES file ignored or "trimmed out" as it is not required in this example of the user query. Otherwise, Inference Engine 17 attempts to infer new threads by joining two or more threads together in parallel (see FIG. 4). Those new threads that are found to be optimal, i.e. they have the number of files accessed equal to the number of files in the file list from step 27 of FIG. 4, are then classified as acquired knowledge threads and stored in the acquired knowledge section of Knowledge Base 14.

Figure 6A:
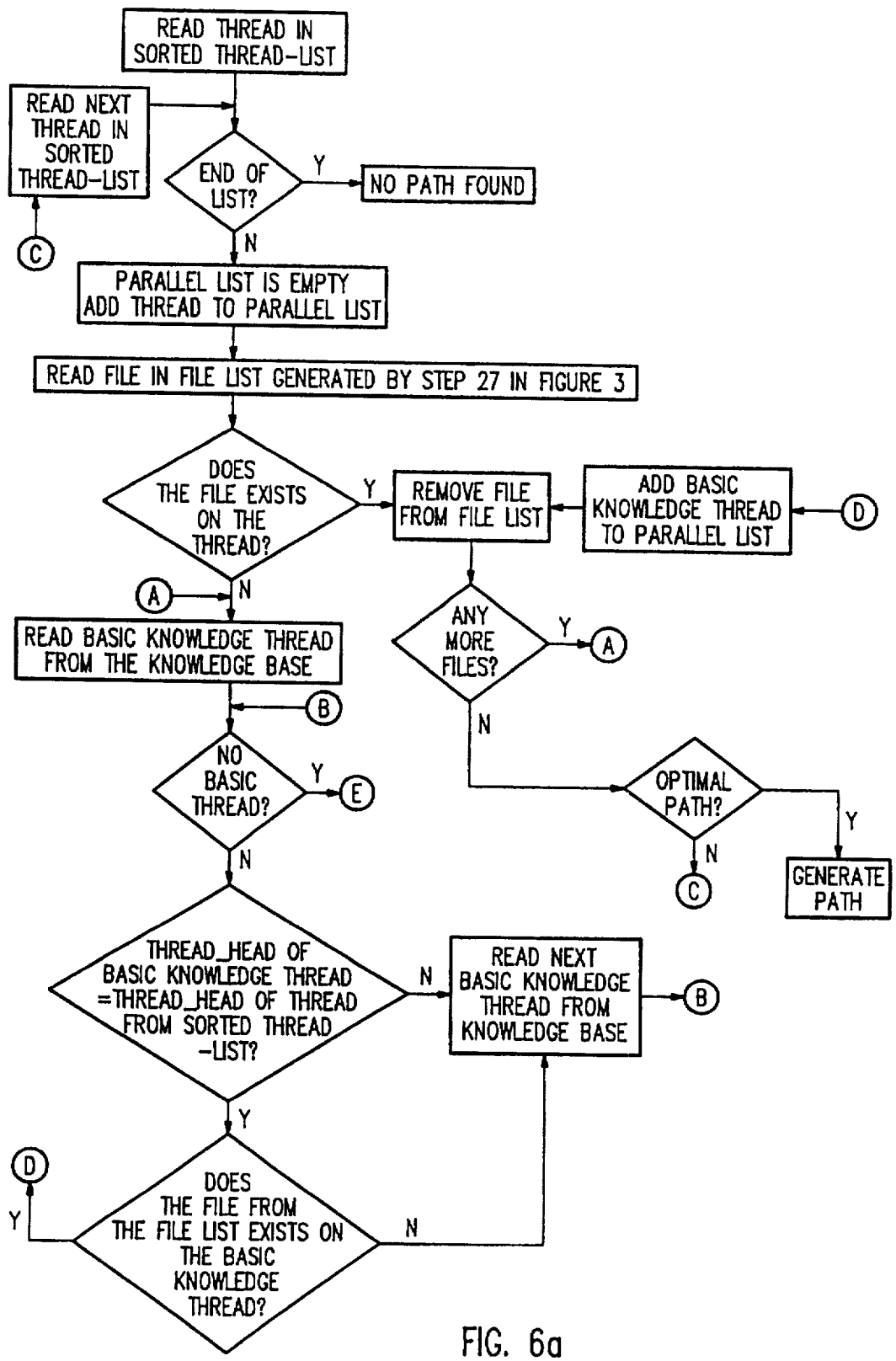
FIGS. 6a and 6b is a flow chart depicting one method suitable for use as the infer new threads from knowledge base step of the embodiment of FIG. 4.
Figure 6B:
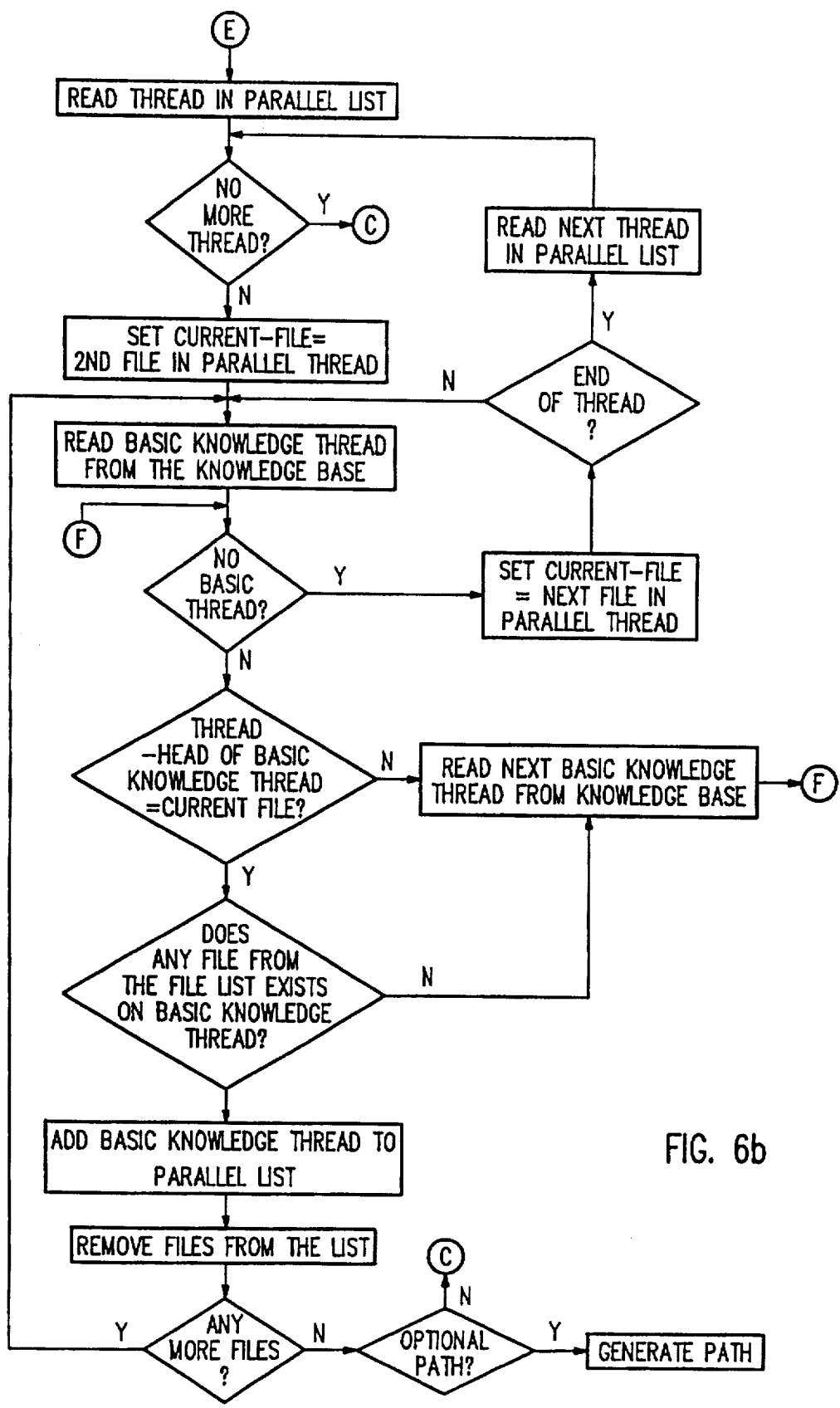

The following section describes the process of deriving acquired knowledge threads. Before inferring new threads, Inference Engine 17 must first generate a list of knowledge threads consisting of basic knowledge threads which have at least one file matching any file in the file list from step 27 of FIG. 4. This thread list is then sorted in descending order of the number of files in each thread matching those in the file list. Within this sorted list of knowledge threads, if there are more than one thread with the same number of files matching those in the file list, the threads are then sorted in ascending order of the number of files in each thread. This results in a knowledge thread that has the most number of files matching those in the file list but has the least number of files on the thread being at the top of the list. This forms the sorted thread-list. This list is then used to form new threads by joining in parallel two or more threads. FIGS. 6a and 6b form a flow chart of how these new threads are inferred from the sorted thread-list.

For ease of explanation of how the above procedure works, assume that the file list from step 27 of FIG. 4 contains the following three files:

EMPLOYEES
BRANCHES
PAY and the basic knowledge section of the Knowledge Base 14 contains the following three threads as before:

Thread 1: EMPLOYEES→BRANCHES→EXPENSES
Thread 2: EMPLOYEES→PAY
Thread 3: EMPLOYEES→BILLINGS Thus there is no basic thread that contains all three files in the file list. Inference Engine 17 next employs parallel join inferencing. The basic knowledge threads which have at least one file found in the file list is extracted and sorted as follows:

| Thread-list: | No. of files in thread matching those in file list | Thread-length |
| --- | --- | --- |
| 1. EMPLOYEES → PAY | 2 | 2 |
| 2. EMPLOYEES → BRANCHES → EXPENSES | 2 | 3 |
| 3. EMPLOYEES → BILLINGS | 1 | 2 |

The flow chart of FIGS. 6a and 6b is then applied. First, the thread EMPLOYEES→PAY is added to the parallel list. Next, the file EMPLOYEES is read from the file list. Since EMPLOYEES exists on this thread it is removed from the file list. The next file from the file list is then read and examined whether it exists in the same knowledge thread. Since it does, it is also removed. However, the next file from the file list, namely BRANCHES, does not exist in the knowledge thread. It therefore remains in the file list. The next step is to retrieve from Knowledge Base 14 the basic knowledge threads whose thread head (first file) is EMPLOYEES.

As stated earlier, the Knowledge Base contains the following basic knowledge threads:

1. EMPLOYEES→BRANCHES→EXPENSES
2. EMPLOYEES→PAY
3. EMPLOYEES→BILLINGS

The basic thread EMPLOYEES→BRANCHES→EXPENSES has the BRANCHES file and is therefore added to the parallel list. But before it is added, the EXPENSES file is removed as it is not a file in the file list. The parallel list now contains the following threads:

Parallel list:
EMPLOYEES→PAY (obtained from the sorted thread list)
EMPLOYEES→BRANCHES (obtained from the basic knowledge threads)

The above knowledge threads have a parallel relationship through the common file EMPLOYEES and form the parallel thread as follows:

---
EMPLOYEES → BRANCHES
→ PAY
---

Next, the optimality test is applied. As the number of files accessed (which is earlier defined as the number of files in the thread starting from the thread-head) is equal to the number of files in the file list, an optimal solution has been found. This optimal thread is then added to Knowledge Base 14 as an acquired knowledge thread. However, if the optimality test fails, the above process to search for new parallel relationships is then repeated using the next thread on the sorted thread-list. If there are any new parallel relationships found, the optimality test is again applied.

In the event the sorted thread-list has been exhausted with no optimal acquired knowledge thread formed from the parallel relationships found, the user is prompted to select one of the parallel relationships found if there are more than one, or else the single parallel relationship found is used to generate the access path.

In cases where there are more than one parallel relationships, there may exist parallel relationships as follows:

---
a. EMPLOYEE → PAY
   → BRANCHES
b. EMPLOYEE → BRANCHES
   → PAY
---

As both these parallel relationships are semantically the same, one is redundant and is thus removed.

There may also be a case whereby there are no parallel relationships found after the sorted thread list has been exhausted. In such a case, there is no solution to the end-user query.

The inference method as illustrated in the flow chart of FIGS. 6a and 6b also takes into account inference of relationships using more than one file as common files. For example, the method is able to infer the following parallel relationships, whereby EMPLOYEES and PAY are the two common files:

EMPLOYEES→PAY→file1
EMPLOYEES→PAY→file2

These then form the parallel thread:

---
EMPLOYEES → PAY → file1
                → file2
---

Program Generator

Based on the path inferred by Inference Engine 17, the corresponding QUIZ ACCESS statement is generated. In 'QUIZ', the file linkage is specified using the ACCESS statement with the following syntax:

---
ACCESS file [ LINK item OF file TO item OF file ]
  [ [ { AND } item OF file TO item OF file ] . . ]
    { LINK }
where ACCESS, LINK, AND, OF, TO are part of the 'QUIZ' syntax,
  file refers to the file name,
  item refers to the item name in the file to be linked,
  [ ] means optional statement,
  { } means choose one of the options i.e. AND or LINK,
  . . means repeats one or more times
---

In QUIZ, there are two ways of defining a linkage between a number of files: hierarchical and parallel. A hierarchical linkage is defined with the "LINK . . . TO" option of the ACCESS statement. A parallel linkage is defined with the "AND . . . TO" option of the access statement.

When a single thread is used to generate the access path, the hierarchical link is used. When a combination of two or more threads are used a parallel link is used. From the earlier examples, ---
1. EMPLOYEES → BRANCHES
   uses the hierarchical linkage to generate
   ACCESS EMPLOYEES LINK Br-no OF EMPLOYEES
     TO Br-no OF BRANCHES
2. EMPLOYEES → BRANCHES
              →PAY
   uses the parallel linkage to generate
   ACCESS EMPLOYEES LINK Br-no OF EMPLOYEES
     TO Br-no OF BRANCHES
     AND Emp-no OF EMPLOYEES
     TO Emp-no OF PAY
---

It should be noted that for a different language implementation, Inference Engine 17 and Knowledge Base 14 design need not change. Only the access path needs to be rewritten using the designated language.

Compiler/Executor

After Source Program 19 is generated, Compiler/Executor 20 is used to compile Source Program 19 into executable code. The compiled program is then executed to produce the report. In this embodiment, Compiler/Executor 20 is the QUIZ part of POWERHOUSE fourth generation language.

ALTERNATIVE EMBODIMENTS

Several additional embodiments are also taught, as will now be described.

Figure 7:
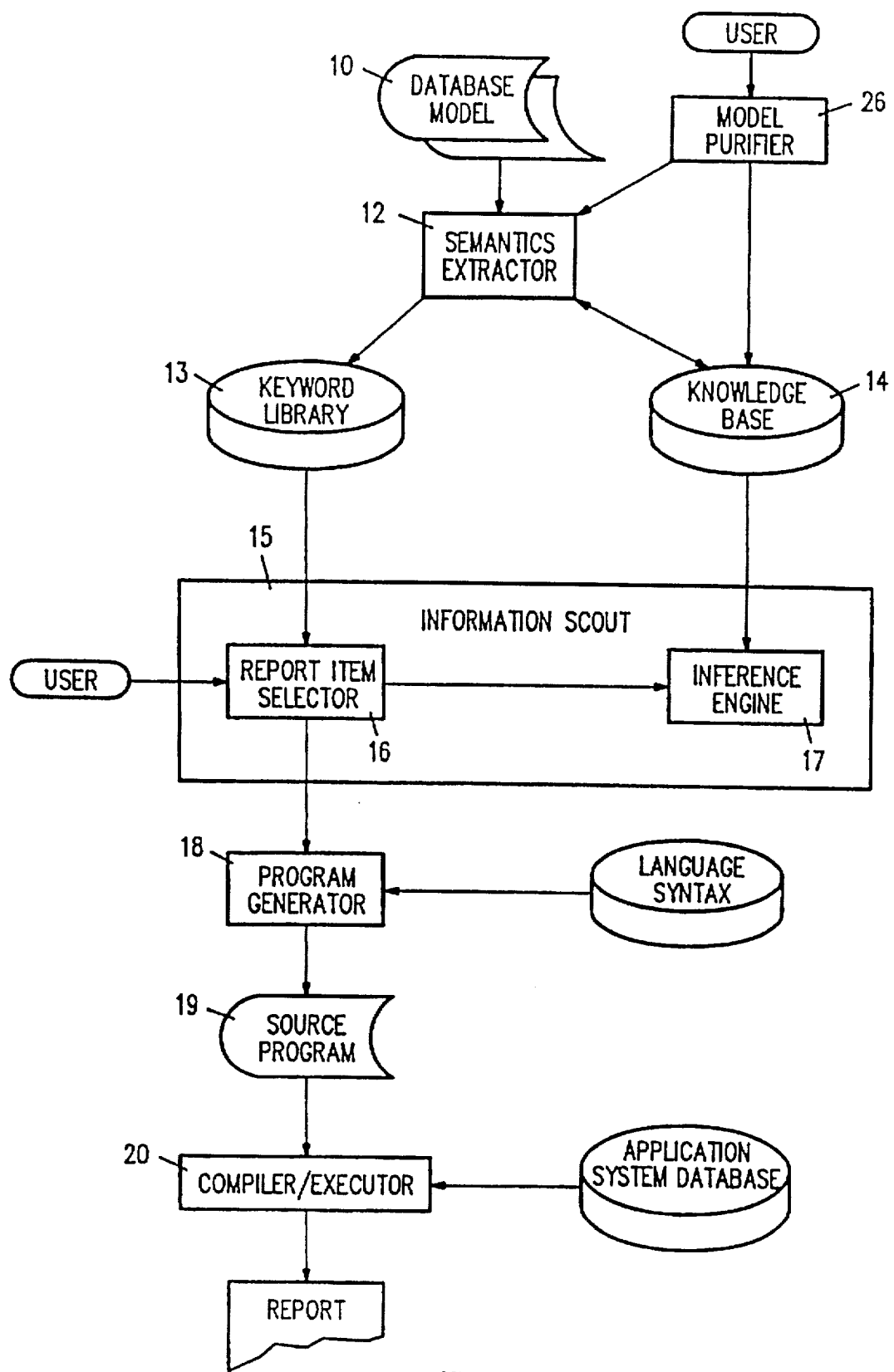
FIG. 7 is a flow chart depicting an alternative embodiment of this invention including a model purifier in accordance with this invention.

In one embodiment, a Model Purifier 26 is included which allows a user to add or alter the key type and binary relationships in Knowledge Base 14 (FIG. 7). The Model Purifier interfaces with Semantics Extractor 12 to change Knowledge Base 14 accordingly.

In another embodiment, the functionality of Knowledge Base 14 is extended in order to store items that are derived from items in the database model. In this embodiment, the Model Purifier allows a user to input the specifications for the derived items. Derived items can also be obtained from source code of applications programs that access the database, in which case Semantics Extractor 12 serves to extract the derived item specifications from these programs. These derived items and their related database items together form a pseudo database file. Semantics Extractor 12 then uses this pseudo file to derive new binary relationships with normal database files and build new basic knowledge threads. The new binary relationships and new knowledge threads are then stored in Knowledge Base 14. In this embodiment, the functionality of Program Generator 18 is also extended so that after Inference Engine 17 has generated the access path which may contain pseudo database files as well as normal database files, Program Generator 18 uses this access path to generate source programs to obtain information from the normal database files and the pseudo database files.

In another embodiment, another component called the Security Model Specifier 29 is included to allow a user to input a security model which specifies the items of the database model that the user can access. This is called item security. The security model also specifies the range of values within an item that the user can access. This is called value security. To support this security, the functionality of Knowledge Base 14 is extended to store the security model. Functionality of Report Item Selector 16 and Program Generator 18 are also extended to use the security model in the Knowledge Base so that the information obtained from the database at query time meets the security model specification.

In another embodiment, the functionality of the Model Purifier is extended to allow a user to specify multiple domains for a data item and the aliases for a file containing this item. In this embodiment, the functionality of Program Generator 18 is also extended to generate the appropriate file alias statements in the source program to access the database to satisfy the user query.

FIG. 7 depicts one embodiment of this invention in which Model Purifier 26 is used. Model Purifier 26 serves to allow a user to add or alter the key type of items in Knowledge Base 14, e.g. the key type of an item can be changed from unique to repeating key. Model Purifier 26 is also used to allow a user to alter the binary relationships between database files located within Knowledge Base 14.

The rationale for the use of Model Purifier 26 in accordance with this embodiment of the present invention is that in some applications the database model or the application programs that access the database may not be rich enough for Semantics Extractor 12 to extract the necessary semantics including file linkages for the user to perform certain queries. Model Purifier 26 allow the user to input the additional semantics to satisfy these queries.

Figure 8:
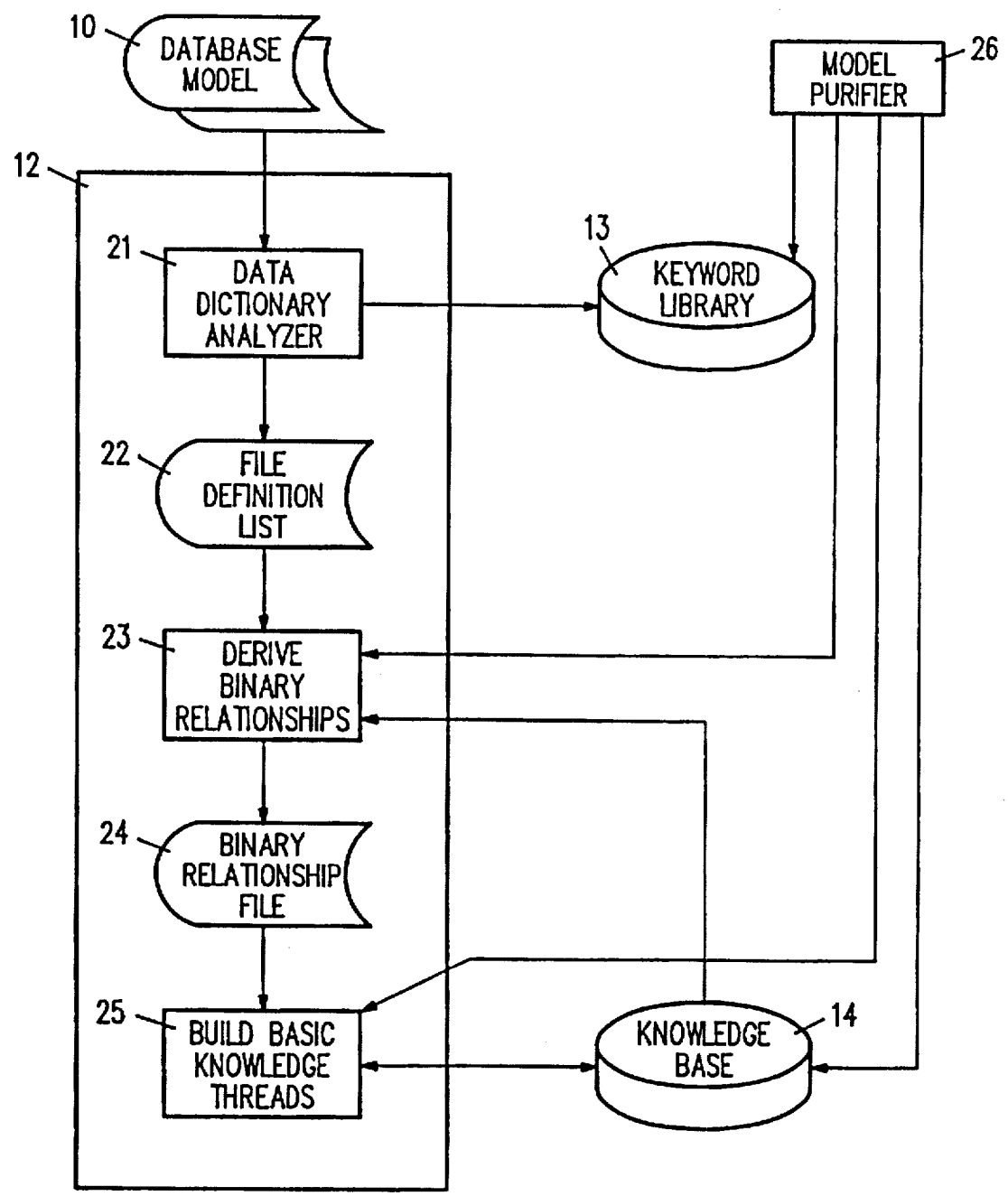
FIG. 8 is a flow chart depicting one embodiment of a semantics extractor constructed in accordance with the teachings of this invention interfacing with a model purifier.

FIG. 8 shows one embodiment of this invention in which Semantics Extractor 12 is extended to interface with Model Purifier 26. If the key types are altered, Model Purifier 26 activates Semantics Extractor 26 to re-derive the binary relationships and to rebuild the knowledge threads in Knowledge Base 14. If the binary relationships are altered, Model Purifier 26 activates Semantics Extractor 14 to rebuild the knowledge threads.

A user may specify an item or items to be reported that may not be found in Database Model 10. Examples of such items are as follows, which we called derived items as they are obtained by defining using the items of the database files:

| | Derived Item | Defined as |
|---|---|---|
| (i) | Employee-Name | Firstname of Employee file + Lastname of Employee file |
| Note: | Firstname & Lastname are items of database file Employee | |
| (ii) | Sales-Commission | Sales-Amount of Invoice file × Commission Rate of Commission Table file |
| Note: | Sales-Account and Commission Rate are items of database file Invoice and Commission-Table, respectively | |
| (iii) | Total-Sales | sum of Sales-Amount of Invoice file for each month of the year |
| (iv) | Ratio-of-Jan-Sales to-Total-Sales | (Sales-Amount of Invoice file for January)÷(Total-Sales derived from (iii) above) |

Figure 9:
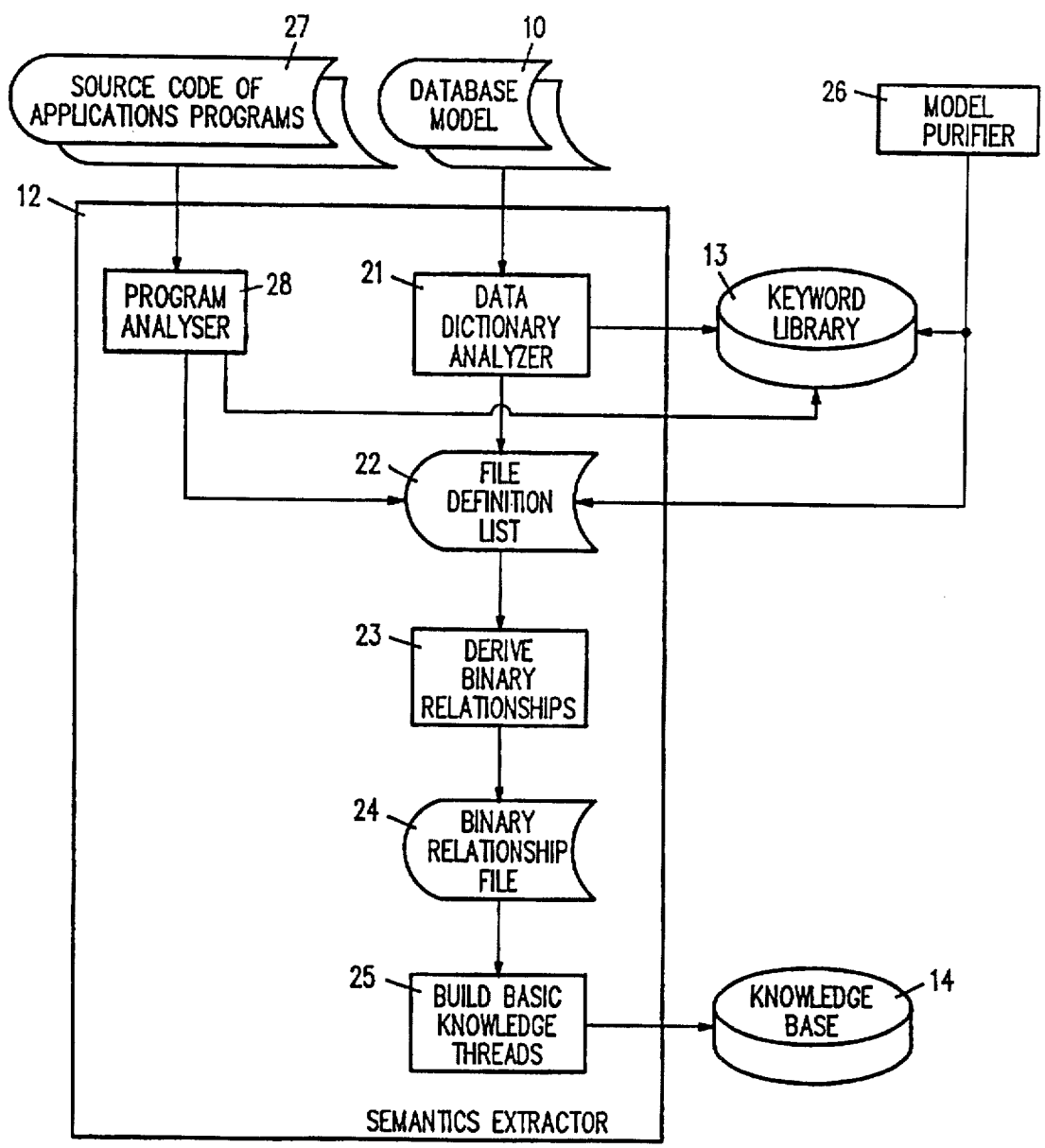
FIG. 9 is a flow chart depicting an alternative embodiment of a semantics extractor including a program analyzer in accordance with the teachings of this invention.

These derived items can be obtained from direct user input into Knowledge Base 14 or from Source Code of Application Programs 27 that access the database. To obtain such derived items from direct user input, the functionality of Model Purifier 26 is extended to meet this requirement. To obtain such derived items from Applications Programs 27, the functionality of Semantics Extractor 12 is extended with Program Analyzer 28 (see FIG. 9) to extract the derived items from these programs. In addition to the definitions of the derived items, the data type, size, and format of these derived items are also extracted from Applications Programs 27 by Program Analyzer 28 of Semantics Extractor 12. These derived items and their related database items together form a pseudo database file which is included in File Definition List 22 (see FIG. 9). Semantics Extractor 12 then uses this pseudo file in File Definition List 22 to derive new binary relationships with normal database files in File Definition List 22 and build new basic knowledge threads. The new binary relationships and new knowledge threads are stored in Knowledge Base 14. Besides the Model Purifier 26 and Semantics Extractor 12, the Program Generator 18 is also extended so that after the Inference Engine has generated the access path which may contain pseudo database files as well as normal database files, the Program Generator 18 uses this access path to generate source programs to obtain information from the normal database files and pseudo database files.

The following is a description of one embodiment of an algorithm suitable for use by Program Analyzer 28 of Semantic Extractor 12 to extract the derived items in accordance with the teachings of this invention:

a. From a single pass application program

A single pass application program is a program that contains only one database access statement.

Step 1: Extract the database files that are accessed in the application program.
    For each database file accessed
        Extract the list of items of database file.
        Store this list and the database file name as a pseudo database file in the knowledge base.
    Next database file Step 2: Extract the list of derived items and their definitions from the application program
    For each derived item
        Scan for the data type, size and format, Store the derived item name, its definition, data type, size and format in the same pseudo database file obtained from step 1 above.
    Next derived item b. From a multiple pass application program A multiple pass application program consists of many single pass application program "stringed" together with the output of the previous pass being used as input by the current pass.

Step 1: Create a new pseudo database file 1 for the first pass (i=1) using the steps of the single pass application program above.

Step 2: For each of the remaining passes i.e. i=2 to n with n being the last pass,
Create a pseudo database file i
Store the location of the previous database pseudo file (i−1) in pseudo database file i.

These derived items are then presented to the user together with the items from the database model for the user to select from in order to satisfy the user query.

In order to generate a program from the access path inferred by Inference Engine 17 that may contain pseudo database files, in addition to the above described extension of the functionality of Model Purifier 26 and Semantics Extractor 12, the functionality of Program Generator 18 is also extended as follows:

Step 1: Examine the access path generated by the Inference Engine 17.
Step 2: For every file in the access path:
  If it is a pseudo database file,
  Then
    (i) generate source program to produce data for the pseudo database file using the derived item definitions; and
    (ii) generate source program to extract the information from both the database and the data of the pseudo database file produced by the program of step 2 (i) above.
  Next file In another embodiment, a security model specifies the items a user can access (item security) and the range of values within an item the user can access (value security). In item security, a user is assigned access rights to a subset of the list of items available in Knowledge Base 14. In value security, a user is assigned access rights to a range or ranges of values within an item in Knowledge Base 14. For example, the access rights could be DEPT-NO=101, SALARY <2000, or SALARY of PAY file if EMP-GRADE of EMPLOYEE file >8.

Figure 10:
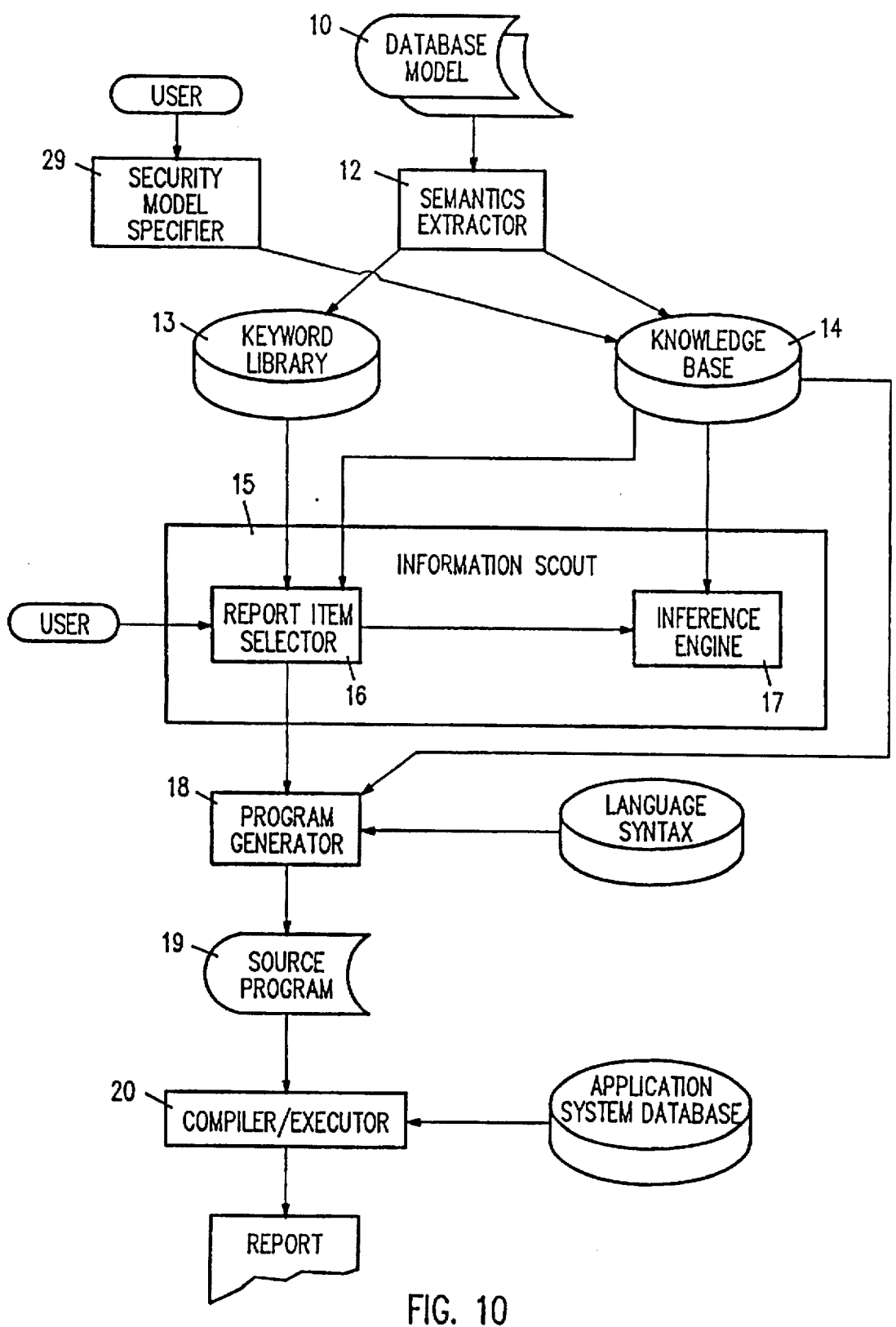
FIG. 10 is a flow chart depicting an alternative embodiment of this invention including a security model specifier.

FIG. 10 shows the Main Flowchart of one embodiment of the present invention which supports a security model. As shown in FIG. 10, Security Model Specifier 29 is provided for the user to input the security model into Knowledge Base 14. Also, in accordance with this embodiment, the functionality of Report Item Selector 16 and Generate File List 27 module (FIG. 4) of Information Scout 15, as well as Program Generator 18 are extended to support the security model as is now explained.

In one embodiment, the functionality of Report Item Selector 16 is extended such that only the items defined in the security model that are accessible by the user will be presented to the user for selection at query time.

In one embodiment, the functionality of Generate File List module 27 is extended to perform the following:
Step 1:
  For each query item selected Retrieve the file(s) containing the query item.
  Next query item
Step 2:
  For each file retrieved in step 1
    For each item in the file
      Retrieve any value security defined
    Next item
  Next file
Step 3:
  For each value security retrieved in steps 1 and 2
    If the security definition involves value from another file
    Then add the file to the file list for inferring the access path
  Next value security In one embodiment of this invention, the functionality of Program Generator 18 is extended to perform the following:
Step 1:
  For each query item selected
    Retrieve any value security defined on the item.
    Retrieve the file(s) containing the query item.
  Next query item
Step 2:
  For each file retrieved in step 1
    For each item in the file
      Retrieve any value security defined
    Next item
  Next file
Step 3:
  For each value security retrieved in step 2
    Join the value security definition using the AND condition.
  Next value security In yet another embodiment of this invention, the functionality of the Model Purifier is extended to specify multiple domains for a data item. An example of an item with multiple domains is Code Id of a database file called Master Code which may contain 2 items, namely Code Id and Code Description. The data for the Master Code file could, by way of example, be as follows:

| Code Id | Code Description |
|---------|------------------|
| RACE01  | Chinese          |
| RACE02  | Caucasian        |
| .       |                  |
| .       |                  |
| CITY01  | San Francisco    |
| CITY02  | Singapore        |
| .       |                  |
| .       |                  |

Figure 12:
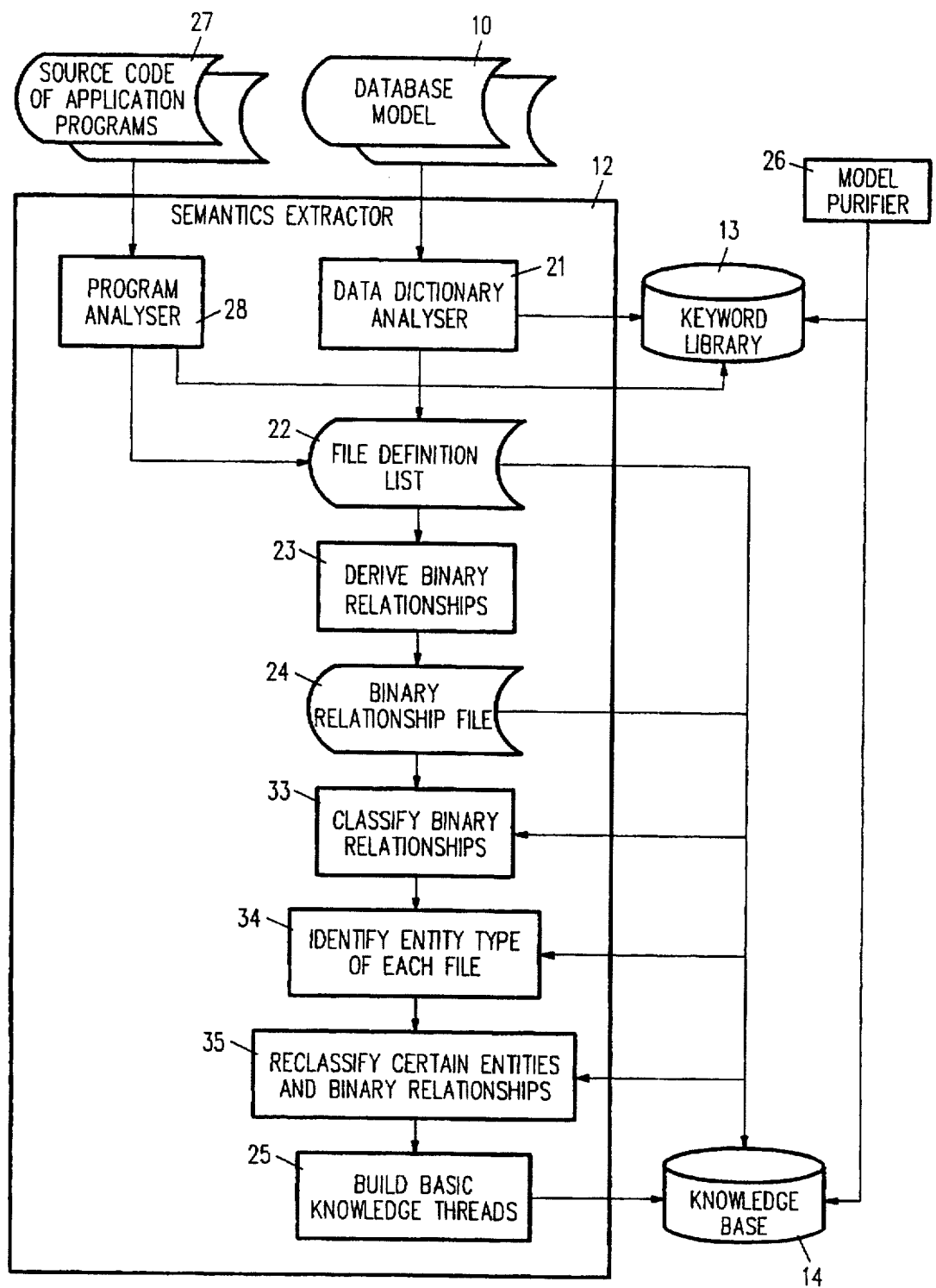
FIG. 12 is a flow chart depicting an alternative embodiment of a semantics extractor to extract additional semantics in the form of types of binary relationships and entity types of files in order for the class generator to generate class definitions.

In this example, this file is used to store codes for races and cities. However, races and cities are two separate domains. To break the codes into the two separate domains, the Code Id must be redefine as Race Code and City Code. The Master Code file will then have the following file aliases:

Race Master Code to contain Race Code Id
City Master Code to contain City Code Id To support this multiple domain for an item, we need to extend the Model Purifier to allow a user to specify the multiple domains and the corresponding file aliases. FIGS. 12 and 13 depict one embodiment of a main flowchart and Semantics Extractor 12 of the present invention which are capable of supporting multiple domains. The redefined items, eg Race Code Id and City Code Id, are stored in Keyword Library 13 and the alias file(s) are stored in Knowledge Base 14. In this embodiment, the functionality of Program Generator 18 is extended to identify the alias file(s) in the access path generated by Inference Engine 17 and to generate the necessary alias file(s) statements in the source program.

There are also a number of alternative embodiments of this invention related to how the Knowledge Base is physically implemented. The various forms of implementations can be considered in the following manner:

a. Precreated versus Run-time Creation b. Permanent Storage versus Temporary Storage c. Outside the Database Model versus Inside the Database Model In precreated mode, the Knowledge Base is created once and used for every query over a period of time. Should the Database Model change, then the Knowledge Base is recreated to properly reflect the changed Database Model.

In run-time mode, the Knowledge Base is created at query time for every query, regardless of whether the Database Model has or has not changed since a previous query.

In permanent storage, the Knowledge Base is usually implemented in secondary storage devices such as a disk drives. In temporary storage the Knowledge Base is implemented in memory such as RAM (random access memory). A Precreated Knowledge Base is preferably (although not necessarily) implemented in permanent storage while a Run-Time Knowledge Base is preferably (although not necessarily) implemented in temporary storage. The reason is that as precreated knowledge is created once and reused many times, it would be beneficial to keep it permanent so that even if the electrical power to the computer system is switched off, the Knowledge Base is retained and can be used again once power is restored. In run-time mode, as the Knowledge Base is created at query time and not reused for the next query, it is not necessary to implement the Knowledge Base in permanent storage.

In POWERHOUSE fourth generation language, the database model is implemented in the data dictionary. In SQL database language, the database model is implemented in the system catalog.

In one embodiment of the present invention, the Knowledge Base is implemented outside the data dictionary or system catalog. In an alternative embodiment of the present invention, the Knowledge Base is implemented to reside partially or fully inside the data dictionary or system catalog, as the data dictionary or system catalog is a form of storage that can contain the Knowledge Base.

GENERATION OF CLASSES AND THEIR TRANSLATION INTO ENTITY-RELATIONSHIP MODELS

An additional embodiment is taught as will now be described. The purpose of this embodiment is to provide another way for a user to interface with Report Item Selector 16 to formulate this query. Instead of a long list of items for a user to pick as described earlier the user is initially prompted for a class to pick out of a number of classes that make up his application. An entity-relationship (E-R) model of the selected class is then presented to the user for selection of the desired attributes. The desired attributes then constitute a designation of the information to be extracted from the database. It is also possible for the user to formulate the query by selecting the desired attributes from two different classes.

This invention introduces a way of selectively grouping the database files into what we called classes and translating each class definition into an E-R model. These classes represent the different types of high-level objects that make up the application, e.g. employees, customers, orders, invoices, etc.

Figure 11:
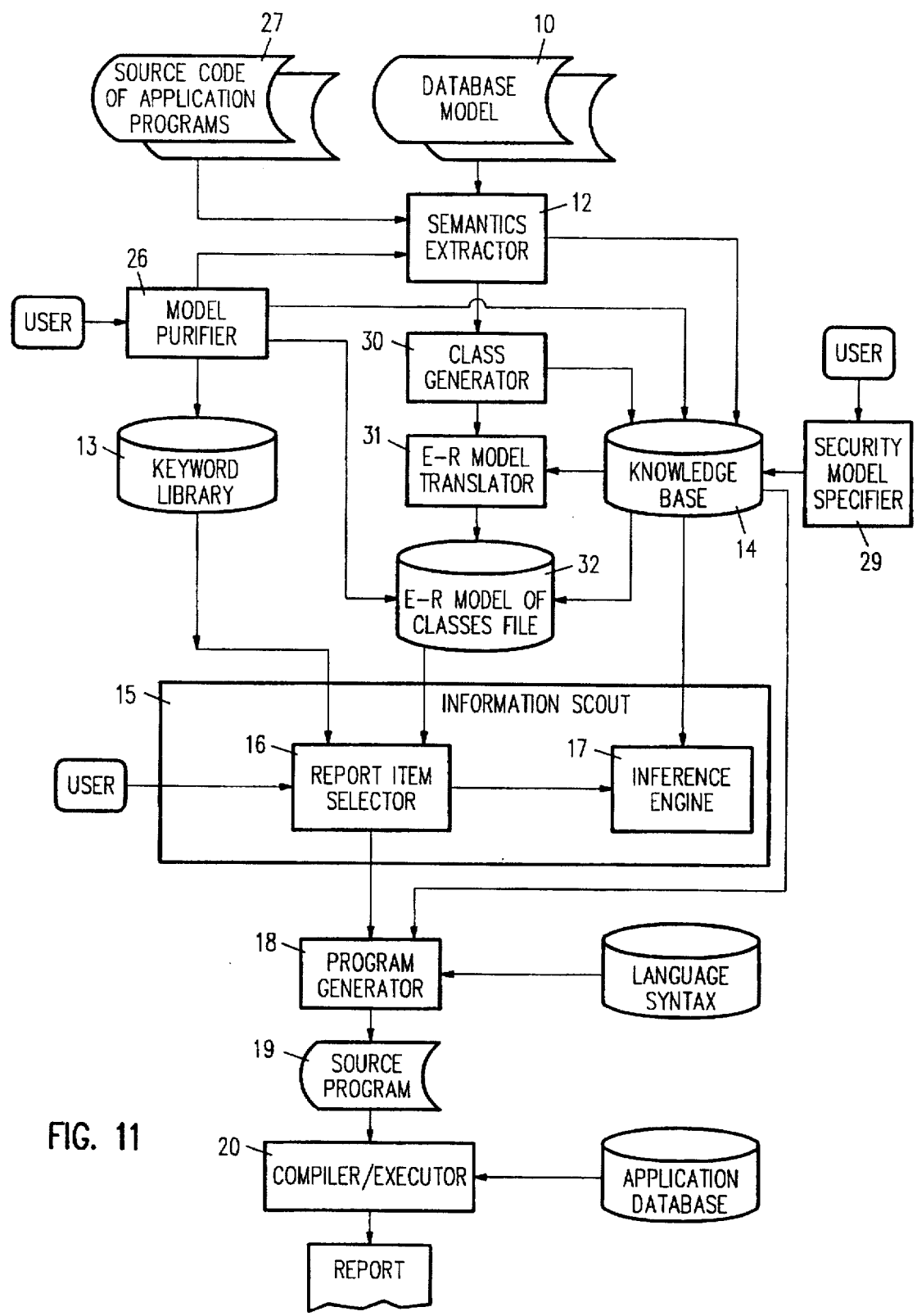
FIG. 11 is a flow chart depicting an alternative embodiment of this invention which includes a model purifier, a security model specifier, an alternative embodiment of a semantics extractor, a class generator, and an entity-relationship (E-R) model translator.

This embodiment, as shown in FIG. 11, involves the following:

the extension of Semantics Extractor 12 to extract more semantics from Database Model 10 the addition of Class Generator 30 the addition of E-R Model Translator 31 the addition of E-R Model of Classes File 32

Extension of Semantics Extractor 12

FIG. 12 is a flowchart of one embodiment of this invention utilizing Semantics Extractor 12 which is extended to support the extraction of additional semantics from the Database Model 10. There are several additional parts to this embodiment.

Classify Binary Relationships (BR)

Classify Binary Relationships step 33 classifies each binary relationship in Binary Relationships File 24 into one of the following types, in this embodiment:

has_children has_wards has_subtype

We shall now describe these three different types of binary relationships and explain how they can be identified from the key types of the items of the database files.

Earlier we have described six kinds of file linkages, namely

UR (unique key to repeating key)

RU (repeating key to unique key)

NU (non-key to unique key)

UU (unique key to unique key)

RR (Repeating key to repeating key)

NR (non-key to repeating key)

Of these six kinds, both the RR and NR combination should not exist in a normalized data model as they represent a bad file design.

Let us now consider the remaining four kinds of file linkages. For the UR kind, there are two possible types of binary relationships that can exist, namely has_children has_wards Let us explain the meaning of these two types with examples. Suppose we have an EMPLOYEE file with Emp_No as a unique key and another file called SKILLS to contain the skills of every employee. The SKILLS file has a repeating key item called Emp_No and a non-key item called Skill but no unique key. The binary relationship between these two files is as follows:

| Source File | Item | Target File | Item | Relationship |
|---|---|---|---|---|
| EMPLOYEE | Emp_No | SKILLS | Emp_No | UR |

This binary relationships is a "has_children" type because EMPLOYEE is not only related to SKILLS but the relationship is one where EMPLOYEE considers SKILLS as its "children". This is because the records of SKILLS can only be created if their corresponding EMPLOYEE record exists. This "has_children" type of UR binary relationship can be identified by the fact that the source file of the binary relationship has a unique key but the target file has a repeating key but no unique key.

Let us consider another example involving 3 files as follows:

| File | Unique Key | Repeating Key |
|---|---|---|
| CHAPTER | Chap_No | — |
| SECTION | Chap_No, Sect_No | Chap_No |
| PARAGRAPH | Chap_No, Sect_No, Para_no | Chap_No, Sect_No |

In this case CHAPTER has a unique key called Chap_No and no repeating key. SECTION has a composite unique key and a repeating key within the composite unique key. These files have the following binary relationships:

| Source File | Item | Target File | Item | Relationship |
|---|---|---|---|---|
| CHAPTER | Chap_No | SECTION | Chap_No | UR |
| SECTION | Chap_No, Sect_No | PARAGRAPH | Chap_No, Sect_No | UR |

Both these binary relationships are "has_children" type because records of SECTION can only EXIST if the corresponding record of CHAPTER exists. Similarly, records of PARAGRAPH can only exist if the corresponding record of SECTION exist. These "has_children" type of UR binary relationships can be identified by the fact that the source file and target file have a unique key and the target item is a repeating key within the unique key of the target file as well as the binary relationship being UR.

Consider another example where a CUSTOMER file has Cust_No as its unique key and another file INVOICES has Inv_No as its unique key and Cust_No as its repeating key. They both have a binary relationship as follows:

| Source File | Item | Target File | Item | Relationship |
|---|---|---|---|---|
| CUSTOMERS | Cust_No | INVOICES | Cust_No | UR |

This binary relationship is a "has_wards" type. In this case, we cannot consider CUSTOMER as having INVOICES as its "children" since INVOICES have their own identity through their own unique key, namely Inv_No. Instead, we could consider CUSTOMER as a "guardian" having INVOICES as its "wards" because INVOICES belong to their respective CUSTOMER.

A "has_wards" type can be identified by the fact that both the source and target files have a unique key and the target item is not part of the target file unique key as well as the binary relationship being UR.

Let us next consider the NU and RU binary relationships. The RU binary relationships are the inverse of the UR Binary relationships. We therefore classify them as either the "inverse_of_has_children" or the "inverse_of_has_wards". As for the NU binary relationships, we create an inverse of it and assign to this inverse a "has_wards" type. We then store it in Knowledge Base 14. For example, suppose we have an EMPLOYEE file having a NU binary relationship with a BRANCHES file using the Branch_Code item from both files as follows:

| Source File | Item | Target File | Item | Relationship |
|---|---|---|---|---|
| EMPLOYEE | Branch_Code | BRANCHES | Branch-Code | NU |

We create an inverse as follows with the type specified as "has_wards":

| Source File | Item | Target File | Item | Type |
|---|---|---|---|---|
| BRANCHES | Branch_Code | EMPLOYEE | Branch_Code | has_wards |

This binary relationship is then stored in Knowledge Base 14.

Lastly let us consider the UU binary relationship. Such a binary relationship is called a "has_subtype" type. Consider for example, a file called EMPLOYEE with Emp_No as its unique key and two other files MONTHLY_RATED_EMP and DAILY_RATED_EMP both of which also have Emp_No as their unique key. As an example, an employee is either a monthly rated employee or a daily rated employee but not both. We consider this as EMPLOYEE having MONTHLY_RATED_EMP and DAILY_RATED_EMP as its subtypes. The following binary relationships between EMPLOYEE and the two other files with EMPLOYEE as the source file reflect this "has_subtype" type of binary relationships:

| Source File | Item | Target File | Item | Type |
|---|---|---|---|---|
| EMPLOYEE | Emp_No | MONTHLY_RATED_EMP | Emp_No | UU |
| EMPLOYEE | Emp_No | DAILY_RATED_EMP | Emp_No | UU |

If a file has more than one subtype it is possible to automatically identify which of the two opposite UU binary relationships is a "has_subtype" and which the "inverse of has subtype" by comparing them with another pair of opposite UU binary relationships. The ones with the same source file are then the "has_subtype". However, it is not possible to do so if a file has only one subtype. In a later section of this patent description, we explain that a user will have to input this knowledge using Model Purifier 26. (Note: In the SQL language using primary keys and foreign keys, it is possible to automatically identify which of the two opposite binary relationships is a "has_subtype" even if a file has only one subtype.)

We earlier describe the extension of Model Purifier 26 to allow an user to manually specify multiple domain and corresponding file aliases. In this embodiment, this process can now be automated using the binary relationships. We shall now describe how the procedure Derive Binary Relationship 23 can be further extended to identify files that requires file aliases to be defined and to define these file aliases. A file that require file aliases to be defined can be identified by the fact that there are more than one binary relationships of the NU or RU kind which has the same target file and item. For example, suppose there are two NU binary relationships as follows:

| Source File | Item | Target File | Item | Type |
|---|---|---|---|---|
| EMPLOYEES | Race_Code | MASTER_CODE | Code | NU |
| EMPLOYEES | Citizenship_Code | MASTER_CODE | Code | NU |

The target file, namely MASTER_CODE, and target item, namely Code, is the same for both binary relationships. For each such binary relationships, we create a file alias of the target file and replace the target file of the binary relationship with the file alias, e.g. for the above two binary relationships, we create the following file aliases for the MASTER_CODE file and store them in the Knowledge Base 14:

EMPLOYEE_Race_Code

EMPLOYEE_Citizenship_Code and change the binary relationships to:

| Source File | Item | Target File | Item | Type |
|---|---|---|---|---|
| EMPLOYEE | Race_Code | EMPLOYEES_Race_Code | Code | NU |
| EMPLOYEE | Citizenship_Code | EMPLOYEES_Citizenship_Code | Code | NU |

Identify Entity Type of Each File

In Identify Entity Type of Each File step 34 a database file is classified as one of the following types:

kernel entity characteristic entity associative entity subtype entity pure lookup entity Kernel entities are entities that have independent existence, they are "what the database is really all about". In other words, kernels are entities that are neither characteristic nor associative, e.g. suppliers, parts, employees, orders, etc. are all kernel entities.

A characteristic entity is one whose primary purpose is to describe or "characterize" some other entity. For example, the file SKILLS which contains the SKILLS an employee has is a characteristic entity of the EMPLOYEE entity. Characteristic entities are existence-dependent on the entity they described which can be kernel, characteristic, or associative.

An associative entity is an entity whose function is to represent a many-to-many (or many-to-many-to-many, etc.) relationship among two or more other entities. For example, a shipment is an association between a supplier and a part. The entities associated may each be kernel, characteristic, or associative.

A subtype is a specialization of its supertype. For example, as described earlier MONTHLY_RATED_EMP and DAILY_RATE_EMP are subtypes of EMPLOYEE.

Lastly, we have entities that look like kernel entities but should not be classified as one because their purpose is solely for lookup of code description.

Figures 1, 13A:
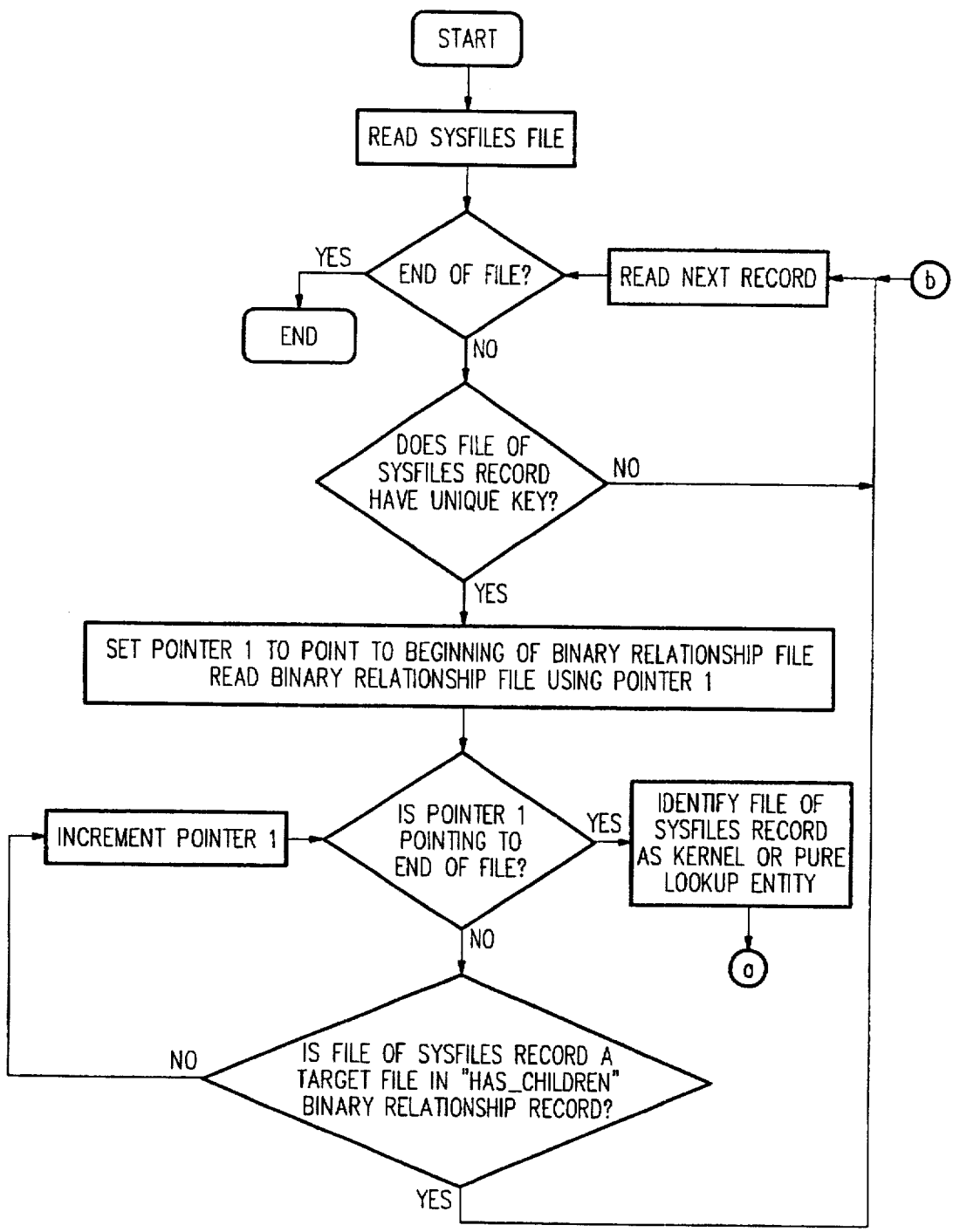

FIG. 13a describes the procedure to identify kernel and pure lookup entities. It first identifies those database files that are either kernel or pure lookup entities using the following rule:

1) Identify those database files that have a unique key.

2) Of these database files, eliminate those that are used as a target file in any "has_children" or "has_subtype" binary relationships.

These database files are either kernel or pure lookup entities. To distinguish between the two it next uses the following rule:

1) IF such a database file has no "children" or "sub-type", i.e. it is not a source file in any "has_children" or "has_subtype" binary relationship; AND 2) IF it is not a "ward" i.e., it is not a target file in any "has_wards" binary relationship;

3) THEN it is a pure lookup entity;

4) OTHERWISE it is a kernel entity.

Figure 13B:
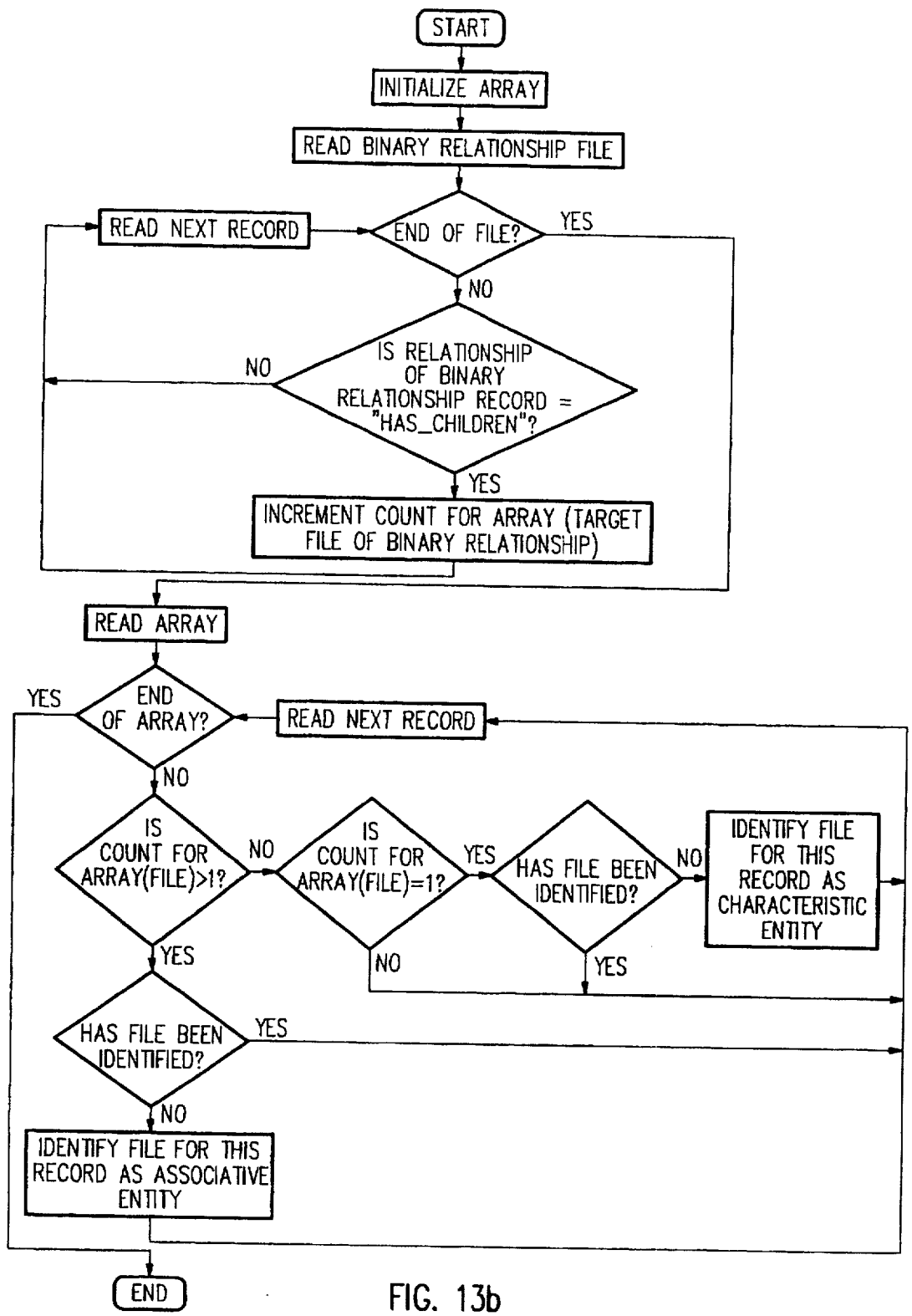
FIG. 13b is a flow chart depicting one embodiment of a procedure to identify characteristic and associative entities, suitable for use in the step of identify entity type of each file in the embodiment of FIG. 12.

FIG. 13b describes one embodiment of a procedure to identify characteristic and associative entities. It uses the following rule:

1) IF a database file appears more than once as a target file in "has_children" binary relationships, THEN it is an associative entity;

2) OTHERWISE, IF it appears only once, THEN it is a characteristic entity.

Subtype entities are easily identified as they are the target files in "has_subtype" binary relationships.

Note that the SYSFILES as used in FIG. 13a is a part of File Definition List 22 which has been redefined as consisting of two files, namely

SYSFILES

SYSFILEITEMS

SYSFILES is used to store the following:

file name indicator whether it is an alias file or a real file having alias files if alias file, its real file name entity type SYSFILEITEMS is used to store the following:

file name item name item type (e.g. character, numeric, date)

keytype of item, e.g. unique key, repeating key, or non-key

Reclassify Certain Entities and Binary Relationship 35

Even though we have earlier identified some files as kernel entities, some of these kernel entities should be reclassified as pure lookup entities. Consider for example a kernel entity EMPLOYEE having an associative entity LANGUAGE_SPOKEN whose other kernel entity is LANGUAGE. LANGUAGE_SPOKEN has two items, namely a repeating key called Emp_No and another repeating key called Language_Code. The LANGUAGE file has only two items, namely a unique key item called Language_Code and a non-key item called Language_Desc. Even though we earlier identified LANGUAGE as a kernel entity since it has LANGUAGE_SPOKEN as its "children", LANGUAGE should be reclassified as a pure lookup entity since it is used solely by the LANGUAGE_SPOKEN file to obtain the description of the Language_Code.

Figure 14:
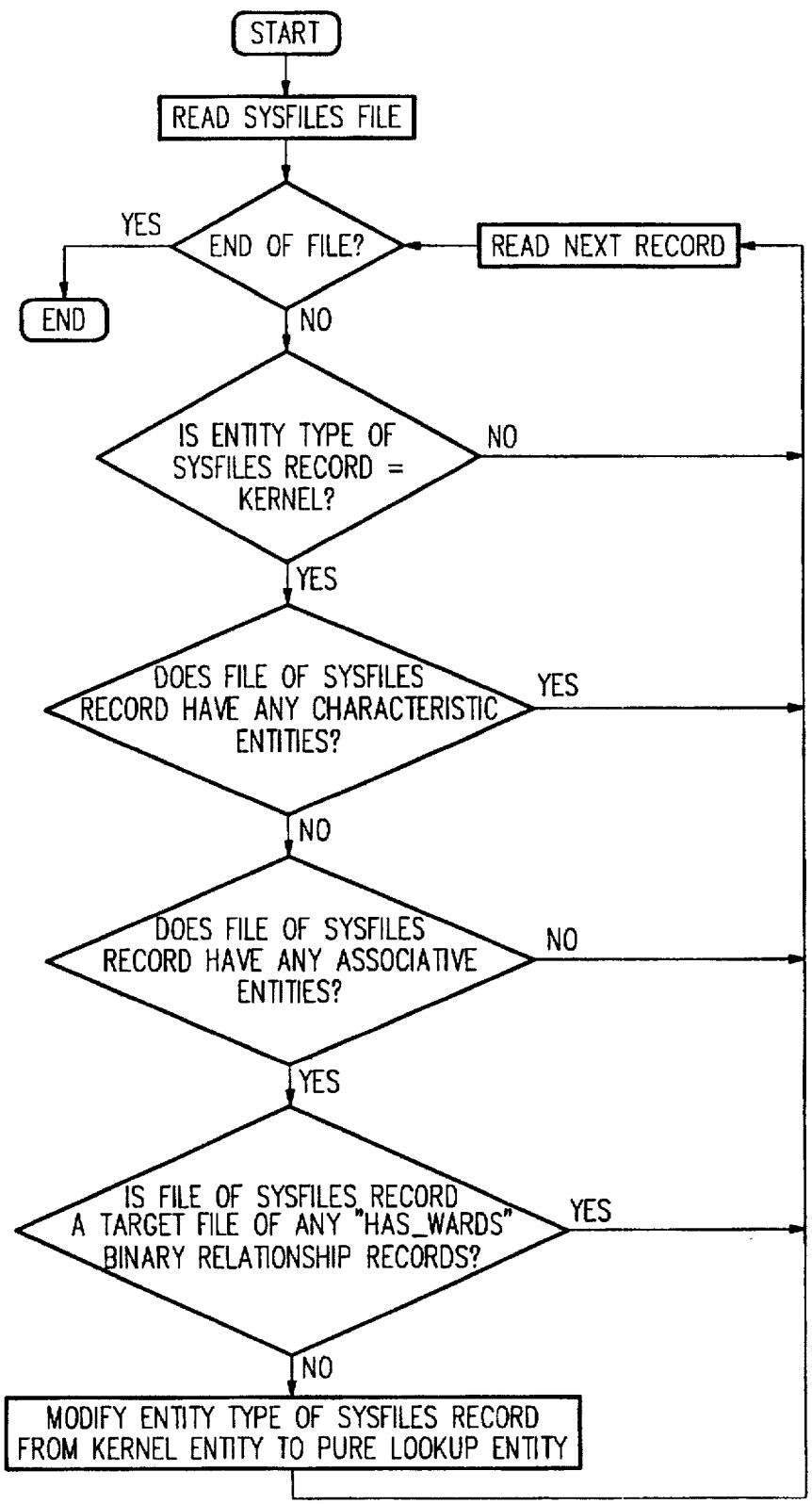
FIG. 14 is a flow chart depicting one embodiment of a procedure to reclassify kernel entities into pure lookup entities, suitable for use in the step of reclassify certain entities and binary relationships in the embodiment of FIG. 12.

FIG. 14 is a flow chart depicting one embodiment of a procedure to identify these kernel entities and modify them to pure lookup entities. It uses the following rule to do this:

1) IF a kernel entity has only associative entities and no characteristic entities; and 2) IF it is not a target file in any "has_ward" binary relationships;

3) THEN modify the kernel entity into a pure lookup entity. Also, modify the associative entities of this kernal entity into characteristic entities if the associative entities has only one other entity that associates it.

Next we access all those "has_children" and "has_wards" binary relationships whose source file is one of these pure lookup entities. We then modify them into a new type called "inverse_of_pure lookup" type. We use the word "inverse" as the lookup direction is not from source file to target file but from target file to source file.

Class Generator 30

Class Generator 30 (FIG. 11) generates a definition of a class for each kernel entity in the database and stores this definition as a Class Definition File (CDF) in Knowledge Base 14. A class is a cluster of files whose structure is a tree. The root of the tree is a kernel entity which defines the core attributes of the class. The tree has the following main branches:

(i) a branch for each of the subtypes of the root kernel entity (ii) a branch for each of the "wards" of the root kernel entity (iii) a branch for each of the characteristic entities of the root kernel entity (iv) a branch for each of the associative entities of the root kernel entity These branches are derived using the "has_subtype", "has_wards", and "has_children" binary relationships with the root kernel entity being the source file.

Each of the above subtype, characteristic, and associative entities could also have their own branches which are their characteristic or associative entities. The latter characteristic or associative entities could also have their own characteristic or associative entities, and so forth. These branches are derived using the "has_children" binary relationship with the target files of these binary relationships forming the new branches. The procedure of FIG. 15a and 15b together with the sub-procedure Include_File (list) of FIG. 16a and 16b are used to derive the above branches which are then stored as a set of lists in Class Definition File A (CDF A). An example of such a list is:

File=EMPLOYEE
item=Emp_No
File=BILLINGS
item=Emp_No
BR Type="has_children"
item=Proj_No
File=PROJECTS
item=Proj_No
BR type="inv_of_has_children"

This list contains a file EMPLOYEE, linked to a file BILLINGS, which is linked to file PROJECTS. The binary relationship (BR) type from EMPLOYEE to BILLINGS is "has_children" using the item Emp_No from both files and the BR type from BILLINGS to PROJECTS is "inv_of_has_children" using the item Proj_No from both files.

Let us now describe how a list in CDF A is produced using this procedure. It starts by initializing a list to the first kernel entity in SYSFILES. This kernel entity forms the root kernel entity of a class to be generated. Next it looks for a subtype entity of this kernel entity using a sorted SYSFILES and the Binary Relationships File 24. This file has been sorted in descending order of subtypes, kernels, associative, characteristics, and pure lookups. If one subtype entity is found, it is added to the list together with the name of the corresponding binary relationship type, which in this case is "has_subtype" and the names of the items used. It then calls on a sub-procedure Include_File (list), for example as depicted in FIG. 16a and 16b, to find associative and characteristic entities of the subtype entity. If a characteristic entity is found, it is added to the list together with the name of the corresponding binary relationship type which in this case is "has_children" and the names of the items used. The sub-procedure Include_File (list) is then called again, this time to find other associative entities or characteristic entities of the characteristic entity. If no such entity can be found the list is then written to the Class Definition File A (CDF A).

Besides these branches, the tree of a class also has what we called "lookup" branches originating from each node in the above branches. These "lookup" branches are derived using the "inv_of_has_wards" and "pure_lookup" binary relationships, with the node being the source file and the target file forming new branches. Furthermore, the new branches could also have their own new "lookup" branches and so forth. These subsequent "lookup" branches are formed using not only the "inv_of_has_wards" and "pure_lookup" binary relationships but also the "inv_of_has_children" binary relationships with the target file forming the new "lookup" branches. The procedure of FIG. 17 together with the sub-procedure Process_File of FIGS. 1a and 18b are suitable for use to derive these branches, which are then stored as a set of lists in Class Definition File B (CDF B).

Figure 18A:
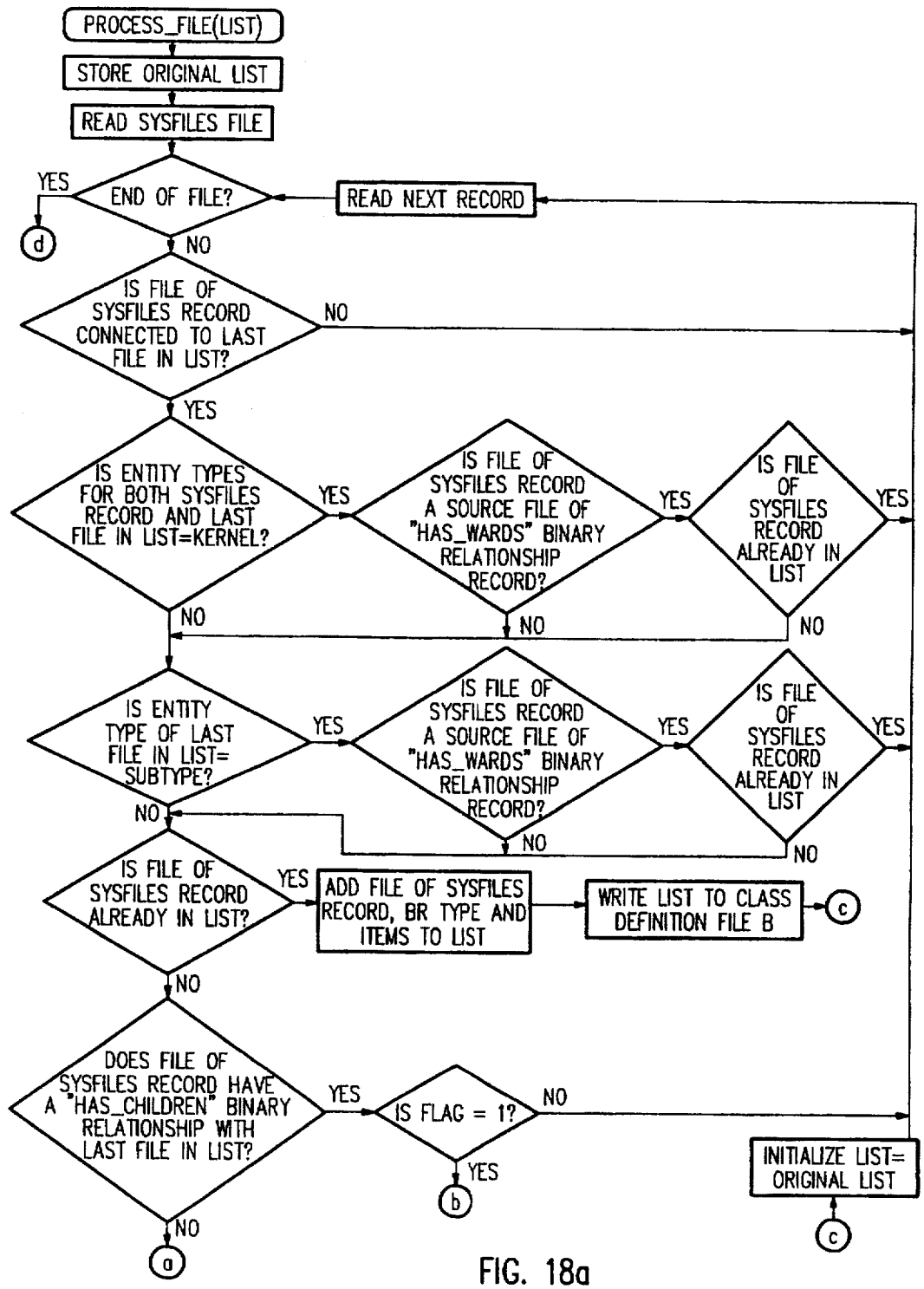

Let us describe one example of how a list in CDF B is produced using this procedure. It starts by reading in the first record of CDF A. A list is then initialized to the first file in this CDF A record. A check is made to see if this file has been processed before. Since it is not, the sub-procedure Process_File (list), for example as depicted in FIG. 18a and 18b, is then called to look for a "lookup" file for this file. If there is such a file, it is added to the lists together with the corresponding binary relationship type and the sub-procedure is called again. If no further "lookup" file can be found, the list is written to CDF B.

Let us now apply the above procedures on the exemplary personnel system below to generate the classes for this system.

| File | Items | Item Type | Key Type |
|---|---|---|---|
| EMPLOYEE | Emp_No | Numeric | Unique key |
| | Emp_Name | Character | Non-key |
| | Branch_No | Numeric | Non-key |
| | Race_Code | Character | Non-key |
| | Address | Character | Non-key |
| | Salary | Numeric | Non-key |
| MANAGER | Emp_No | Numeric | Unique key |
| | Co_Car_No | Character | Non-key |
| NON_MANAGER | Emp_No | Numeric | Unique key |
| | Union_M_No | Character | Non-key |
| BRANCH | Branch_No | Numeric | Unique key |
| | Branch_Name | Character | Non-key |
| | Br_Tot_Expenses | Numeric | Non-key |
| | Country_No | Numeric | Non-key |
| RACE_CODE | Race_Code | Character | Unique key |
| | Race_Desc | Character | Non-key |
| SKILLS | Emp_No | Numeric | Repeating key |
| | Skill | Character | Non-key |
| PROJECT | Proj_No | Numeric | Unique key |
| | Proj_Name | Character | Non key |
| | Cust_No | Numeric | Non-key |
| BILLINGS | Emp_No | Numeric | Repeating key |
| | Proj_No | Numeric | Repeating key |
| | Month | Date | Non-key |
| | Amount | Numeric | Non-key |
| CUSTOMER | Cust_No | Numeric | Unique key |
| | Cust_Name | Character | Non-key |
| EXPENSES | Branch_No | Numeric | Repeating key |
| | Month | Date | Non-key |
| | Adv_Exp | Numeric | Non-key |
| | Pers_Exp | Numeric | Non-key |
| COUNTRY | Country_No | Numeric | Unique key |
| | Country_Name | Character | Non-key |

Using extended Semantics Extractor 12 of FIGS. 11 and 12, the following binary relationships are derived:

| Source Film | Item | Target File | Item | Type |
|---|---|---|---|---|
| EMPLOYEE | Emp_No | SKILLS | Emp_No | has_children |
| EMPLOYEE | Emp_No | BILLINGS | Emp_No | has_children |

-continued

| Source File | Item | Target File | Item | Type |
|---|---|---|---|---|
| EMPLOYEE | Emp_No | MANAGER | Emp_No | has_subtype |
| EMPLOYEE | Emp_No | NON_MANAGER | Emp_No | has_subtype |
| BRANCH | Branch_No | EMPLOYEE | Branch_No | has_ward |
| BRANCH | Branch_No | EXPENSES | Branch_No | has_children |
| COUNTRY | Country_No | BRANCH | Country_No | inv. of pure_lookup |
| RACE_CODE | Race_Code | EMPLOYEE | Race_Code | inv. of pure_lookup |
| PROJECT | Proj_No | BILLINGS | Proj_No | has_children |
| CUSTOMER | Cust_No | PROJECT | Cust_No | inv. of pure_lookup |

Also, the entity type of each file in SYSFILES is as follows:

| File | Entity Type | Short Name of File |
|---|---|---|
| EMPLOYEE | Kernel | K1 |
| MANAGER | Subtype | S1 |
| NON-MANAGER | Subtype | S2 |
| BRANCH | Kernel | K2 |
| RACE_CODE | Pure Lookup | L1 |
| SKILLS | Characteristic | C1 |
| PROJECT | Kernel | K3 |
| BILLINGS | Associative | A1 |
| CUSTOMER | Pure Lookup | L2 |
| EXPENSES | Characteristic | C2 |
| COUNTRY | Pure Lookup | L3 |

Figure 15A:
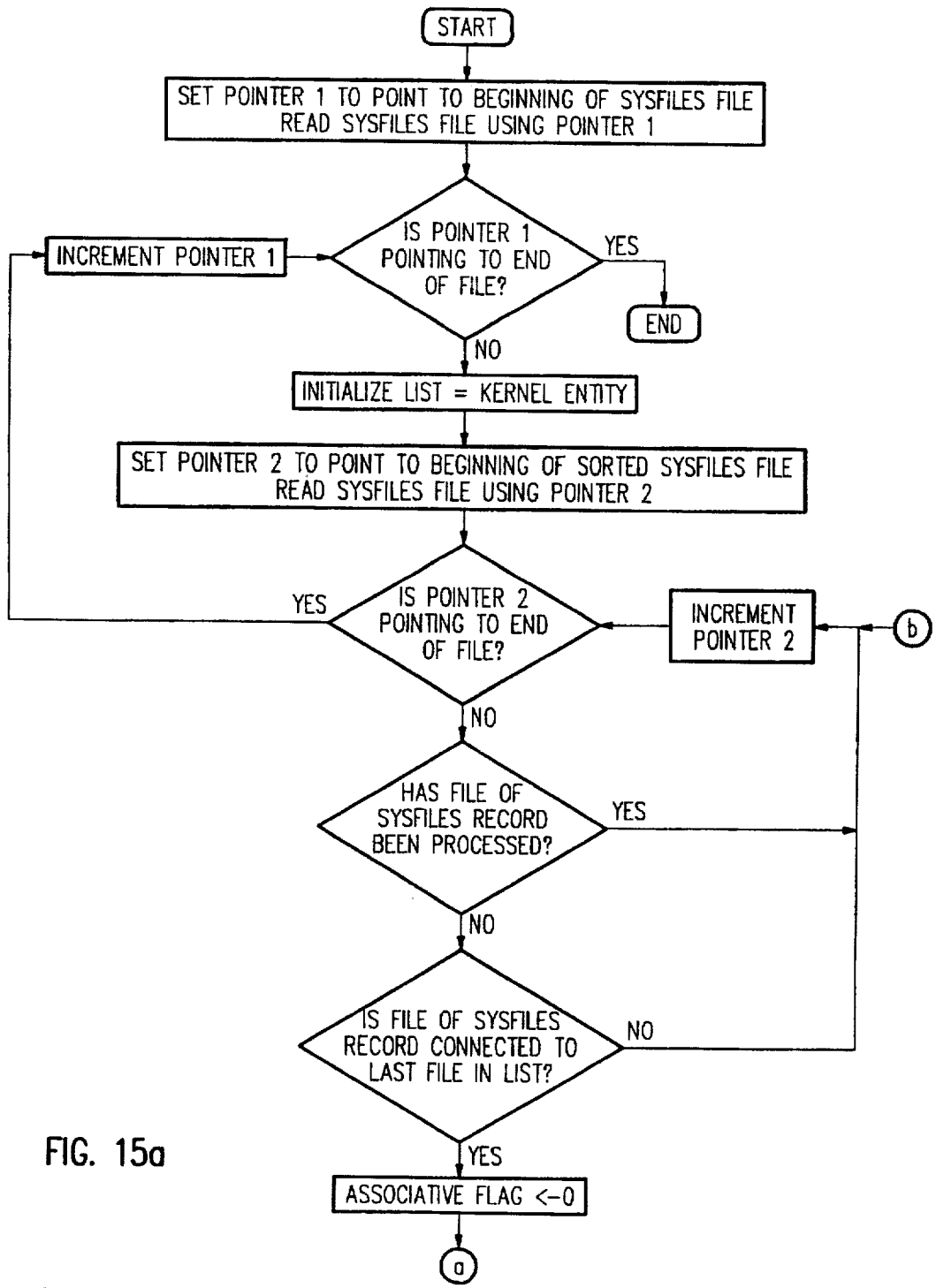
Figure 16A:
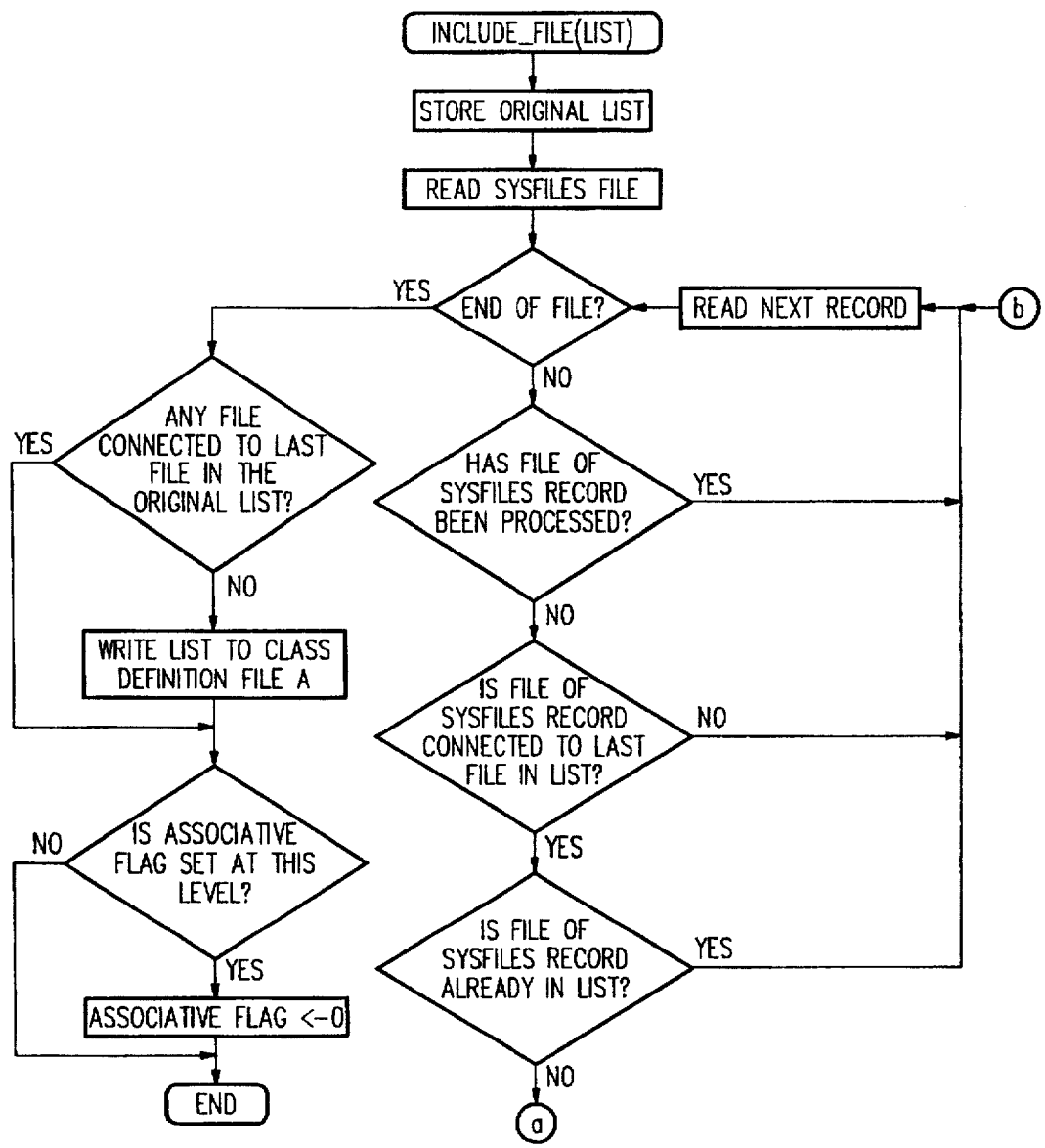

Let us first apply the exemplary procedure of FIGS. 15a and 15b on the personnel system example. It first initializes a list to the first kernel entity in SYSFILES which is EMPLOYEE (K1). This means that it is going to generate Class Definition File A for the EMPLOYEE class. Next it uses a sorted SYSFILES and the Binary Relationship File 24 to find other entities to add to this list. The sorted SYSFILES contains files in descending order of subtypes, kernels, associatives, characteristics and pure lookups. The next entity added to the list is S1 which is MANAGER, with the items being Emp_No and the BR type being "has_subtype". This list is then written to CDF A.

The list is initialized again to K1 and S2 added to it, with the items being Emp_No and the BR type being "has_subtype", after which it is written to CDF A.

After the subtypes have been processed, the procedure initializes list K1 and search for those kernel entities that are "wards" of K1. However, K1 has no "wards" and so there are no such entities to add to the list.

Next the procedure searches for associative entities of K1. K1 has one associative entity, namely BILLINGS (A1) so A1 is added to the list, with the items being Emp_No and the BR type being "has_children". Next the procedure includes PROJECTS (K3) in this list as it constitutes the other entity that associates A1, with the items being Proj_No and the BR type being "inv_of_has_children". This list containing K1, A1, K3 is then written to CDF A.

After this, the procedure initializes the list to K1 again and search for characteristic entities of K1. K1 has one characteristic entity, namely SKILLS (C1), so C1 is added to the list with the items being Emp_No and the BR type being "has_children". The list is then written to CDF A.

At this point CDF A contains the following lists:
 a list having K1, S1
 a list having K1, S2
 a list having K1, A1, K3
 a list having K1, C1

The procedure next generates the lists for the next kernel entity, namely BRANCHES (K2). K2 has no subtype and associative entities but it has (EMPLOYEE) K1 as its "ward". This produces the list K2, K1, with the items being Branch_No and the BR type being "has_wards". This list is written to CDF A. It also has EXPENSES (C2) as its characteristic entity. This produces the list K2, C2, with the items being Branch_No and the BR type being "has_children", which is also written to CDF A.

Finally, the list for the third and last kernel entity, namely PROJECTS (K3), is produced. However, there is only one list, namely
 a list having K3, A1, K1
since PROJECTS has an associative entity only which is BRANCH (A1), with K1 being the other entity that associates A1. In this list the items for K3 and A1 is Proj_No with the BR type being "has_children". The items for A1 and K1 is Emp_No with the BR type being "inv_of_has_children".

Figure 17:
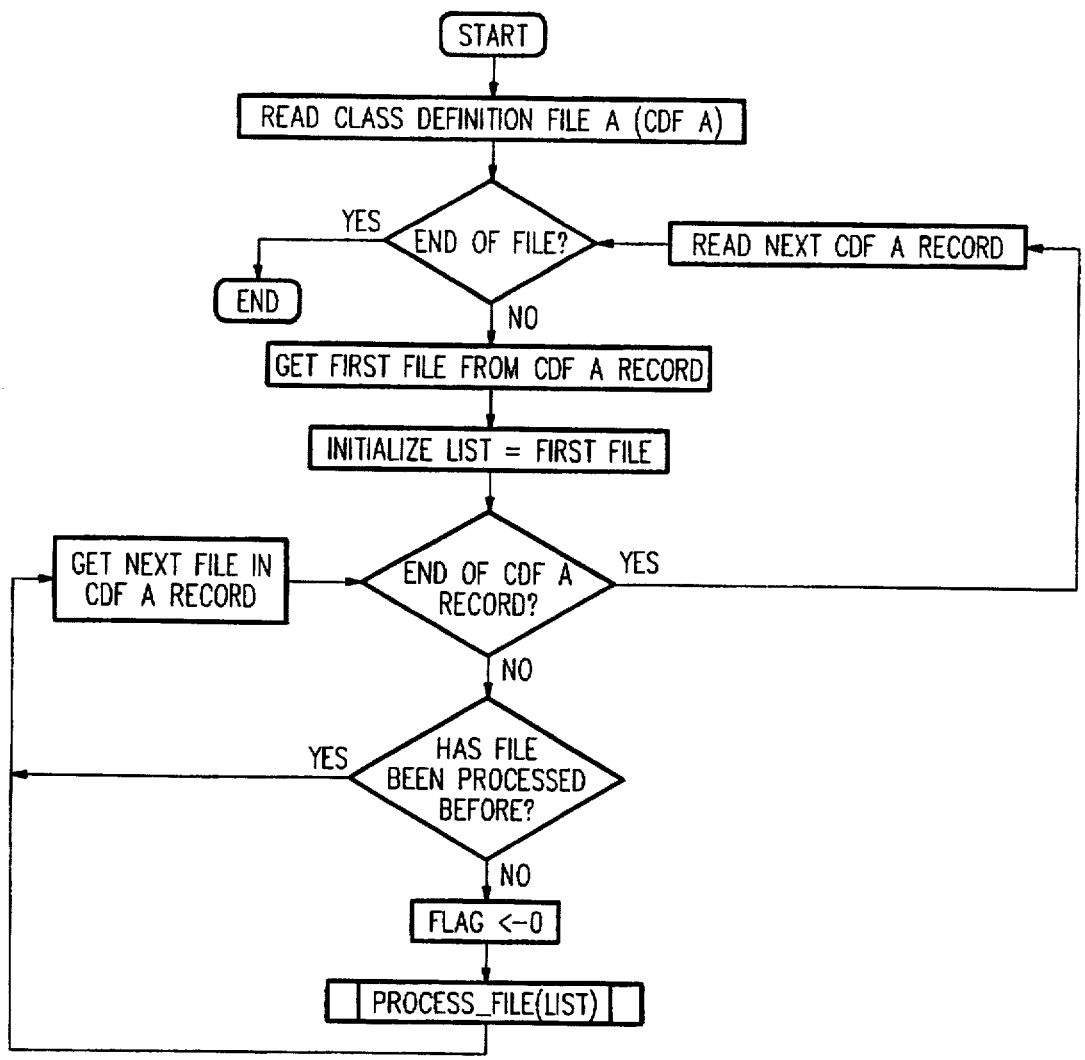
FIG. 17 is a flow chart depicting one embodiment of a procedure to generate class definition file B, suitable for use by the class generator in the embodiment of FIG. 11.

Let us next apply the exemplary procedure of FIG. 17 on the personnel system example. It uses the lists of CDF A derived earlier to generate the lists for CDF B. Using the same personnel system it first initializes a list to the first entity in the first list of CDF A, namely K1. It then adds to this list entities that are lookup entities to K1. A lookup entity is a target file in a "pure_lookup" or "inv_of_has_ward" binary relationships, with K1 as the source file. K1 looks up on BRANCH (K2), so K2 is added to the list with the items being Branch_No and the BR type being "inv_of_has_wards". Next a check is made on K2 to see if it too has lookup entities. K2 in fact has one, namely COUNTRY (L3). L3 is therefore added to the list with the items being Country_No and the BR type being "pure_lookup". At this point the list contains K1, K2, L3. Since L3 has no lookup entities, this list is written to the CDF B. Next the procedure returns to K2 to see if K2 has other lookup entities. Since it does not, the procedure returns to K1. It finds that K1 has another lookup entity, namely RACE_CODE (L1). The list containing K1, L3 with the items being Race_Code and the BR type being "pure_lookup", is then written to CDF B.

The next entity in the first list of CDF A is next processed. This entity is MANAGER (S1). It, however, does not have any lookup entities and so it is ignored.

As there is no more entity on the first list of CDF A, the first entity in the second list of CDF A is considered for processing. A check is made first to see if this entity has already been processed earlier. This entity is K1 which has been processed earlier and so it is ignored. The next entity is NON_MANAGER (S2) which has not being processed. However, it does not have any lookup entities and so it is ignored.

The above procedure is again applied for the next list of CDF A, which contains K1, A1, K3. As K1 has already been processed and A1 has no lookup entity, no list is produced for either of them. However, K3 (PROJECT) has a lookup entity, namely CUSTOMERS (L2). So the list K3, L2 is produced with the items being Cust_No and the BR type being "pure_lookup". It is written to CDF B. The next list of CDF A is K1, C1. However, since K1 has already been processed and C1 (SKILLS) has no lookup entities, both are ignored.

The above procedure is applied to the remaining lists in CDF A. In this example, only one list is produced, containing K2, L3 with the items being Country_No and the BR type being "pure_lookup".

Besides CDF A and CDF B, the Class Definition File also includes CDF C. CDF C includes a single list which contains all the pure lookup entities.

The CDF C for the personnel system example contains L1, L2, L3.

E-R Model Translator

E-R Model Translator 31 (FIG. 11) is used to produce an Entity-Relationship (E-R) model for each class using CDF A, CDF B and Binary Relationships File 24. Many different embodiments of an E-R model can be produced. The following describes one example of a procedure to produce one embodiment of an entity-relationship (E-R) model of a class for all the classes except the class containing the pure lookup entities. This procedure begins by creating another file identical to SYSFILEITEMS. This duplicate file is called TEMPFILEITEMS. Next, for each "inverse_of_pure_lookup" binary relationships in Binary Relationship File 24, it inserts all the items of the file used as source file in this binary relationship except those items of the file that are used as source items into this TEMPFILEITEMS at the point which corresponds to the target items of this binary relationship. Next, for each "has_children", "has_wards", or "has_subtype" type of binary relationships in Binary Relationship File 24, it deletes those items in TEMPFILEITEMS that are used as target items in such binary relationships.

The procedure then gradually builds the E-R model for each class making use of the resultant TEMPFILEITEMS. It first include all the items of the root kernel entity of the class into the E-R model of the class. These items are obtained from TEMPFILEITEMS. Next it applies the following Decision Tables 1 and 2 on the CDF A and CDF B of the class to determine the relationship names between two adjacent entities in the class which are not pure lookup entities.

DECISION TABLE 1

To define relationship names between two adjacent entities in the CDF A lists

| Rule | From Entity | To Entity | BR Type | Relationship Name |
|------|-------------|-----------|---------------|-------------------|
| 1 | K | S | has_subtype | K is a S |
| 2 | K | S | has_wards | K has S |
| 3 | K | K' | has_wards | K has K' |
| 4 | X | C | has_children | X has C |
| 5 | X | A | has_children | a. X has Y |
|   |   |   |   | b. X and Y have A |
|   |   |   |   | (Y is another entity |
|   |   |   |   | that associates A) |

DECISON TABLE 2

To define relationship names between two adjacent entities in the CDF B lists

| Rule | From Entity | To Entity | BR Type | Relationship Name |
|------|-------------|-----------|-----------------------|---------------------|
| 1 | X | C or A | inv_of_has_wards | X references C or A |
| 2 | K' | K | inv_of_has_wards | K' belongs to K |
| 3 | C or A | K' | inv_of_has_wards | C or A references K |
| 4 | C or A | K | inv_of_has_children | C or A belongs to K |

Legend:
X - kernel, subtype, characteristic, or associative entity
C - characteristic entity
A - associative entity
K,K' - kernel entities
Y - other entity that associates associative entity For each relationship name identified using the above tables, the relationship name and the items of the file corresponding to the second entity of the two adjacent entities that establish this relationship name are included in the E-R model of the class. The items included are obtained from TEMPFILEITEMS. This E-R model is then stored in the E-R Model of Class File 32.

Let us now illustrate this procedure by applying it on the exemplary personnel system described earlier. We know at this stage that this personnel system has three classes which are derived from the kernel entity of EMPLOYEE, BRANCH, and PROJECT. Let us call these three classes:

ABOUT EMPLOYEE
ABOUT BRANCH
ABOUT PROJECT

If we were to apply the procedure, we should get the following E-R models for the three classes:

ABOUT EMPLOYEE

Emp_No
    Emp_Name
    Race_Code
    Race_Desc
    Address
    Salary
    <EMPLOYEE belongs to BRANCH>
        Branch_No
        Branch_Name
        Br_Tot_Expenses
        Country_Code
        Country_Name
    <EMPLOYEE is a MANAGER>
        Co_Car_No
    <EMPLOYEE is a NON_MANAGER>
        Union_M_No
    <EMPLOYEE has PROJECT>
        Proj_No
        Proj_Name
        Cust_No
        Cust_Name
    <EMPLOYEE and PROJECT have BILLINGS>
        Month
        Amount
    <EMPLOYEE has SKILLS>
        Skill

ABOUT BRANCH

Branch_No
    Branch_Name
    BR_Tot_Expenses
    Country_Code
    Country_Name
    <BRANCH has EMPLOYEE>
        Emp_No
        Emp_Name
        Race_Code
        Race_Desc
        Address
        Salary
    <BRANCH has EXPENSES>
        Month
        Adv_Exp
        Pers_Exp

ABOUT PROJECT

Proj_No
    Proj_Name
    Cust_No
    Cust_Name
    <PROJECT has EMPLOYEE>
        Emp_No
        Emp_Name
        Race_Code
        Race_Desc
        Address
        Salary
    <EMPLOYEE belongs to BRANCH>
        Branch_No -continued

```
              Branch_Name
              Br_Tot_Expenses
              Country_Code
              Country_Name
       <PROJECT and EMPLOYEE have BILLINGS>
              Month
              Amount
```

Let us now explain how these E-R models are produced when the procedure is applied. First another file identical to SYSFILEITEMS is created. This file is called TEMPFILE-ITEMS. For each "inverse_of_pure_lookup" binary relationship in Binary Relationship File 24, the procedure inserts in TEMPFILEITEMS, at the point corresponding to the target item, all the items of the source file except the source item itself, e.g. there is an "inverse_of_pure lookup" binary relationship as follows.

| Source File | Item | Target File | Item |
|---|---|---|---|
| RACE_CODE | Race_Code | EMPLOYEE | Race_Code |

The items of the source file, namely RACE_CODE, are Race_Code and Race_Desc. The procedure inserts only the item Race_Desc (leaving out Race_Code as it is a source item) at Race_Code of EMPLOYEE of TEMPFILEITEMS, so that the items of EMPLOYEE in TEMPFILEITEMS becomes:

Emp_No
Emp_Name
Branch_No
Race_Code
Race_Desc
Address
Salary

Next the procedure deletes those items in TEMPFILE-ITEMS that correspond to the target item in "has_children", "has_wards" and "has_subtype" binary relationships in Binary Relationship File 24. For example, Branch_No of EMPLOYEE in the exemplary personnel system is a target item in a "has_wards" binary relationship with BRANCH. Thus, this item in the TEMPFILEITEMS file is deleted.

The resultant TEMPFILEITEMS file is then used together with the two decision tables earlier described to produce the above E-R model for each class which is then stored in the E-R Model of Classes File 32.

Let us show how the procedure produces the E-R model for the ABOUT EMPLOYEE class. First all items of EMPLOYEE (K1) obtained from TEMPFILEITEMS are included into the E-R model of this class. Next it reads CDF B to find records having K1 as the first file. The first such record is a list containing K1, K2, L3. The next file in this list is BRANCH (K2) which has a BR type of "inv of_has_wards" with EMPLOYEE (K1). As K1 and K2 are kernel entities with the BR type of "inv_of_has_wards" the procedure applies rule 2 of Decision Table 2 to derive the following relationship name:

<EMPLOYEE belongs to BRANCH>

This relationship name together with the items of BRANCH obtained from TEMPFILEITEMS are then included into the E-R model of ABOUT EMPLOYEE.

The next file after K2 in the above CDF B record is L3. As L3 is a pure lookup entity the procedure ignores it and proceeds to read in the next record of CDF B having K1 as the first file. The record is a list containing K1, L1. However, since the next file in this list, namely RACE_CODE (L1) is a pure lookup entity, the procedure ignores it.

As there are no more records in CDF B having K1 as the first file, the procedure starts to read the CDF A file. The first record of CDF A is a list containing K1, S1. As S1 is a subtype entity with a BR type of "has_subtype" to K1, the procedure applies rule 1 of Decision Table 1 to derive the relationship name:

<EMPLOYEE is a MANAGER>

This relationship name together with the items of MANAGER obtained from TEMPFILEITEMS are then included in the E-R model of ABOUT EMPLOYEE class.

Next, the procedure reads the CDF B file to look for records containing S1 as the first file. However, there are no such records. It then proceeds to read in the next record of CDF A. This record contains K1, S2. Using the same rule as applied to S1 above, the procedure derives the following relationship name:

<EMPLOYEE is a NON-MANAGER>

This relationship name together with the items of NON-MANAGER obtained from TEMPFILEITEMS are then included in the E-R model of ABOUT EMPLOYEE class.

The procedure next reads the CDF B file to look for records containing S2 as the first file. However, there are no such records. It proceeds to read in the next record of CDF A. This record contains K1, A1, K3. As A1 (BILLINGS) is an associative entity and K3 (PROJECTS) is the other entity that associates A1, the procedure first applies rule 5a of Decision Table 1 using K1 and K3 to derive the following relationship name:

<EMPLOYEE has PROJECTS>

This relationship name together with the items of PROJECTS obtained from TEMPFILEITEMS are then included into the E-R model of ABOUT EMPLOYEE class. Next the procedure reads CDF B file to look for records with K3 as the first file. There is one such record, namely K3, L2. However, as L2 (CUSTOMER) is a pure lookup entity, the record is ignored. The procedure then applies rule 5b of Decision Table 1 on the current CDF A record, namely the list containing K1, A1, K3, to derive the following relationship name:

<EMPLOYEE and PROJECT have BILLINGS>

This relationship name together with items of BILLINGS obtained from TEMPFILEITEMS are then included in the E-R model of ABOUT EMPLOYEE Class.

The procedure next reads the CDF B file to look for records with A1 as the first file. However, there is no such file. It then proceeds to read in the next CDF A record. This record contains K1, C1. Applying rule 4 of Decision Table 1, the procedure derives the following relationship name <EMPLOYEE has SKILLS)

This relationship name together with the items of SKILLS obtained from the TEMPFILEITEMS file are then included in the E-R model of ABOUT EMPLOYEE class.

The procedure next reads the CDF B file to look for records having C1 as the first file. However, there are none and so it proceeds to read the next CDF A record. However, there are no more CDF A records. This ends the E-R model translation for the ABOUT EMPLOYEE class from its class definition.

Besides the procedure just described, the E-R Model Translator also has another procedure which creates a class using CDF C to contain all the pure lookup entities. For the personnel system example, this procedure creates the following class:

ABOUT PURE LOOKUP ENTITIES
   <RACE_CODE>
      Race_Code
      Race_Desc
   <CUSTOMER>
      Cust_No Cust_Name
<COUNTRY>
Country_No
Country_Name Extension To Existing Modules Besides extending Semantics Extractor 12, in one embodiment Model Purifier 26, and/or Report Item Selector 16 are also extended. The extension of Model Purifier 26 provides an interface to allow a user to specify, for two opposite binary relationships of UU (unique key to unique key), which binary relationship is the "has_subtype" and which is the "inverse of has_subtype" type, if a file has only one sub-type. However, this is not necessary for embodiments using the SQL language because it is possible to know this from the primary and foreign keys.

The extension of Report Item Selector 16 provides an interface that displays all or selected classes and their E-R model, as well as allowing a user to formulate a query by picking the desired class attributes from the E-R model of the classes.

Model purifier 26 and Security Model Specifier 29 are optional modules to this embodiment.

In conclusion, this embodiment provides an alternative way of presenting the database items for end-users to select to formulate their queries. This presentation of using classes and their E-R models is more intuitive and meaningful than a single list of items. As a result, this embodiment makes it easier for end-users to formulate relational database queries.

INTEGRATION WITH ELECTRONIC MAIL

In one embodiment of this invention, the end-user query facility is integrated with an electronic mail (E-mail) system to allow a user located at a site with no on-line access to the application database but with connection to an E-mail system to still be able to make a query of the application database. The E-mail system provides the delivery mechanism for the user's query to be transmitted to the site where the query will be processed, and for the query results to be returned to the user after processing. The integration with the E-mail system also provides one convenient method for all queries made via the E-mail system to be logged into a log file. Information such as user id, items selected by user, the number of records extracted from database, the time of query, and the time taken to process the query can all be logged.

Figure 19:
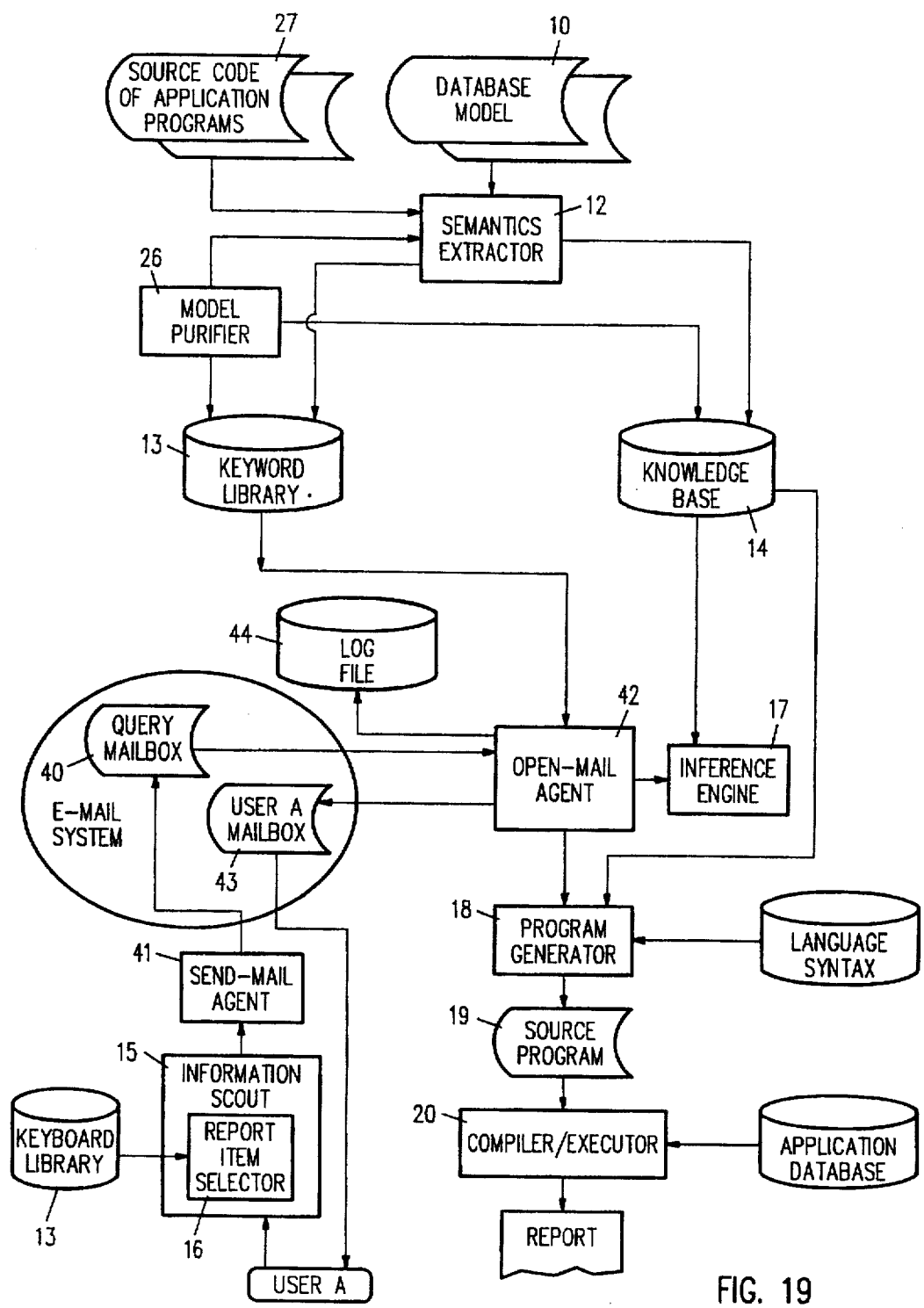
FIG. 19 is a flow chart depicting an alternative embodiment of this invention in which a query facility is integrated with an E-mail system.

FIG. 19 shows one example of this embodiment. User A at a site with no on-line access to the Application Database 39 interfaces with Report Item Selector 16 of Information Scout 15 to select the items to be reported. Note that in this embodiment, the Information Scout consists only of the Report Item Selector which interfaces with the Send-Mail Agent instead of the Inference Engine 17. The Send-Mail Agent 41 then takes the items selected and stores them into a file which is then attached to an E-mail. This E-mail is then sent to the Query Mailbox 40. The Open-Mail Agent 42 periodically checks for E-mail in the Query Mailbox 40. If there is an E-mail, it reads the E-mail to get the file attached. This file contains the items selected by the User A. It then passes the items selected to the Inference Engine. Note that in this embodiment the Inference Engine 17 interfaces with the Open-Mail Agent 42 instead of the Report Item Selector 16. The Inference Engine then identifies one or more database files which contain the desired information and searches the Knowledge Base 14 to determine the linkages connecting the identified files. Program Generator 18 then generates a Source Program 19 based on the linkages inferred. Source Program 19 is then compiled and executed against the Application Database by the Compiler/Executor 20. The query result obtained is then composed into an E-mail by the Open-Mail Agent 42 and sent to User A Mailbox 43. User A obtains his query result by reading this E-mail.

The following describes in greater detail the Send-Mail Agent 41 and the Open-Mail Agent 42 based on the integration with Microsoft Mail, a product of Microsoft Corporation, USA.

The procedure for the Send-Mail Agent 41 is given as a representative section of code in Program Listing 1. It is written in Microsoft's Visual Basic under Microsoft's Windows operating system and uses the Microsoft's Electronic Forms Designer as well as the Microsoft's Messaging Application Program Interface (MAPI) to interface with the Microsoft Mail E-Mail System.

The procedure works as follows. After User A has selected his items using the Report Item Selector 39 which has been implemented using Microsoft's Electronic Forms Designer, the Send-Mail Agent 41 is invoked. This Agent first stores the items selected into a temporary file called query.dat which is then assigned to another file called FName. Next a function called WriteMessage is called to attach this file to an E-Mail created by Report Item Selector 39. The WriteMessage function is one of the functions provided by the Microsoft's Electronic Forms Designer. This function uses the command MEFAddAttachment ( ) to attach the FName file to the E-Mail. This E-Mail is then posted to the Query Mailbox 40 by using the command MAPISendMail. This completes the description of Send-Mail Agent 41.

The procedure for Open-Mail Agent 42 is given as a representative section of code in Program Listing 2. It is written in C language under Microsoft's Windows operating system and also uses Microsoft Mail's Messaging Application Program Interface (MAPI) to interface with Microsoft Mail E-Mail system.

This procedure works as follows. It periodically checks Query Mailbox 40 of the E-Mail system using the subroutine vTimerServeProc( ) running under subroutine WinProc( ). vTimerServeProc( ) in turn uses the MAPI command MAPIFindNext to find out whether there is any E-Mail in the mailbox. If there is, it then issues the MAPI command MAPIReadMail to read the E-Mail. At the same time it logs the time the message is read into the server log file (which is one of the two files under Log File 44, the other being queue log file) by calling the sub-routine vServerLog. It next processes the attachment in the E-Mail. The attachment is a file where the items selected by a user as his query is stored. This file is called query.dat. vTimerServerProc next calls vServeAttach to process this attachment. vServeAttach first logs the user name, the subject and the date received into the server log file. It then calls Inference Engine 17 which is implemented as a sub-routine called lAppPHEng. This sub-routine also contains Program Generator 18 to generate the Powerhouse Quiz source program based on the linkages determined by Inference Engine 17. It next uses Compiler/Executor 20 to get the query result from the database. Compiler/Executor 20 is implemented as a sub-routine called lAppPHRet. The query result is stored in a file called RESULT.XXX where XXX can be XLS, MDB, TXT, DBF which are the file extensions for the different file formats available. Next the vServeAttach logs the number of rows of records retrieved from the database that make up the query result. It also logs the selection filter used in the user query as well as the items selected into the queue log file of Log File 44 using the sub-routine vQueueLog. Lastly, it composes an E-Mail to contain the query result and then use the MAPISendMail command to send this E-Mail to User A Mailbox 43. This completes the description of the Open-Mail Agent.

Thus by integrating the query facility to an E-Mail system, a user who has no on-line access to his application database is still able to make his query using the E-Mail system. Another advantage of this embodiment is that all queries made can be logged for historical analysis. Furthermore, the embodiment allows queries to be processed in batch mode during off-peak hours whenever there is excessive load on the database system during peak hours.

ALTERNATIVE WAY OF PRESENTING QUERY RESULTS TO HELP PREVENT MISINTERPRETATION

This alternative embodiment provides an alternative way in which query results can be presented to help prevent users from misinterpreting their query results. Query results can possibly be misinterpreted by users because of their complexity, which is in turn due to the queries being complex. A complex query is one which is made up of many basic queries with each basic query having its own distinct result. What a user gets when he makes a complex query is a report in which these distinct basic query results have been compounded. This compound report is not always easy for the user to understand or interpret. This embodiment breaks down a complex query into its basic components and processes each basic component (which is a basic query) separately so that what a user finally receives as a result is a disjoint set of distinct basic query results which the user can easily understand or interpret.

Figure 20:
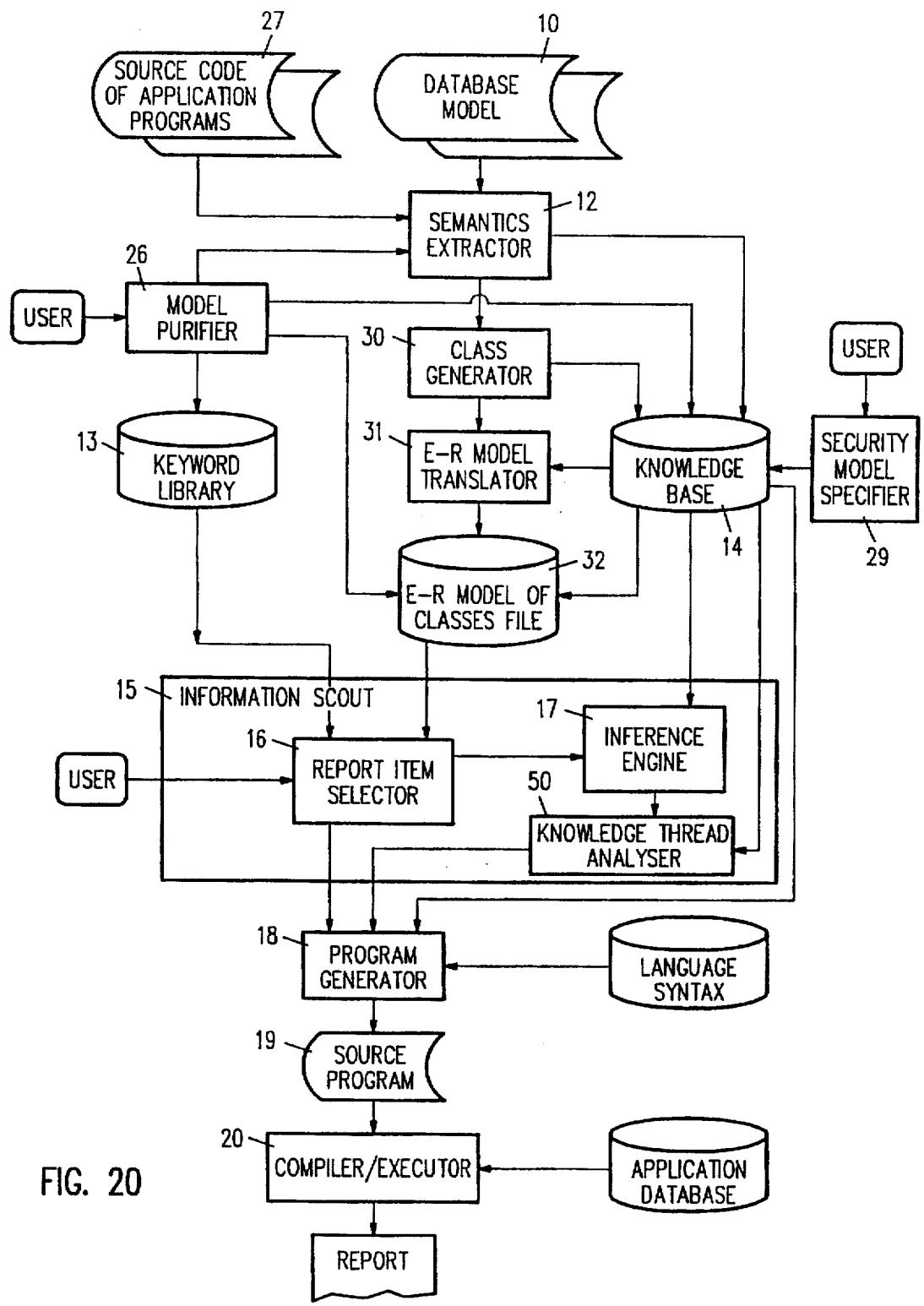
FIG. 20 is a flowchart depicting one embodiment of this invention which includes a Knowledge Thread Analyzer.

This alternative embodiment involves adding a new module called the Knowledge Thread Analyser 50 to the query facility of FIG. 14 described earlier. An exemplary main flowchart for this alternative embodiment is shown in FIG. 20.

Knowledge Thread Analyser

Before we describe the function of the Knowledge Thread Analyser 50, let us explain how query results can be misinterpreted by illustrating two different cases.

Case A:

Suppose we have two database files as follows:

| File | Item | Key |
|---|---|---|
| INVOICE | Inv-No<br>Inv-Amt<br>Customer | Unique key is Inv-No |
| INVOICE_LINES | Inv-No<br>Part-No<br>Qty<br>Price | Repeating key is Inv-No |

Suppose also that INVOICE has only one record as follows:

| Inv-No | Inv-Amt |
|---|---|
| 1 | $1000 | and INVOICE_LINES has 3 records as follows:

| Inv-No | Part-No | Qty | Price |
|---|---|---|---|
| 1 | A | 2 | $ 50 |
| 1 | B | 3 | $100 |
| 1 | C | 7 | $175 |

Suppose a user picks the items Inv-No, Inv-Amt, Part-No, Qty and Price as his query. The following query result would be produced after the query is processed.

| Inv-No | Customer | Inv-Amt | Part-No | Qty | Price |
|---|---|---|---|---|---|
| 1 | IBM | $1000 | A | 2 | $ 50 |
| 1 | IBM | $1000 | B | 3 | $100 |
| 1 | IBM | $1000 | C | 7 | $175 |

This result is correct but can be misinterpreted by a user because the Inv-Amt of $1,000 is repeated for every record of INVOICE_LINES. A user may total up the Inv-Amt to get what he thinks is the total invoice amount, namely $3000. This is wrong as there is only one invoice amount which is $1000.

This query is complex and can be broken down into two basic queries. One basic query is about finding out the amount for each invoice for each customer. The items Inv-No, Customer and Inv-Amt from the INVOICE file would provide this information. The other basic query is about finding out the details of each invoice, which details can be obtained from the items Inv-No, Customer, Part-No, Qty, and Price. The above query result is a compound report of these two basic queries. However, if both these basic queries were processed separately we would get a disjoint set of basic query results as follows:

| Inv-No | Customer | Inv-Amt | Part-No | Qty | Price |
|---|---|---|---|---|---|
| 1 | IBM | $1000 | | | |
| 1 | IBM | | A | 2 | $ 50 |
| 1 | IBM | | B | 3 | $100 |
| 1 | IBM | | C | 7 | $175 |

Notice that with this disjoint set of basic query results the Inv-Amt is now correctly presented as a single value of $1000 and not a repeating value of $1000.

This case can be identified by the fact that the query involves two files in which they have a "one to many" relationship. Alternatively, we can say that their binary relationships is a UR (unique to repeating) or UN (unique to non-key). We can also say that their binary relationship is a "has_children" or "has_wards" type. Also, one of the items selected is from the file whose unique key is used in the binary relationship, this item being non-key and numeric. For the example above, INVOICE is the file whose unique key Inv-No is used in the binary relationship with INVOICE_LINES. Inv-Amt is one of the items selected as part of the query and it is non-key and numeric.

Consider another case which can also lead to misinterpretation by users.

Case B:

Suppose we have three database files as follows:

| File | Item | Key |
|---|---|---|
| EMPLOYEE | Emp_No<br>Emp_Name | Unique key is Emp_No |
| SKILLS | Emp_No<br>Skill | Repeating key is Emp_No |
| PAYS | Emp_No<br>Month<br>Salary | Repeating key is Emp_No |

Suppose also that these three files contain the following records:

| EMPLOYEE: | Emp_No | Emp_Name | |
|---|---|---|---|
| | 1 | John | |
| | 2 | Sally | |
| SKILLS: | Emp_No | Skill | |
| | 1 | COBOL | |
| | 1 | Fortran | |
| | 1 | Ada | |
| | 2 | C++ | |
| | 2 | COBOL | |
| PAYS: | Emp_No | Month | Salary |
| | 1 | Jan | 1000 |

| | | |
|---|---|---|
| 1 | Feb | 1000 |
| 2 | Jan | 2000 |
| 2 | Feb | 2000 |

Suppose a query is formulated by picking the items Emp_Name, Skill, Month, and Salary. Let us first consider the case of using PowerHouse to process this query, followed by the case of using SQL to process this query. The reason for doing this is that both PowerHouse and SQL give different results, but each may still lead to misinterpretation by users. The following result would be produced after this query is processed by PowerHouse.

| Emp Name | Skill | Month | Salary |
|---|---|---|---|
| John | COBOL | Jan | 1000 |
| John | Fortran | Feb | 1000 |
| John | Ada | | |
| Sally | C++ | Jan | 2000 |
| Sally | COBOL | Feb | 2000 |

A user may then use this result to find out the all Salary records of each employee with COBOL skill. As the first and fifth row of the query result contain COBOL, he would think that the Salary records come from these two rows only, namely:

| Emp_Name | Month | Salary |
|---|---|---|
| John | Jan | 1000 |
| Sally | Feb | 2000 |

However, this is not totally correct as the correct result should include all the Salary records of John and Sally both of whom have COBOL skill. The correct result is as follows:

| Emp_Name | Month | Salary |
|---|---|---|
| John | Jan | 1000 |
| John | Feb | 1000 |
| Sally | Jan | 2000 |
| Sally | Feb | 2000 |

Let us now consider the case of using SQL to process same query involving Emp_Name, Skill, Month and Salary. The following result would be produced by SQL:

| Emp_Name | Skill | Month | Salary |
|---|---|---|---|
| John | COBOL | Jan | 1000 |
| John | COBOL | Feb | 1000 |
| John | Fortran | Jan | 1000 |
| John | Fortran | Feb | 1000 |
| John | Ada | Jan | 1000 |
| John | Ada | Feb | 1000 |
| Sally | C++ | Jan | 2000 |
| Sally | C++ | Feb | 2000 |
| Sally | COBOL | Jan | 2000 |
| Sally | COBOL | Feb | 2000 |

This result could be misinterpreted by a user because the Salary of John and Sally is repeated many times. He may total up the Salary column to find the total Salary for John and Sally. What he would get respectively is 6000 and 8000. This is incorrect. The correct result is 2000 and 4000, respectively since John's salary is 1000 each in January and February and Sally's salary is 2000 each in January and February.

This query is complex and involves two multi-valued dependencies of EMPLOYEE, namely SKILLS and PAYS. It can be broken down into two basic queries. One basic query is about employees and their skills and the other basic query is about employees and their pays. The different query results by PowerHouse and SQL shown above are compound reports of these two basic queries. On the other hand the disjoint set of results for these two basic queries are:

| Emp_Name | Skill | Month | Salary |
|---|---|---|---|
| John | COBOL | | |
| John | Fortran | | |
| John | Ada | | |
| Sally | C++ | | |
| Sally | COBOL | | |
| John | | Jan | 1000 |
| John | | Feb | 1000 |
| Sally | | Jan | 2000 |
| Sally | | Feb | 2000 |

Notice now that with this report a user could easily find out correctly all salary records of employees who have COBOL skill. Also, with these two disjointed basic reports, the user would not incorrectly total up the salary of John and Sally.

This case can be identified by the fact that the query involves more than one multi-valued dependencies (MVD). For example, in the above case the attribute or item SKILL is multi-dependent on the attribute or item Emp_No, i.e. each employee has a well-defined set of skills. Similarly, the attributes or items Month and Salary are also multi-dependent on Emp_No. Alternatively, we can say that it involves at least three files in which one file has a "one-to-many" relationship or a UR (unique-to-repeating) or a UN (unique to non-key) binary relationship with each of the other files or in other words, one file has a "has_children" or a "has_wards" binary relationship with each of the other files.

Let us now describe Knowledge Thread Analyser 50. It takes as its input the knowledge thread (as defined earlier) determined by Inference Engine 17 based on the items selected by the user from a single class. Since the items selected by a user are obtained from a single class, since every knowledge thread determined by Inference Engine 17 has as its thread-head the root kernel entity of the class from which the items are selected. Knowledge Thread Analyser 50 then analyses this knowledge thread, breaking it down first into simple knowledge threads to resolve the Case B type of complex query problems, and second for each simple knowledge thread derived breaking it down further into smaller simple knowledge threads to resolve the Case A type of complex query problems. The new knowledge threads produced as a result of this analysis are then passed to Program Generator 18 to generate the corresponding source programs which are then compiled and executed to produce the query results.

Before we describe in detail this exemplary procedure, let us recap what a knowledge thread is by giving an example, because it will help in understanding this procedure. Suppose a user makes a query on the ABOUT EMPLOYEE class described earlier by selecting the items Emp_Name, Salary, Branch_Name, Br_Tot_Expenses, Country_Name, Skill, Month and Amount. The knowledge thread determined by Inference Engine 17 is as follows:

EMPLOYEE → BRANCH (NU) → COUNTRY (NU)
→ SKILLS (UR)
→ BILLINGS (UR)

This knowledge thread has one thread-head but many thread-ends, with the thread-head being the root kernel entity of the class. What we want to do is to breakdown this complex thread into many simple threads, where each simple thread has one thread-head and only one thread-end. This complex knowledge thread can be broken down into three simple knowledge threads as follows:

EMPLOYEE→BRANCH (NU)→COUNTRY (NU)
EMPLOYEE→SKILLS (UR)
EMPLOYEE→BILLINGS (UR)

Two different types of simple threads can be derived from a complex thread determined by Inference Engine 17. One type is the NU or RU threads in which all the binary relationships between two adjacent files in the thread is NU or RU. Another type is the UR threads in which all the binary relationships between two adjacent files is UR. One characteristic of the UR simple threads is that their thread-head is same as the thread-head of the complex thread. As for the NU or RU simple threads, their thread-head is the file on the complex thread which starts off the NU or RU relationship.

For example, the above complex knowledge thread has one NU simple thread, namely

EMPLOYEE→BRANCH (NU)→COUNTRY (NU)

and two UR simple threads, namely

EMPLOYEE→SKILLS (UR)
EMPLOYEE→BILLINGS (UR)

We shall now describe an exemplary embodiment of Knowledge Thread Analyser 50 in detail. It comprises the following steps:

Step 1: Analyze the knowledge thread determined by Inference Engine 17 and derive the NU or RU simple knowledge threads and the UR simple knowledge threads. Store the NU or RU simple knowledge threads in NU-RU Thread File and the UR simple knowledge threads in UR Thread File. This resolves the Case B type of complex query problem.

Step 2: Access the first simple knowledge thread in NU-RU Thread File. Starting from the thread-end analyze each pair of adjacent files for Case A type of complex query. If a pair has a Case A type of complex query, generate a new knowledge thread comprising files from the thread-end through to the first file in the pair of adjacent files being analyzed, this first file forming the thread-head of the new knowledge thread. Assign to this new knowledge thread its respective set of user selected items such that only its thread-head has user selected items which are both non-key and numeric. Store this new knowledge thread in New Thread File. Repeat this step for each of the remaining simple threads in NU-RU Thread File.

Step 3: Access the first simple knowledge thread in UR Thread File. Starting from the thread-head analyze each pair of adjacent files for Case A type of complex query. If a pair has a Case A type of complex query, generate a new knowledge thread comprising files from the thread-head through to the first file in the pair of adjacent files being analyzed, with the thread-head of the new knowledge thread being the same as the thread-head of the knowledge thread being analyzed. Assign to this new knowledge thread its respective set of user-selected items such that only its thread-end has user selected items which are both non-key and numeric. Store this new knowledge thread in New Thread File. Repeat this step for each of the remaining simple threads in UR Thread File.

Step 4: For each simple knowledge thread in UR Thread File combine it with those NU or RU simple threads in the NU-RU Thread File which have their thread-head matching a file in the UR simple knowledge thread. This complex thread becomes a new knowledge thread. Assign this new knowledge thread its respective set of user selected items such that only its UR thread-end has user-selected items which are both non-key and numeric. Store this new knowledge thread in New Thread File.

Step 5: Eliminate duplicate knowledge threads in the New Thread File.

Let us apply this procedure on the earlier example of a query on the ABOUT EMPLOYEE class to show how the above procedure works. When we apply step 1, we get the following NU simple knowledge threads

EMPLOYEE→BRANCH (NU)→COUNTRY (NU)

and the following UR simple knowledge threads:

EMPLOYEE→SKILLS (UR)
EMPLOYEE→BILLINGS (UR)

These simple threads are stored in the NU-RU Thread File and the UR Thread File, respectively. Next we use step 2 on the NU simple knowledge thread. The first pair of adjacent files starting from the thread-end are COUNTRY and BRANCH. Since the user-selected item from COUNTRY file is Country_Name which is not numeric, there is no Case A type of complex query in this pair of adjacent files. So no new knowledge thread is generated for this pair. The next pair comprises BRANCH and EMPLOYEE. Since one of the user-selected items from BRANCH is Br_Tot_Expenses which is both non-key and numeric, there is a Case A type of complex query in this pair. The following new knowledge thread is generated as a result:

BRANCH→COUNTRY (NU)

The user-selected items assigned to it are Country_Name, Branch_Name, and Br_Tot_Expenses. Notice that only the thread-end, namely BRANCH, has the item which is both non-key and numeric, namely Br_Tot_Expenses. This new Knowledge Thread is then stored in the New Thread File.

As there are no more NU simple knowledge thread, we next apply step 3 on the UR simple knowledge threads. The first UR simple knowledge thread is

EMPLOYEE→SKILLS (UR)

There is only pair of adjacent files in this thread. Since one of the user-selected items from EMPLOYEE is Salary which is both non-key and numeric, there is a Case A type of complex query in this pair. The following new knowledge thread is generated as a result:

EMPLOYEE

The user-selected items assigned to it are Emp_Name and Salary. This new knowledge thread is then stored in the New Thread File.

The next UR simple knowledge thread is

EMPLOYEE→BILLINGS (UR)

For this pair of files, the following new knowledge thread is also generated:

EMPLOYEE with Emp_Name and Salary being assigned to it. It is then stored in the New Thread File.

Next we apply step 4. We combine the NU simple thread EMPLOYEE→BRANCH (NU)→COUNTRY (NU) with the UR simple knowledge thread EMPLOYEE→SKILLS (UR) to derive the following new knowledge thread:

EMPLOYEE → BRANCH (NU) → COUNTRY (NU)
→ SKILLS (UR)

The user-selected items assigned to it are Emp_Name, ranch_Name, Country_Name and Skill. This new knowledge thread is then stored in the New Thread File.

Another new knowledge thread is also formed as follows:

EMPLOYEE → BRANCH (NU) → COUNTRY (NU)
→ BILLINGS (UR)

The user-selected items assigned to it are Emp_Name, Branch_Name, Month, and Amount. This new knowledge thread is then stored in the New Thred File. Notice that only the UR thread-end, namely BILLINGS, has the user-selected item which is both non-key and numeric, namely Amount.

Step 5 is applied next. In this step the duplicate thread, namely EMPLOYEE, in the New Thread File is eliminated. This completes the analysis of the complex knowledge thread determined by the Inference Engine 17 by the Knowledge Thread Analyser 50.

In this embodiment Model Purifier 26 and Security Model Specifier 29 are optional modules.

Thus this embodiment ensures that end-users will not misinterpret their query results whenever they make complex queries as it ensures that the query results produced are presented as a disjointed set of basic query results.

Connections to Existing Database Applications

Many applications today are built using standard application program interface (API) that allow them to be easily linked to other software. One type of standard, which is a data access interface standard, relates to the linking of applications to different database management systems (DBMS). Open Database Connectivity (ODBC) from Microsoft Corporation is one of the popular standards for such a purpose. This type of standard allows applications to be developed, compiled and shipped without targeting a specific DBMS so long as they make function calls to a database using the API defined by this standard. In order to link such an application to the DBMS of their choice, users then add a module called a database connectivity driver specific to that DBMS. A database connectivity driver implements the function calls of the standard API according to the requirements of the DBMS they are designed for. Many of these applications provide a primitive ad-hoc query capability in that users of these applications must understand the database model in order to perform ad-hoc query. This invention relates to a novel approach for the construction of this end-user query facility through the use of what we called a Query Facility Connectivity Driver so that we seamlessly link the end-user query facility to these applications to enhance their query capability while still allowing the linking of these applications to the DBMS of the users' choice using a database connectivity driver specific to that DBMS. In accordance with the teachings of the invention this seamless linking of the application to the end-user query facility is achieved by adding the Query Facility Connectivity Driver to the application in the same way as adding a database connectivity driver to link the application to a DBMS. At the same time a user can still link his application to the DBMS of his choice as he can continue to add one or more database connectivity drivers specific to that DBMS in the same manner as before. All these are made possible by constructing the end-user query facility to include a Query Facility Connectivity Driver and by constructing this driver firstly to have the same standard data access interface as a database connectivity driver so that it can be added as a module to the application just like adding a database connectivity driver, and, secondly, to have an interface that is compliant to the same data access interface standard as the application so that the end-user query facility can be linked to the DBMS of the user's choice by adding a database connectivity driver specific to that DBMS in the same way as the application can be linked to the DBMS by adding a database connectivity driver specific to that DBMS.

The following describes one embodiment of this invention using ODBC from Microsoft Corporation as the standard data access interface. However, it is to be understood that the teachings of this invention are equally applicable to any other standard data access interface.

Before we describe this invention, let us first describe what ODBC is.

ODBC

In the traditional database world, an application is tied to a specific database management system (DBMS). An application could be a payroll system or a spreadsheet with query capability. Such applications are usually written using embedded SQL. Though embedded SQL is efficient and portable across different hardware and operating systems, the source code must be recompiled for each new environment. Also, it is not optimal if the applications need to access data in different DBMS such as IBM DB2 or Oracle. One version of the application would have to be recompiled with the IBM precompiler and another version with the Oracle precompiler resulting in the user having to purchase two products of the same application instead of one in order to be able to access both DBMS.

The ODBC interface defined by Microsoft Corporation, on the other hand, allows an application to be developed and compiled without targeting a specific DBMS. The users of such an application then add modules called database connectivity drivers to link the application to their choice of database management systems. These database drivers are dynamic link libraries that an application can invoke on demand to gain access to a particular data source through a particular communications method much like a printer driver running under Microsoft's Windows. ODBC provides the standard interface that allows data to be shuttled between the applications and the data sources.

The ODBC interface defines the following:

A library of ODBC function calls that allow an application to connect to a DBMS, execute SQL statements and retrieve results.

The SQL syntax used is based on the X/Open and SQL Access Group (SAG) SQL CAE Specifications (1992).

A standard set of error codes.

A standard way to connect and log on to a DBMS.

A standard representation for data types.

The ODBC architecture has four components, namely

Application: performs processing of its application functions and calls ODBC functions to submit SQL statements and retrieve results.

Database Connectivity Manager: loads the database connectivity drivers on behalf of the application.

Database Connectivity Driver: processes ODBC function calls, submits SQL requests to a specific data source and returns results to the application.

Data Source: consists of the data the user wants to access, the associated operating system, the DBMS and the network platform (if any) used to access the DBMS.

Figure 21:
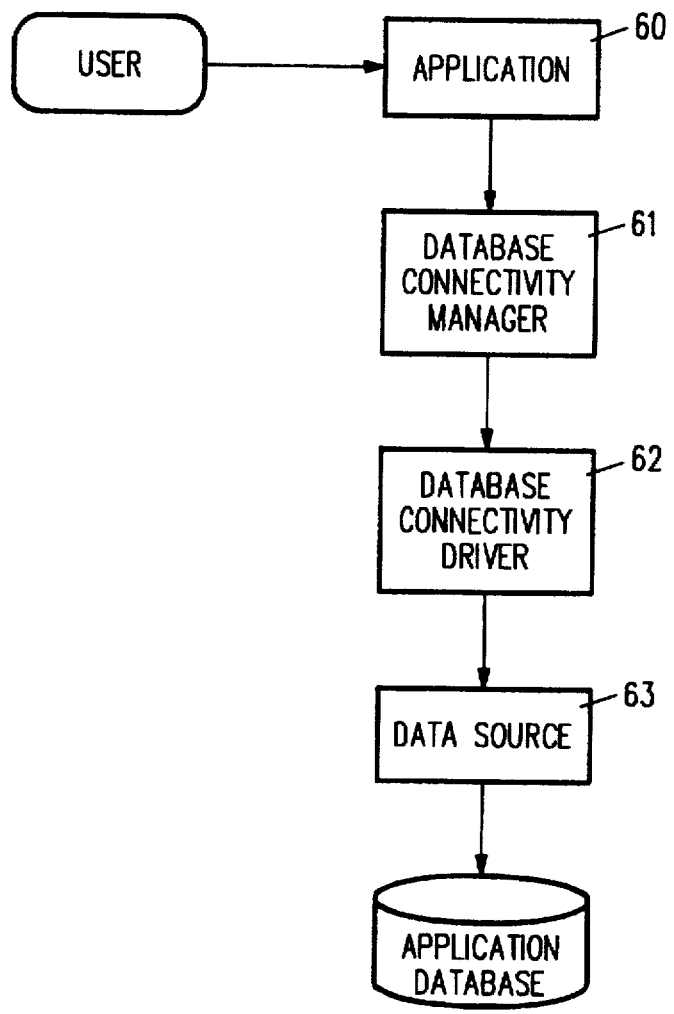
FIG. 21 is a diagram depicting the relationship between the four components of the ODBC architecture.

FIG. 21 shows the relationship among the four components of the ODBC architecture. Each component carries out different functions as listed below.

Figure 22:
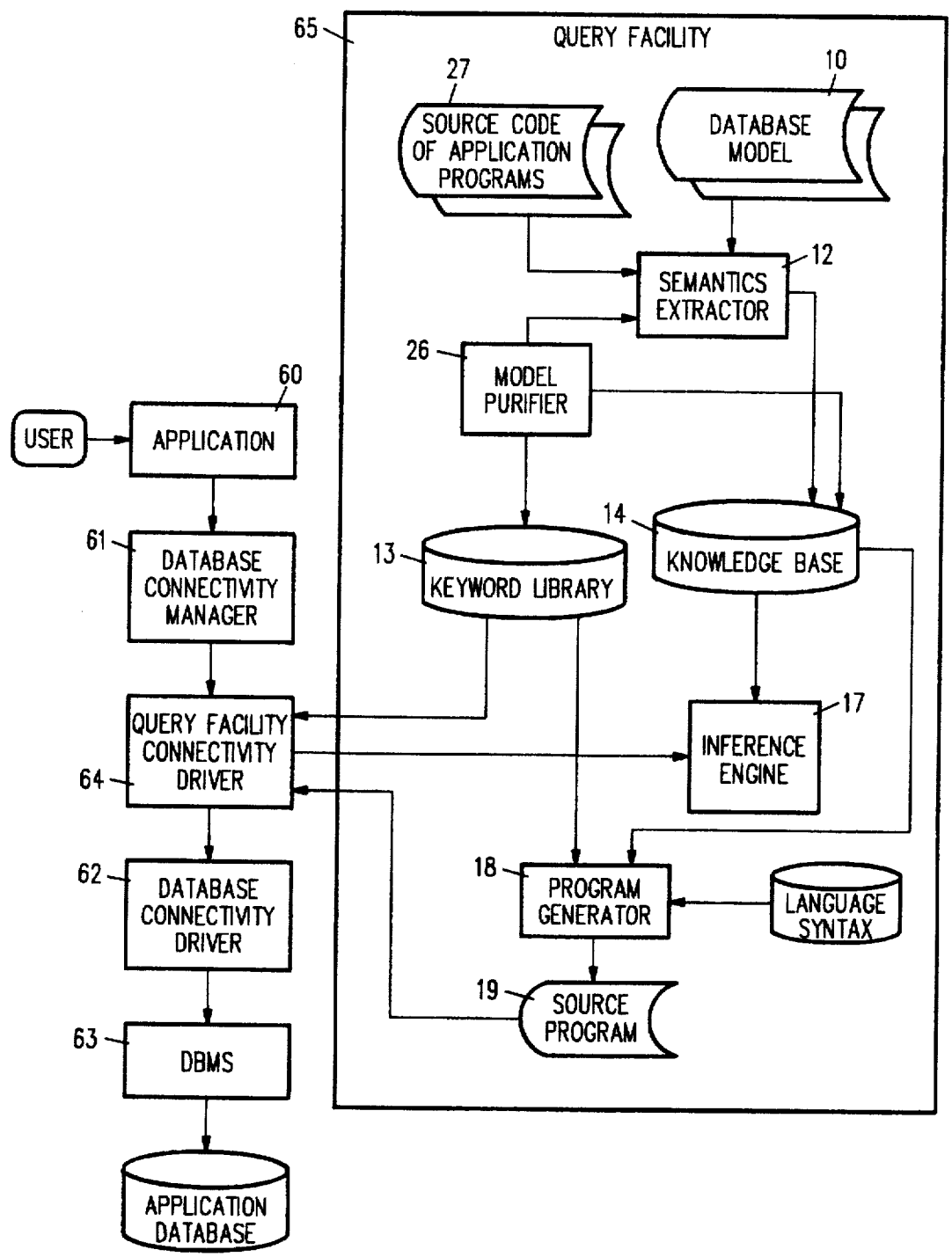
FIG. 22 is a diagram showing a Query Facility linked to an application using a Query Facility Connectivity Driver, in accordance with one embodiment of this invention.

Functions of Application
 Connects to the Data Source by specifying the data source name
 Processes one or more SQL statements as follows:
  The Application places the SQL text string in a buffer
  If the statement returns a result the application assigns a cursor name for the statement or allows the Database Connectivity Driver to do so.
  The Application submits the statement for prepared or immediate execution.
  If the statement creates a result, the Application can enquire about the attributes of the result such as the number of columns and the name and type of a specific column. It assigns buffers for each column in the result and fetches the result.
  If the statement causes an error, the Application retrieves error information from the driver and takes appropriate action.
  Ends each transaction by committing it or rolling it back.
  Terminates the connection when it has finished interacting with the Data Source.
Functions of Database Connectivity Manager
 A dynamic-link library (DLL) whose primary purpose is to load ODBC drivers.
 Also processes several ODBC initialization and information calls.
 Passes ODBC functions calls from Application to Database Connectivity Drivers.
 Performs error and state checking.
Functions of Database Connectivity Drivers
 A DLL that implements ODBC function calls and interacts with a Data Source.
 It performs the following tasks in response to ODBC function calls from an Application:
  Establishes a connection to the Data Source.
  Submits requests to the Data Source.
  Translates data to or from other formats.
  Return results to the Application
  Declare and manipulate cursors
Tasks performed by Data Source
 Requires its name. a user ID and a password to be specified by a user of the Application for it to be connected.
 Processes SQL requests received from the Database Connectivity Driver.
 Returns result to the Database Connectivity Driver.
Query Facility Connectivity Driver
 FIG. 22 shows Query Facility 65 linked to Application 60 using Query Facility Connectivity Driver 64. Query Facility Connectivity Driver 64 "slots" in-between Database Connectivity Manager 61 and Database Connectivity Driver 62, replacing Report Item Selector 16 of Information Scout 15 (FIG. 1) used in previous embodiments of the query facility.
 Query Facility Connectivity Driver 64 has the same or substantially similar ODBC interface as Database Connectivity Driver 62 so that it can be used by Application 60 as though it is a Database Connectivity Driver. However, unlike Database Connectivity Driver 62, it implements many of the ODBC functions in a different way, since it is used to connect Application 60 to Query Facility 65 instead of to Application Database_. Table 3 gives a comparison of the different implementation of the OBDC calls between Database Connectivity Driver 62 and Query Facility Connectivity Driver 64.
 Let us illustrate with an example how an Application 60 connects to Query Facility 65 through Query Facility Connectivity Driver 64, and uses it to make powerful ad-hoc queries easily. We shall illustrate using Microsoft Excel spreadsheet as Application 60 making a query on an Application Database serving as a personnel system having the following database tables:

| Table | Columns | Key |
|---|---|---|
| EMPLOYEE | Emp_No | Primary Key is Emp_No |
| | Emp_Name | |
| | Sex | |
| | Address | |
| PROJECT | Proj_No | Primary Key is Proj_No |
| | Proj_Name | |
| | Proj_Manager | |
| BILLINGS | Emp_No | Primary Key is Emp_No & Proj_No |
| | Proj_No | Foreign Key is Emp_No referencing EMPLOYEE |
| | Month | Foreign Key is Proj_No referencing PROJECT |
| | Amount | |

After semantic extraction of this database model by Semantics Extractor 12 of Query Facility 65. Keyword Library 13 contains the following keywords:

| Emp_No | Emp_Name | Sex | Address |
|---|---|---|---|
| Project_No | Proj_Name | Proj_Manager | |
| Pay_No | Month | Amount | | and Knowledge Base 14 contains the following knowledge threads:
 EMPLOYEE→BILLINGS
 PROJECT→BILLINGS
 EMPLOYEE→BILLINGS→PROJECT Suppose a user wants a list of all employee names and the names of the projects they are working on. We would now like to describe how the user uses Microsoft Excel to make this query. We would also like to describe the various actions taken by Query Facility Connectivity Driver 64 in response to the ODBC calls made by Microsoft Excel in performing this query. But before we do so let us explain how Database Connectivity Driver 62 and Query Facility Connectivity Driver 64 are configured so that they can be used by Application 60 which is Microsoft Excel in this query example.

Let us assume that a Database Connectivity Driver 62 specific to DBMS 63 is used for the personnel system Application Database which has been loaded in. The user first starts a program called the ODBC Administrator. A window for adding data sources is then displayed. He presses the "Add" button to add a data source. Another window is then displayed to show a list of database connectivity drivers that have been loaded in. He selects the required Database Connectivity Driver 62 for his query on the personnel system. This driver then displays a window asking him to define his data source. He defines his data source to be the Application Database containing the personnel system and gives it the name "PERSONNEL_SYSTEM". This completes the configuration of Database Connectivity Driver 62.

Let us now assume that Query Facility Connectivity Driver 64 has also been loaded in. The user again starts the ODBC Administrator to display a window for adding data sources. He presses the "Add" button to add a data source. Another window showing a list of database connectivity drivers including Query Facility Connectivity Driver 64 appears. This time he selects Query Facility Connectivity Driver 64. This driver then displays a window asking him to define his data source. He defines his data source to be Keyword Library 13 of Query Facility 65 and gives it the name "ABOUT_PERSONNEL". This Keyword Library 13 for the query example contains the keywords of the personnel system. At this point we have only partly configured Query Facility Connectivity Driver 64 because, unlike Database Connectivity Driver 62, we need to configure another data source. Another window is displayed for the user to configure another data source. He configures the "PERSONNEL_SYSTEM" as the other data source which by the way is also the data source of Database Connectivity Driver 62. This completes the configuration of Query Facility Connectivity Driver 64.

Let us now describe how the user perform his query on the personnel system using Microsoft Excel aided by Query Facility 65. The user first launches Microsoft Excel. He then starts up MS-Query which is a module within Microsoft Excel for performing ad-hoc query. A dialog box appears showing him a number of data sources that he can connect to. He selects "ABOUT_PERSONNEL" as his data source. (If he had used Microsoft Excel of the prior art without Query Facility 65 and Query Facility Connectivity Driver 64 as taught by this embodiment, the "ABOUT_PERSONNEL" data source would not be shown on the dialog box and he would have selected "PERSONNEL_SYSTEM" as his data source.) MS-Query then makes the following ODBC calls in the order given to connect to the selected data source:

SQLAllocEnv
SQLAllocConnect
SQLGetInfo
SQLDriverConnect

The SQLAllocEnv call causes Database Connectivity Manager 61 to allocate storage for information about the ODBC environment as well as for special information required to run Query Facility Connectivity Driver 64 while the SQLAllocConnect call causes Query Facility Connectivity Driver 64, firstly, to allocate storage for information about the connection to the "ABOUT_PERSONNEL" data source and, secondly, to make the same call to Database Connectivity Driver 62 to allocate storage for information about the connection to the "PERSONNEL_SYSTEM" data source. The SQLGetInfo call causes Query Facility Connectivity Driver 64 to return its version number. The SQLDriverConnect call causes Query Facility Connectivity Driver 64 to do a number of things. Firstly, it connects to the "ABOUT_PERSONNEL" data source which is Keyword Library 13 of Query Facility 65. Secondly, it prompts the user for the password to Keyword Library 13. Thirdly, it makes the same call to Database Connectivity Driver 62 so as to connect to the "PERSONNEL_SYSTEM" data source which is the Application Database containing the personnel system. (If Microsoft Excel of the prior art had been used without Query Facility 65 and Query Facility Connectivity Driver 64 as taught by this embodiment, these same four ODBC calls would result in different actions being taken. The first call would cause Database Connectivity Manager 61 to allocate storage for information about the ODBC environment while the second call would cause Database Connectivity Driver 62 to allocate storage for information about the connection to the "PERSONNEL_SYSTEM" data source. The third call would cause Database Connectivity Driver 62 to return its version number while the last call would cause Database Connectivity Driver 62 to connect to the "PERSONNEL_SYSTEM" data source.)

After the data sources have been connected, MS-Query issues the SQLGetFunctions call to find out what DBMS 63 functions are supported by Query Facility Connectivity Driver 64. Query Facility Connectivity Driver 64 first passes the call to Database Connectivity Driver 62. It then takes the return results from Database Connectivity Driver 62 and modifies them to delete those functions it does not support before returning the results to MS-Query. Two of the functions it does not support are the 'update' and 'create' functions, since Query Facility 65 is intended only for query. (If Microsoft Excel had been used without Query Facility 65 and Query Facility Connectivity Driver 64, this call would be made to Database Connectivity Driver 62 and the results returned would be all the functions supported by the DBMS including the 'create' and 'update' functions.)

Next MS-Query issues a number of SQLGetInfo calls. These calls cause Query Facility Connectivity Driver 64 to return information about itself and the data source it is connected to, which is "ABOUT_PERSONNEL". (If Microsoft Excel had been used without Query Facility 65 and Query Facility Connectivity Driver 64, these calls would cause Database Connectivity Driver 62 to return information about itself and the data source it is connected to which is "PERSONNEL_SYSTEM".)

MS-Query next issues a SQLTables call. This call causes Query Facility Connectivity Driver 64 to prepare to return information regarding the table in Keyword Library 13. There is only one table in Keyword Library 13. This table is used to hold all the keywords in Keyword Library 13. For the query example using the personnel system let us call this table PERSONNEL. Following this MS-Query makes a SQLBindCol call to associate buffers to hold the table definition of the PERSONNEL table. It next issues a SQLFetch call to fetch and copy the table definition into the buffers. After this it makes a series of calls starting with SQLGetTypeInfo followed by SQLBindCol, and SQLFetch to get information on the data types used by the Application Database. As such information is also contained in Keyword Library 13, Query Facility Connectivity Driver 64 obtains them from Keyword Library 13. (If Microsoft Excel had been used without Query Facility 65 and Query Facility Connectivity Driver 64, the SQLTables call would cause the Database Connectivity Driver 62 to prepare to return information regarding the tables in the Application Database. These tables for the query example are the tables of the personnel system, namely EMPLOYEE, PROJECT and BILLINGS. The next two calls, namely SQLBindCol and SQLFetch, would cause Database Connectivity Driver 62 to associate buffers and then fetch and copy the table definitions of the EMPLOYEE, PROJECT and BILLINGS tables into the buffers. The next series of calls starting with SQLGetTypeInfo followed by SQLBindCol and SQLFetch would cause Database Connectivity Driver 62 to obtain the information on data types used by the Application Database.)

MS-Query next issues a number of SQLGetInfo calls to get the keywords used by DBMS 63. Examples of keywords obtained are (i) whether a table is referred to as "table" or "file" by the specific DBMS and (ii) whether an owner is referred to as "owner" or "authorization id". These calls cause Query Facility Connectivity Driver 64 to in turn make the same calls to Database Connectivity Driver 62 to get the required information from DBMS 63. (If Microsoft Excel had been used without Query Facility 65 and Query Facility Connectivity Driver 64 these calls would cause Database Connectivity Driver 62 to return the required information direct to MS-Query.)

At this point MS-Query stops issuing more ODBC calls. Instead, using the information it has obtained from the ODBC calls it has made, it displays a dialogue box showing the name(s) of the table(s) from the selected data source. This data source is "ABOUT_PERSONNEL" which has only one table PERSONNEL and so only the table name PERSONNEL is shown. To formulate his query the user needs a list of the keywords of Keyword Library 13 to be displayed. He therefore requests through this dialog box that the all the columns of the "PERSONNEL" table be displayed. MS-Query then issues a series of calls comprising SQLColumns, SQLBindCol and SQLFetch. The first call asks Query Facility Connectivity Driver 64 to prepare to return information about the columns of the PERSONNEL table in Keyword Library13. The second call causes Query Facility Connectivity Driver 64 to associate a result buffer with a column in the result set, the result set in this case being all the keywords in Keyword Library 13. The third call causes Query Facility Connectivity Driver 64 to fetch the keywords from Keyword Library 13 and place them in the result buffer. (If Microsoft Excel had been used without Query Facility 65 and Query Facility Connectivity Driver 64, the names of the tables displayed in the dialog box would have been EMPLOYEE, PROJECT and BILLINGS. If the user wanted only the columns of EMPLOYEE table and had made the appropriate selection, MS-Query would issue the same calls and these calls would have caused Database Connectivity Driver 62 to prepare to return information about the columns of the EMPLOYEE table, associate a result buffer and fetch the columns of EMPLOYEE from the Application database into the result buffer.)

After all the keywords of Keyword Library 13 have been fetched, MS-Query then displays them to the user as the columns of the PERSONNEL table. The user then formulates his query by selecting the appropriate columns from this table. Since his query is to get a list of employee names and the names of the projects they are working on, he selects the columns Emp_Name and Proj_Name. MS-Query then generates the following SQL statement:

Select 'PERSONNEL'.'Emp_Name', 'PERSONNEL'.'Proj_Name' From 'PERSONNEL' 'PERSONNEL'

It next makes a SQLExecDirect call to have this SQL statement executed. Query Facility Connectivity Driver 64 upon receiving this call parses the SQL statement to extract the items selected by the user which in this query example are Emp_Name and Proj_Name. It then calls Inference Engine 17 of Query Facility 65 to determine the access path through the personnel system using the items selected. Program Generator 18 is then called to use this access path to generate an SQL source program. For the query example the SQL source program generated is as follows:

Select 'EMPLOYEE'.'Emp_Name', 'PROJECT'.'Proj_Name'

From 'EMPLOYEE' 'EMPLOYEE', 'PROJECT' 'PROJECT', 'BILLINGS' 'BILLINGS'

Where 'EMPLOYEE'.'Emp_No'='BILLINGS'.'Emp_No', 'PROJECT'.'Proj_No'='BILLINGS'.'Proj_No'

Query Facility Connectivity Driver 64 then issues the SQLExecDirect call to Database Connectivity Driver 62 to have this SQL source program executed by DBMS 63 to obtain the desired information from the Application Database. (If Microsoft Excel had been used without Query Facility 65 and Query Facility Connectivity Driver 64, the user would have to understand the personnel system database model to formulate this query. This means that he would have to know firstly that it requires the use of the column Emp_Name from the EMPLOYEE table and the column Proj_Name from the PROJECT table. Secondly, since these two tables are not directly connected but instead are connected through the BILLINGS table he would have to know about the relationships between these tables. Therefore, in order to formulate this query he must therefore request that the columns of the three tables be displayed. Let us assume that this has been done and that the display shows the columns of the three tables with their appropriate joins. The user would then select the column Emp_Name of EMPLOYEE table and Proj_Name of PROJECT as his query. MS-Query would then generate the following SQL statement:

Select 'EMPLOYEE'.'Emp_Name', 'PROJECT'.'Proj_Name'

From 'EMPLOYEE' 'EMPLOYEE', 'PROJECT' 'PROJECT', 'BILLINGS' 'BILLINGS'

Where 'EMPLOYEE'.'Emp_No'='BILLINGS'.'Emp_No', 'PROJECT'.'Proj_No'='BILLINGS'.'Proj_No'

Next it would make the SQLExecDirect call to Database Connectivity Driver 62 to send this SQL statement to DBMS 63 to be executed to extract the desired information from the Application Database.)

MS-Query next issues a series of ODBC calls to get the results of the query to be displayed. It first makes the SQLNumResultCol call to find out how many columns of the query results will be retrieved. For the query example the number of columns to be retrieved is two, one being the Emp_Name and the other being the Proj_Name of the PERSONNEL table. It next issues the SQLDescribeCol and the SQLColAttributes calls to obtain information about these two columns. To get this information Query Facility Connectivity Driver 64 first maps these two columns of the PERSONNEL table to the actual database columns, namely the Emp_Name of EMPLOYEE table and the Proj_Name of PROJECT table. Next, it issues the same calls to Database Connectivity Driver 62 to get the required information from the Application Database. After this MS-Query issues the SQLBindCol call to ask Query Facility Connectivity Driver 64 to allocate buffers. Next it issues the SQLFetch call. The SQLFetch call causes Query Facility Connectivity Driver 64 to make the same call to Database Connectivity Driver 62 to fetch the query results from the Application Database and place them in the associated buffers. (If Microsoft Excel had been used without Query Facility 65 and Query Facility Connectivity Driver 64, MS-Query would issue the same SQLNumResultCol call to find out how many columns would be retrieved. As the columns selected are Emp_Name of EMPLOYEE and Proj_Name of PROJECT, the number of columns to be retrieved would be two. MS-Query would next issue the same two SQLDescribeCol and SQLColAttributes calls. This would cause Database Connectivity to directly obtain the required information about these columns from the Application Database. After this MS-Query would issue the SQLBindCol and SQLFetch calls which would cause Database Connectivity Driver 62 to associate buffers and to directly fetch the query results from the Application Database and place them in the associated buffers.)

At this point the user has his query results displayed by MS-Query. If he does not wish to make any more queries, he can quit from MS-Query. When he quits this causes MS-Query to issue the following calls:

SQLDisconnect

SQLFreeConnect

SQLFreeEnv

The first call causes Query Facility Connectivity Driver 64 to disconnect from Keyword Library 13 and to also make the same call to Database Connectivity Driver 62 to disconnect from the Application Database. The second call causes Query Facility Connectivity Driver 64 to free the connection handle to Keyword Library 13 and to make the same call to Database Connectivity Driver 62 to free the connection handle to the Application Database. The third call causes Query Facility Connectivity Driver 64 to free its environment handle and to make the same call to Database Connectivity Driver 62 to free its environment handle. (If Microsoft Excel had been used without Query Facility 65 and Query Facility Connectivity Driver 64, these three calls would cause Database Connectivity Driver 62 to disconnect from the Application Database, to free the connection handle to the Application Database and to free its environment handle.)

Note that in the above explanation for the sake of clarity a number of ODBC calls made repeatedly by MS-Query have not been mentioned, e.g. SQLAllocStmt and SQLFreeStmt. The SQLAllocStmt call is used to cause Query Facility Connectivity Driver 64 to, firstly, allocate SQL statement data structures to contain whatever information about Keyword Library 13 or the driver itself that will be obtained subsequently through other ODBC calls and, secondly, to make the same call to Database Connectivity Driver 62 to allocate SQL statement handle to contain whatever information about the Application Database or the driver itself that will be obtained subsequently through other ODBC calls. The SQLFreeStmt call is used to get Query Facility Connectivity Driver 64 to free the allocated SQL statement data structures and to make the same call to Database Connectivity Driver 62 to free the allocated SQL statement handle. (If Microsoft Excel had been used without Query Facility 65 and Query Facility Connectivity Driver 64, the first of these two calls would be used to cause Database Connectivity Driver 62 to allocate an SQL statement handle and the second would be used to cause Database Connectivity Driver 62 to free the allocated SQL statement handle.)

While this exemplary description of the Connectivity to Exisiting Database Applications embodiment has been described with reference to various embodiments described previously which utilize Keyword Library 13 as the data source of Query Facility Connectivity Driver 64 to generate a table for the user to select items for the query, it is to be appreciated that this embodiment is equally applicable for use with other embodiments described above in which E-R Model of Classes File 32 (e.g. FIG. 11) is used as the data source, where each class in File 32 is treated as a separate table to conveniently allow the user to select items for the query.

A key benefit of this embodiment of the present invention is that it allows the many millions of existing applications used by many organizations such as Microsoft Excel spreadsheet, Microsoft Access DBMS, Lotus 123 spreadsheet, Powersoft PowerViewer or InfoMaker, Gupta Quest, Q+E Database Editor, etc. that are ODBC compliant or compliant to other data access interface standard to be reused for making powerful ad-hoc queries easily through seamless integration of Query Facility 65 thus saving on the cost of purchasing new tools to have more powerful ad-hoc queries as well as the cost of training users to use the new tools.

TABLE 3

Comparison of Implementation of ODBC Calls Between a Database Connectivity Driver and the Query Facility Connectivity Driver

| ODBC API | Database Connectivity Driver | Query Facility Connectivity Driver |
|---|---|---|
| RETCODESQL__APISQLTables( HSTMT hstmt, UCHAR FAR *szTableQualifier, SWORD cbTableQualifier, UCHAR FAR *szTableOwner, SWORD cbTableOwner, UCHAR FAR *szTable Name, SWORD obTableName, UCHAR FAR *szTableType, SWORD cbTableType) | The driver prepares to return information regarding the tables in the Application Database. | The driver prepares to return information regarding the table which is used to hold all the keywords in the Keyword Library 13 of the Query Facility 65. |
| RETCODESQL__APISQLStatistics( HSTMT hstmt, UCHAR FAR *szTableQualifier, SWORD cbTableQualifier, UCHAR FAR *szTableOwner, SWORD cbTableOwner, UCHAR FAR *szTableName, SWORD cbTableName, UWORD fUnique, UWORD fAccuracy) | Sets up the driver to return statistics about the tables in the Application Database. | Sets up the driver to return statistics about the table which is used to hold all the keywords in the Keyword Library 13 of the Query Facility 65. |
| RETCODESQL__APISQLTablePrivileges( HSTMT hstmt, UCHAR FAR *szTable Qualifier, SWORD cbTableQualifier, UCHAR FAR *szTableOwner, SWORD cbTableOwner, UCHAR FAR *szTableName, SWORD cbTableName) | Sets up the driver to return the privileges of the Application Database's tables. Privileges may be "SELECT", "UPDATE", "DELETE", or "REFERENCES". | Sets up the driver to return the privileges of the Keyword Library's table which is used to hold the keywords. The only privilege allowed for the table is "SELECT" since Keyword Library 13 is used for read only. |
| RETCODESQL__APISQLColumnPrivileges( HSTMT hstmt, UCHAR FAR *szTableQualifier, SWORD cbTableQualifier, UCHAR FAR *szTableOwner, SWORD bTableOwner, UCHAR FAR *szTableName, SWORD cbTableName, UCHAR FAR *szColumnName, SWORD cbColumnName) | Sets up driver to return the privileges of the columns of a particular table in the Application Database. Privileges may be "SELECT", "UPDATE", "DELETE", or "REFERENCES". | Sets up the driver to return the privileges of the columns of the Keyword Library's table used to hold the keywords. The only privilege allowed for these columns "SELECT" since the Keyword Library 13 is used for read only. |
| RETCODESQL__APISQLSpecialColumns( HSTMT hstmt, UWORD fColType, UCHAR FAR *szTableQualifier, SWORD cbTableQualifier, UCHAR FAR *szTableOwner, SWORD cbTableOwner, UCHAR FAR *szTableName, SWORD cbTableName, | Sets up the driver to return the required columns. | Return SQL__SUCCESS, but on subsequent SQLFetch/SQLGetData, return SQL__NO__DATA__FOUND. There is no need to identify columns that uniquely identifies a row because the Query Facility 65 performs all table linking using its Inference Engine 17 without any intervention from the Application 60 or the user of the Application 60. There is no need to return information regarding |

TABLE 3-continued

Comparison of Implementation of ODBC Calls Between a Database Connectivity Driver and the Query Facility Connectivity Driver

| ODBC API | Database Connectivity Driver | Query Facility Connectivity Driver |
| --- | --- | --- |
| UWORD fScope,<br>UWORD fNullable) | | columns that are automatically updated since the Query Facility 65 does not support updates to the Application Database or to the Keyword Library. |
| RETCODESQL__APISQLPrimaryKeys(<br>HSTMT hstmt,<br>UCHAR Far *szTableQualifier,<br>SWORD    cbTableQualifier,<br>UCHAR FAR *szTableOwner,<br>SWORD    cbTableOwner,<br>UCHAR FAR *szTableName,<br>SWORD    cbTableName) | Sets up the driver to return the required primary keys of the Application Database. | Return SQL__SUCCESS, and the return SQL_NO_DATA_FOUND at SQLFetch/SQLGetData. |
| RETCODE SQL__APISQLForeignKeys(<br>HSTMT hstmt,<br>UCHAR FAR *szPkTableQualifier,<br>SWORD    cbPkTableQualifier,<br>UCHAR FAR *szPkTableOwner,<br>SWORD    cbPkTableOwner,<br>UCHAR FAR *szPkTableName,<br>SWORD    cbPkTableName,<br>UCHAR FAR *szFkTableQualifier,<br>SWORD    cbFkTableQualifier,<br>UCHAR FAR * szFkTableOwner,<br>SWORD    cbFkTableOwner,<br>UCHAR FAR *szFkTableName,<br>SWORD    cbFkTableName) | Sets up the driver to return the required foreign keys of the Application Databade. | Return SQL__SUCCESS, and the return SQL_NO_DATA_FOUND at SQLFetch/SQLGetData. |
| RETCODESQL__APISQLAllocEnv(<br>HENV FAR *phenv) | Allocate storage for information about the ODBC environment. | Allocate storage for information about the ODBC environment as well as special information required to run the Query Facility 65. |
| RETCODESQL__APISQLAllocConnect(<br>HENV henv,<br>HDBC FAR *phdbc) | Allocate storage for information about a connection to the Application Database as a data source. | Allocate storage for information about a connection to the Keyword Library 13 of Query Facility 65 as a data soucre. Also make same call to Database Connectivity Driver to allocate storage for information about a connection to the Application Database as a data soucre. |
| RETCODESQL__APISQLConnect(<br>HDBC hdbcParam,<br>UCHAR FAR *szDSN,<br>SWORD    cbDSN,<br>UCHAR FAR *szUID,<br>SWORD    cbUID,<br>UCHAR FAR *szAuthStr,<br>SWORD    cbAuthStr) | Connects to the Application Database. | Connects to the Keyword Library 13. Prompts the user for Keyword Library 13 password. Makes SQLAllocEnv and SQLAllocConnect calls to the Database Connectivity Driver. Finally, connects to the Application Database by making the same SQLConnect call to the Database Connectivity Driver. |
| RETCODESQL__APIDriverConnect(<br>HDBC hdbc,<br>HWND hwnd,<br>UCHAR FAR *szConnStrIn,<br>SWORD    cbConnStrIn<br>UCHAR FAR *szConnStrOut,<br>SWORD    cbConnStrOutMax,<br>SWORD FAR *szpcbConnStrOut,<br>UWORD    fDriverCompletion) | Connects to the Application Database, or alternatively, prompt the user for more information. | Connects to the Keyword Library 13 of Query Facility 65. Prompts the user for Keyword Library 13 password. Finally, connects to the Application Database by making the same call to the Database Connectivity Driver. |
| RETCODESQL__APISQLBrowseConnect(<br>HDBC hdbc,<br>UCHAR FAR *szConnStrIn,<br>SWORD    cbConnStrIn,<br>UCHAR FAR *szConnStrOut,<br>SWORD    cbConnStrOutMax,<br>SWORD FAR *pcbConnStrOut) | Iteratively prompts for Application Database connection string. | Iteratively prompts for Keyword Library 13 connection string. |
| RETCODESQL__APISQLDisconnect(<br>HDBC hdbcParam) | Disconnects from the Application Database. | Disconnects from the Keyword Library 13 and make same call to Database Connectivity Driver to disconnect from database. |
| RETCODESQL__APISQLFreeConnect(<br>HDBC hdbcParam) | Free connection handle of Application Database. | Free Keyword Library 13 connection handle, and makes same call to Database Connectivity Driver to free database connection handle. |
| RETCODESQL__APISQLFreeEnv(<br>HENV henv) | Frees the driver's environment handle. | Frees the driver's environment handle, and then makes same call to Database Connectivity Driver to free its environment handle. |
| RETCODESQL__APISQLExecute(<br>HSTMT hstmt) | Executes the SQL statement associated with hstmt. | Executes the SQL statement associated with hstmt |
| RETCODESQL__APISQLExecDirect(<br>HSTMT hstmt,<br>UCHAR FAR *szSqlStr,<br>SDWORD cbSqlStr) | Executes the SQL statement passed in the parameter szSqlStr. | Parses the SQL statement to extract the items or columns selected by the user and then calls the Inference Engine 17 of the Query Facility 65 to determine the access path through the Application Database using the selected items.<br>After the Program Generator 18 has generated an |

TABLE 3-continued

Comparison of Implementation of ODBC Calls Between a Database Connectivity Driver and the Query Facility Connectivity Driver

| ODBC API | Database Connectivity Driver | Query Facility Connectivity Driver |
| --- | --- | --- |
| RETCODESQL_APISQLNativeSql(<br>HDBC hdbcParam,<br>UCHAR FAR *szSqlStrIn,<br>SDWORD cbSqlStrIn,<br>UCHAR FAR *szSqlStr,<br>SDWORD cbSqlStrMax,<br>SDWORD FAR *pcbSqlStr) | Translates the SQL statement to the SQL dialect of the DBMS 63 used by the Application Database. | SQL source program for the access path, the driver then makes a SQLExecDirect call to the Database Connectivity Driver to execute the SQL source program and to return the query results to the user. Parses the SQL statement it receives to extract the items or columns selected by the user and then calls the Inference Engine 17 of the Query Facility 65 to determine the access path through the Application Database using the selected items. After the Program Generator 18 has generated the SQL source program for the access path, the driver translates this SQL source program to the SQL dialect of the DBMS 63 used by the Application Database. |
| RETCODESQL_APISQLParamData(<br>HSTMT hstmt,<br>PTR FAR *prgbValue) | Functions to support parameters. | Pass call directly to Database Connectivity Driver. |
| RETCODESQL_APISQLPutData(<br>HSTMT hstmt,<br>PTR rgbValue,<br>SDWORD cbValue) | Functions to support parameters. | Pass call directly to database Connectivity driver. |
| RETCODESQL_APISQLSetParam(<br>HSTMT hstmt,<br>UWORD jpar,<br>SWORD fCType,<br>SWORD fSqlType,<br>UDWORD cbColDef,<br>SWORD ibScale,<br>PTR rgbValue,<br>SDWORD FAR *pcbValue) | Functions to support parameters. | Pass call directly to Database Connectivity Driver. |
| RETCODESQL_APISQLDescribeParam(<br>HSTMT hstmt,<br>UWORD ipar,<br>SWORD FAR *pfSqlType,<br>UDWORD FAR *pcbColDef,<br>SWORD FAR *pibScale,<br>SWORD FAR *pfNullable) | Functions to support parameters. | Pass call directly to Database Connectivity Driver. |
| RETCODESQL_APISQLParamOptions(<br>HSTMT hstmt,<br>UDWORD crow,<br>UDWORD FAR *pirow) | Functions to support parameters. | Passcall directly to Database Connectivity Driver. |
| RETCODESQL_APISQLNumParams(<br>HSTMT hstmt,<br>SWORD FAR *pcpar) | Functions to support parameters. | Pass call directly to Database Connectivity Driver. |
| RETCODESQL_APISQLGetInfo(<br>HDBC hdbcParam,<br>UWORD finfoType,<br>PTR rgbInfoValue,<br>SWORD cbInfoValueMax,<br>SWORD FAR *pcbInfoValue) | Return required information, either about itself or about the Application Database. | Return required information, either about itself, about the Database Connectivity Driver, or about the Application Database. |
| RECTCODE SQL_APISQLGetTypeInfo(<br>HSTMT hstmt,<br>SWORD fSqlType) | Retrieve information regarding datatype supported by Application Database and driver | Pass call to Database Connectivity Driver. |
| RETCODESQL_APISQLGetFunctions(<br>HDBC hdbcParam,<br>UWORD fFunction,<br>UWORD FAR *pfExists) | Retrieve information regarding functions supported in the drievr | Pass call to Database Connectivity Driver. But return result is modified to reflect functions that may not apply to the Query Facility e.g. Query Facility does not support create or update functions. |
| RETCODESQL_APISQLSetConnectOption(<br>HDBC hdbcParam,<br>UWORD fOption,<br>UDWORD vParam) | Set connection options. | Pass call to Database Connectivity Driver. |
| RETCODESQL_APISQLSetStmtOption(<br>HSTMT hstmt,<br>UWORD fOption,<br>UDWORD vParam) | Set statement options. | Pass call to Database Connectivity Driver. |
| RETCODESQL_APISQLGetConnectOption(<br>HDBC hdbcParam,<br>UWORD fOption,<br>PTR pvParam) | Get connection options. | Pass call to Database Connectivity Driver. |
| RETCODESQL_APISQLGetStmtOption(<br>HSTMT hstmt,<br>UWORD fOption,<br>PTR pvParam) | Get statement options. | Pass call to Database Connectivity Driver. |
| RETCODESQL_APISQLAllocStmt( | Allocate SQL statement handle. | Allocate SQL statement data structures and call |

TABLE 3-continued

Comparison of Implementation of ODBC Calls Between a Database Connectivity Driver and the Query Facility Connectivity Driver

| ODBC API | Database Connectivity Driver | Query Facility Connectivity Driver |
|---|---|---|
| HDBC hdbcParam,<br>HSTMT FAR *phstmt) | | SQLAllocStmt in the Database Connectivity Driver. |
| RETCODESQL_APISQLFreeStmt(<br>HSTMT hstmt,<br>UWORD fOption) | Free SQL statement handle | Free SQL statement data structures and make same call to Database Connectivity Driver to free its SQL statement handle |
| RETCODESQL_APISQLPrepare(<br>HSTMT hstmt,<br>UCHAR FAR *szSqlStr,<br>SDWORD cbSqlStr) | Prepare an SQL statement for execution | Parses the SQL statement to extract the items or columns selected by the user and then calls the Inference Engine 17 to determine the access path through the Application Database using the selected items.<br>After the Program Generator 18 has generated an SQL source program for the access path driver then makes a SQLPrepare call to the Database Connectivity Driver to prepare the SQL source program. |
| RETCODESQL_APISQLCancel(<br>HSTMT hstmt) | Cancels execution of a SQL statement or command. | Pass call to the Database Connectivity Driver. |
| RETCODESQL_APISQLSetScrollOptions(<br>HSTMT hstmt,<br>UWORD fConcurrency,<br>SDWORD crowKeyset,<br>UWORD crowRowset) | Obsolete | Obsolete |
| RETCODESQL_APISQLSetCursorName(<br>HSTMT hstmt,<br>UCHAR FAR *szCursor,<br>SWORD cbCursor) | Associate a cursor name with a hstmt. | Associate a cursor name with a hstmt. If the hstmt is also associated with the Database Connectivity Driver(eg, in the case of SQLExecute), then call the equivalent function in the Database Connectivity Driver. |
| RETCODESQL_APISQLGetCursorName(<br>HSTMT hstmt,<br>UCHAR FAR *szCursor,<br>SWORD cbCursorMax,<br>SWORD FAR *pcbCursor) | Return the cursor name for a statement handle | Return the cursor name for a statement handle If the hstmt is also associated with the Database Connectivity Driver(eg, in the case of SQLExecute), then call the equivalent function in the Database Connectivity Driver. |
| RETCODESQL_APISQLNumResultCols(<br>HSTMT hstmt,<br>SWORD DAR *pccol) | Returns the number of columns in the result set. | Returns the number of columns in the result set. If the hstmt is associated with the Database Connectivity Driver, then make the same call to the Database Connectivity Driver. |
| RETCODESQL_APISQLDescribeCol(<br>HSTMT hstmt,<br>UWORD icol,<br>UCHAR FAR *szColName,<br>SWORD cbColNameMax,<br>SWORD FAR *pcbColName,<br>SWORD FAR *(pfSqlType,<br>UDWORD FAR *pcbColDef,<br>SWORD FAR *pibScale,<br>SWORD FAR *pfNullable) | Return information about the column of a table in the Application Database the user wants information about. | Return information about the selected keyword from the Keyword Library 13 the user wants information about. This keyword is first mapped to an actual database column of the Application Database by the driver which then issues the same call to the database Connectivity Driver 62 to get information about this database column. After it gets this information, the driver returns this information. |
| RETCODESQL_APISQLAttributes(<br>HSTMT hstmt,<br>UWORD icol,<br>UWORD fDescType,<br>PTR rgbDesc,<br>SWORD cbDescMax,<br>SWORD FAR *pcbDesc,<br>SDWORD FAR *pfDesc) | Returns descriptor information about the database column of a table in the Application Database the user wants information about. | Returns descriptor information about the selected keyword from the Keyword Library 13 the user wants information about. This keyword is first mapped to an actual database column of the Application Database by the driver which then issues the same call to the Database Connectivity Driver 62 to get the descriptor information about this database column.<br>After it gets this descriptor information, the driver returns this information. |
| RETCODESQL_APISQLBindCol(<br>HSTMT hstmt,<br>UWORD icol,<br>SWORD fCType,<br>PTR rgbValue,<br>SDWORD cbValueMax,<br>SDWORD FAR*pcbValue) | Associate a result buffer with a column in the result set. | Associate a result with a column in the result set.<br>If the hstmt is assocaited with the database driver, then make the same function call to the Database Connectivity Driver. |
| RETCODESQL_APISQLFetch(<br>HSTMT hstmt | Returns data for bound columns in the current row, and advances the cursor. | Returns data for bound columns in the current row, and advance the cursor.<br>If the hstmt is associated with the Database Connectivity Driver, then call the equivalent function in the Database Connectivity Driver. |
| RETCODESQL_APISQLGetData(<br>HSTMT hstmt,<br>UWORD icol,<br>SWORD fCType,<br>PTR rgbValue,<br>SDWORD cbValueMax,<br>SDWORD FAR *pcbValue) | Returns result data for a single column in the current row. | Returns result data for a single column in the current row.<br>If the hstmt is associated with the Database Connectivity Driver, then call the equivalent function in the Database Connectivity Driver. |

TABLE 3-continued

Comparison of Implementation of ODBC Calls Between a Database Connectivity Driver and the Query Facility Connectivity Driver

| ODBC API | Database Connectivity Driver | Query Facility Connectivity Driver |
|---|---|---|
| RETCODESQL_APISQLMoreResults(<br>HSTMT hstmt) | Checks if more information is available for hstmt. | Checks if more information is available for hstmt. If the hstmt is associated with the Database Connectivity Driver, then call the equivalent function in the Database Connectivity Driver1. |
| RETCODESQL_APISQLRowCount(<br>HSTMT hstmt,<br>SDWORD FAR *pcrow) | Returns the number of rows associated with the Application Database attached to "hstmt". | Returns the number ofrows attached to "hstmt" Hstmt may be associated with the Application Database or the Keyword Library 13.<br>If the hstmt is associsted with the Databse Connectivity Driver, then call the equivalent function in the Database Connectivity Driver. |
| RETCODESQL_APISQLSetPos(<br>HSTMT hstmt,<br>UWORD irow,<br>UWORD fOption,<br>UWORD fLock) | Sets position of cursor. | Sets position of cursor.<br>If the hstmt is associated with the Database Connectivity Driver, then call the equivalent function in the Database Connectivity Driver. |
| RETCODESQL_APISQLExtendedFetch(<br>HSTMT hstmt,<br>UWORD fFetchType,<br>SDWORD irow,<br>UDWORD FAR *pcrow,<br>UWORD FAR *rgfRowStatus) | Fetches data. | Not implemented. ODBCDLL provides a default implementation. |
| RETCODESQL_APISQLError(<br>HENV henv,<br>HDBC hdbcParam,<br>HSTMT hstmt,<br>UCHAR FAR *szSqlState,<br>SDWORD FAR *pfNativeError,<br>UCHAR FAR *szErrorMsg,<br>SWORD cbErrorMsgMax,<br>SWORD FAR *pcbErrorMsg) | Returns the most recent error. | Retrns the most recent error.<br>If the henv, hdbcParam, or hstmt is associated with the Database Connectivity Driver, then call the equivalent function in the Database Connectivity Driver. |
| RETCODESQL_APISQLTransact(<br>HENV henv,<br>HDBC hdbcParam,<br>UWORD fType) | Performs commit or rollback | Does nothing since commit/rollback does not apply to Query Facility 65. |

What is claimed is:

1. An end user query facility for accessing a database having a plurality of database files formed using a database model, comprising:

a knowledge base which stores a set of linkages of the database model, each said linkage representing a relation between two of said database files in which a first file has a key that references an equivalent key of a second file;

a semantics extractor for reading said database model and extracting the semantics of said database model, and which stores in said knowledge base said set of linkages;

an application, which supports end-user query, to obtain from a user a designation of the information to be extracted from said database;

a query facility connectivity driver for connecting said application to said query facility, and for connecting said query facility to said database through a database connectivity driver;

an inference engine which, based upon said designation of information to be extracted from said database, identifies one or more of said database files which contain the desired information and searches said knowledge base to determine the linkage(s) connecting said one or more identified files; and a program generator which accesses the linkages obtained by said inference engine and generates a program to extract said desired information from said database.

2. An end-user query facility as in claim 1 wherein said inference engine comprises:

means for inferring new acquired knowledge threads and storing said new acquired knowledge threads in said knowledge base;

means for determining an access path to said database using either said basic knowledge threads or said acquired knowledge threads as required to meet the user query.

3. An end-user query facility as in claim 2 wherein said acquired knowledge thread is derived through a combination in parallel of two or more of said basic knowledge threads such that one of the said basic knowledge threads has one or more of its consecutive files in common with the corresponding number of consecutive files starting from the thread head of another said basic knowledge threads.

4. An end-user query facility as in claim 3 wherein said thread head is a first file on a said basic knowledge thread.

5. An end-user query facility as in claim 1 wherein said semantics extractor further comprises means for reading source code of application programs that access said database, extracting the semantics of said application programs and storing in said knowledge base said set of linkages.

6. An end user query facility for accessing a database having a plurality of database files formed using a database model, comprising:

a knowledge base which stores a set of classes and a set of linkages of the database model, each said class represents a hierarchical grouping of a subset of said database files, each said linkage representing a relation between two of said database files in which a first file has a key that references an equivalent key of a second file;

a class generator for reading said database model and generating said set of classes and said set of linkages of the database model and which stores in said knowledge base said set of classes and said set of linkages;

an application, which supports end-user query, to obtain from an user choices based on said classes as a designation of the information to be extracted from said database;

a query facility connectivity driver for connecting said application to said query facility, and for connecting said query facility to said database through a database connectivity driver;

an inference engine which, based upon said designation of information to be extracted from said database, identifies one or more of said database files which contain the desired information and searches said knowledge base to determine the linkage(s) connecting said one or more identified files; and a program generator which accesses the linkages obtained by said inference engine and generates a program to extract said desired information from said database.

7. An end user query facility for accessing a database having a plurality of database files formed using a database model, comprising:

a knowledge base which stores a set of classes and a set of linkages of the database model; each said class represents a hierarchical grouping of a subset of said database files, each said linkage representing a relation between two of said database files in which a first file has a key that references an equivalent key of a second file;

a class generator for reading said database model and generating said set of classes and said set of linkages of the database model and which stores in said knowledge base said set of classes and said set of linkages;

an application, which supports end-user query, to obtain from a user a designation of the information to be extracted from said database;

a query facility connectivity driver for connecting said application to said query facility, and for connecting said query facility to said database through a database connectivity driver;

an inference engine which, based upon said designation of information to be extracted from said database, identifies one or more of said database files which contain the desired information and searches said knowledge base to determine the linkage(s) connecting said one or more identified files;

a knowledge thread analyzer receiving as its input said linkage(s) determined by said inference engine, and which breaks down said linkage(s) into simple linkage(s); and a program generator which accesses said simple linkages obtained by said knowledge analyzer and generates programs, one for each said simple linkage, to extract said desired information from said database as a plurality of simple query results, one for each generated program.

8. An end-user query facility as in claim 7 wherein a said simple query result is one that does not contain repeated numeric values in any of the column(s) that corresponds to a non-key numeric item of said database.

9. An end-user query facility as in claim 7 wherein a said simple query result is one that does not contain two or more columns belonging to items whose database files are multi-valued dependencies of another database file in said database.

10. An end user query facility for accessing a database having a plurality of database files formed using a database model, comprising:

a knowledge base which stores a set of linkages of the database model, each said linkage representing a relation between two of said database files in which a first file has a key that references an equivalent key of a second file;

a semantics extractor for reading said database model and extracting the semantics of said database model, and which stores in said knowledge base said set of linkages;

a keyword library which stores a set of keywords of said database model;

an application, which supports end-user query, to obtain from a user a designation of the information to be extracted from said database using said keyword library;

a first connectivity driver for connecting said application to said keyword library;

an inference engine which, based upon said designation of information to be extracted from said database, identifies one or more of said database files which contain the desired information and searches said knowledge base to determine the linkage(s) connecting said one or more identified files;

a first e-mail agent for said first connectivity driver to interface with an e-mail system, said first e-mail agent being used to post said designation of information to be extracted from said database to the mailbox of said inference engine;

a second e-mail agent for the said inference engine to interface with said e-mail system, the said second e-mail agent being used to access said mailbox of said inference engine to obtain said designation of information to be extracted from said database;

a program generator which accesses the linkages obtained by said inference engine and generates a program to extract said desired information from said database.

11. An end-user query facility as in claims 1, 6 or 7 wherein both said application and said query facility connectivity driver have the same data access interface that conforms to a data access interface standard.

12. An end user query facility as in claims 1, 6 or 7 wherein both said query facility connectivity driver and said database connectivity driver have the same data access interface that conforms to a data access interface standard.

13. An end user query facility as in claims 11 or 12 wherein said data access interface standard is Microsoft Corporation's Open Database Connectivity (ODBC) standard.

14. An end user query facility as in claim 11 or 12 wherein said data access interface standard is Apple Computer's Data Access Language (DAL) standard.

15. An end user query facility as in claims 1 or 10 wherein said semantics extractor comprises means for deriving basic knowledge threads comprising a set of linkages of said database model and storing said knowledge threads in said knowledge base.

16. An end-user query facility as in claim 15 wherein each said basic knowledge thread comprises a set of two or more of said database files serially linked together such that one file is serially linked to the next file through an item that has the same domain as the item in the next file and that this same item is a unique or repeating key of the next file.

17. An end-user query facility as in claim 15 wherein each said basic knowledge thread comprises a set of two or more of said database files serially linked together such that one file has a repeating or foreign key that references the unique or primary key of the next file.

18. An end user query facility for accessing a database having a plurality of database files formed using a database model, comprising:
- a knowledge base which stores a set of classes and a set of linkages of the database model, each said class represents a hierarchical grouping of a subset of said database files, each said linkage representing a relation between two of said database files in which a first file has a key that references an equivalent key of a second file;
- a class generator for reading said database model and generating said set of classes and said set of linkages of the database model and which stores in said knowledge base said set of classes and said set of linkages;
- a keyword library which stores a set of keywords of said set of classes including the names of said classes and their attributes;
- an application, which supports end-user query, to obtain from a user a designation of the information to be extracted from said database using said keyword library;
- a first connectivity driver for connecting said application to said keyword library;
- an inference engine which, based upon said designation of information to be extracted form said database, identifies one or more of said database files which contain the desired information and searches said knowledge base to determine the linkage(s) connecting said one or more identified files;
- a first e-mail agent for said first connectivity driver to interface with an e-mail system, said first e-mail agent being used to post said designation of information to be extracted from said database to the mailbox of said inference engine;
- a second e-mail agent for the said inference engine to interface with said e-mail system, the said second e-mail agent being used to access said mailbox of said inference engine to obtain said designation of information to be extracted from said database; and
- a program generator which accesses the linkages obtained by said inference engine and generates a program to extract said desired information from said database.

19. An end user query facility for accessing a database having a plurality of database files formed using a database model, comprising:
- a knowledge base which stores a set of classes and a set of linkages of the database model, each said class represents a hierarchical grouping of a subset of said database files, each said linkage representing a relation between two of said database files in which a first file has a key that references an equivalent key of a second file;
- a class generator for reading said database model and generating said set of classes and said set of linkages of the database model and which stores in said knowledge base said set of classes and said set of linkages;
- a keyword library which stores a set of keywords of said set of classes including the names of said classes and their attributes;
- an application, which supports end-user query, to obtain from a user a designation of the information to be extracted from said database using said keyword library;
- a first connectivity driver for connecting said application to said keyword library;
- an inference engine which, based upon said designation of information to be extracted form said database, identifies one or more of said database files which contain the desired information and searches said knowledge base to determine the linkage(s) connecting said one or more identified files;
- a first e-mail agent for said first connectivity driver to interface with an e-mail system, said first e-mail agent being used to post said designation of information to be extracted from said database to the mailbox of said inference engine;
- a second e-mail agent for the said inference engine to interface with said e-mail system, the said second e-mail agent being used to access said mailbox of said inference engine to obtain said designation of information to be extracted from said database;
- a knowledge thread analyzer receiving as its input said linkage(s) determined by said inference engine, and which breaks down said linkage(s) into simple linkage(s); and
- a program generator which accesses said simple linkages obtained by said knowledge analyzer and generates programs, one for each said simple linkage, to extract said desired information from said database as a plurality of simple query results, one for each generated program.

20. An end user query facility as in claims 1, 6, 7, 10, 18 or 19 wherein said application comprises:
- means for obtaining from a user a user supplied key word indicative of the data desired to be extracted from said database;
- means for obtaining from a user a user supplied key word indicative of the data desired to be extracted from said database;
- means for determining all keywords in said database model having a predefined relationship with said user supplied keyword; and
- means for causing a user to select one or more of said keywords having a predefined relationship, said one or more keywords thus selected serving as said designation of the information to be extracted from said database.

21. An end user query facility as in claims 6, 7, 18 or 19 wherein each said class comprises a data model of a subset of database files of said database model, the said data model comprising a tree.

22. An end user query facility as in claim 21 wherein said tree of said class has a root comprising a database file of kernel entity type and a plurality of branches each comprising a linkage of one or more database files from said subset of database files.

23. An end-user query facility as in claim 22 wherein said class generator comprises:
- a semantics extractor to derive a set of binary relationships and to derive the entity type of each database file of said database model;
- a means to derive said set of classes using said set of binary relationships and said entity type of each database file of said database model.

24. An end-user query facility as in claim 23 wherein said entity type is selected from a set of entity types which comprise a kernel entity type, a subtype entity type, a characteristic entity type, an associative entity type or a pure lookup entity type.

25. An end-user query facility as in claim 23 wherein said binary relationship comprises a linkage between two files in said database model in which one file has a repeating or foreign key that references the unique or primary key of the other file.

26. An end user query facility as in claim 25 wherein said set of binary relationships comprises "has_children", "has_wards", "inverse_of_pure_lookup" or "has_subtype" binary relationships.

27. An end user query facility as in claim 26 wherein said set of binary relationships further comprises "inverse_of_has_children", "inverse_of_has_wards", "pure_lookup" or "inverse_of_has_subtype" binary relationships.

28. An end user query facility as in claim 27 wherein said "inverse_of_has_children" binary relationship is one in which the target file is not a pure_lookup entity type and has a one-to-many relationship with the source file, and the source file does not have its own independent unique or primary key.

29. An end user query facility as in claim 27 herein said "inverse_of_has_wards" binary relationship is one which the target file is not a pure lookup entity type and has a one-to-many relationship with the source file, and the source file has its own independent unique or primary key.

30. An end user query facility as in claim 27 wherein said "inverse_of_has_subtype" binary relationship is one in which its target file has a one-to-one relationship with its source file and the source file is a subtype entity of the target file.

31. An end-user query facility as in claim 27 wherein said "pure_lookup" binary relationship is a binary relationship whose target file is a pure lookup entity.

32. An end user query facility as in claim 26 wherein said "has_children" binary relationship is one in which the source file is not a pure lookup entity type and has a one-to-many relationship with the target file, and the target file does not have its own independent unique or primary key.

33. An end user query facility as in claim 26 wherein said "has_wards" binary relationship is one in which its source file is not a pure lookup entity type and has a one-to-many relationship with its target file, and its target file has its own independent unique key or primary key.

34. An end user query facility as in claim 26 wherein said "has_subtype" binary relationship is one which its source file has a one-to-one relationship with its target file and the target file is a subtype entity of the source file.

35. An end user query facility as in claim 26 wherein said "inverse_of_pure_lookup" binary relationship is a binary relationship whose source file is a pure_lookup entity.

36. An end-user query facility as in claim 23 wherein said semantics extractor further comprises means for deriving basic knowledge threads comprising a set of linkages of said database model and storing said basic knowledge threads in said knowledge base.

37. An end-user query facility extractor as in claim 36 wherein each said basic knowledge thread comprises a set of two or more of said database files serially linked together such that one file is linked to the next file through an item that has the same domain as the item in the next file and that this same item is a unique or repeating key of the next file.

38. An end-user query facility extractor as in claims 37 wherein each said basic knowledge thread comprises a set of two or more of said database files serially linked together such that one file has a repeating or foreign key that references the unique or primary key of the next file.

39. An end-user query facility ads in claim 22 wherein said class further comprise a set of relationship names each of which specifies the nature of the relationship between two adjacent database files in each branch of said tree of said class.

40. An end-user query facility as in claim 39 wherein said class generator comprises:

a semantics extractor to derive a set of binary relationships and to identify the entity type of each database file of said database model;

a means to derive said set of classes and their said set of relationship names using said set of binary relationships and said entity type of each database file of said database model.

41. An end-user query facility as in claim 40 wherein said class generator further comprises a means for a user to modify said relationship names in the said set of classes.

42. An end-user query facility as in claim 6, 7, 18 or 19 wherein said application comprises an interface that displays all or selected said classes and that allows a user to formulate a query by picking the desired class attributes from said class as a designation of the information to be extracted from said database.

43. An end-user query facility as in claims 1, 6, 7, 10, 18 or 19 which further comprises a model purifier for a user to alter said database model by defining new keys for database files or by altering existing keys of database files of said database model.

44. An end-user query facility as in claim 43 wherein said keys comprise unique or repeating keys.

45. An end-user query facility as in claim 43 wherein said keys comprise primary or foreign keys.

46. An end-user query facility as in claims 1, 6, 7, 10, 18 or 19 which further comprises a model purifier for a user to alter said database model by defining new item(s), new key(s) or new file(s) using items of database files of said database model.

47. An end-user query facility as in claims 1, 6, 7, 10, 18 or 19 which further comprises a program analyzer for analyzing and deriving new item(s), new key(s) or new file(s) from source code of applications that access said database model, and for altering said database model using said new item(s), new key(s) or new file(s).

48. An end-user query facility as in claims 46 or 47 wherein said program generator comprises means to generate source program that produce data from said new items of said new files and wherein said end-user query facility further comprises a compiler for compiling said source program.

49. An end-user query facility as in claim 43, 46 or 47 wherein said class generator further comprises a means to read said altered database model to regenerate said set of classes and said set of linkages.

50. An end-user query facility as in claims 1, 6, 7, 10, 18 or 19 which further comprises a security model specifier to allow a user to input a security model which specifies restrictions on the information a user can obtain from said database.

51. An end-user query facility as in claim 50 wherein said security model comprises:

item securing which specifies a set of database files and items selected from said database which a user or class of users can access; and value security which specifies a set of conditions to restrict said user or class of users to a certain range(s) of values of said database.

52. An end user query facility as in claims 1, 6, 7, 10, 18 or 19 wherein said program comprises a source code program.

53. An end user query facility as in claim 52 which further comprises a compiler for compiling said source code program.

54. An end user query facility as in claims 1, 6, 7, 10, 18 or 19 wherein said application comprises:

means for obtaining from a user a user supplied keyword indicative of the data desired to be extracted from said database;

means for determining all keywords in said database model having a predefined relationship with said user supplied keyword; and means for causing a user to select one or more of said keywords having a predefined relationship, said one or more keywords thus selected serving as said designation of the information to be extracted from said database.

55. An end-user query facility as in claims 6, 7, 10, 18 or 19 wherein said inference engine comprises:

means for inferring new acquired knowledge threads and storing said new acquired knowledge threads in said knowledge base; and means for determining an access path to said database using either said basic knowledge threads or said acquired knowledge threads as required to meet the user query.

56. An end-user query facility as in claim 55 wherein said acquired knowledge thread is derived through a combination in parallel of two or more of said basic knowledge threads such that one of the said basic knowledge threads has one or more of its consecutive files in common with the corresponding number of consecutive files starting from the thread head of another of said basic knowledge threads.

57. An end-user query facility as in claims 56 wherein said thread head is a first file on a said basic knowledge thread.

58. An end-user query facility as in claims 1, 6, 7, 10, 18 or 19 wherein said knowledge base comprises pre-created knowledge base.

59. An end-user query facility as in claims 1, 6, 7, 10, 18 or 19 wherein said knowledge base comprises a run-time created knowledge base.

60. An end-user query facility as in claims 1, 6, 7, 10, 18 or 19 wherein said knowledge base comprises a persistent knowledge base.

61. An end-user query facility as in claims 1, 6, 7, 10, 18 or 19 wherein said knowledge base comprises a transient knowledge base.

62. An end-user query facility as in claims 1, 6, 7, 10, 18 or 19 wherein said knowledge base is implemented in data dictionary of said database.

63. An end-user query facility as in claims 1, 6, 7, 10, 18 or 19 wherein said knowledge base is implemented in system catalog of said database.

64. An end-user query facility as in claims 10, 18 or 19 which further comprises a second connectivity driver for connecting said program generator to said database through a database connectivity driver.

65. An end-user query facility as in claims 10, 18 or 19 wherein said second e-mail agent further comprises means to post said desired information extracted from said database to the user mailbox.

66. An end-user query facility as in claims 18 or 19 which further comprises a second connectivity driver for connecting said program generator to said database through a database connectivity driver.

67. An end user query facility as in claim 66 wherein both said second connectivity driver and said database connectivity driver have the same data access interface that conforms to a data access interface standard.

68. An end user query facility as in claims 70 or 67 wherein said data access interface standard is Microsoft Corporation's Open Database Connectivity (ODBC) standard.

69. An end user query facility as in claims 70 or 67 wherein said data access interface standard is Apple Computer Incorporated's Data Access Language (DAL) standard.

70. An end-user query facility as in claims 18 or 19 wherein both said application and said first connectivity driver have the same data access interface that conforms to a data access interface standard.

71. An end user query facility for accessing an existing database having a plurality of database files formed using a database model, comprising:

an entity relationship (ER) model generator for reading said databases and deriving a plurality of entity-relationship models, said ER model generator comprising:

an entity type classifier for classifying each said database file into one of a plurality of entity types, said entity types including a "kernel" entity type, a "subtype" entity type, a "characteristic" entity type, an "associative" entity type, and a "pure lookup" entity type;

a binary relationship generator for generating a plurality of binary relationships between said database files, each said binary relationship associated with a linkage representing a relation between a first file having a key that references an equivalent key of a second file, said binary relationships including:

a "has_children" type that represents a first database file that is not classified as a "pure lookup" entity type and has a one-to-many relationship with a second database file, and said second database file does not have a unique key;

a "has_wards" type that represents a first database file that is not of a "pure lookup" entity type and has a one-to-many relationship with a second database file having a unique key;

a "has_subtype" type that represents a first database file having a one-to-one relationship with a second database file and said second database file is classified as a "subtype" entity type; and an "inverse_of_pure_lookup" that represents a first database file is classified as a "pure_lookup" entity type;

a model constructor for constructing said entity-relationship models, each said entity-relationship model representing a tree having a root and a plurality of branches, said root associated with one of said database files classified as a "kernel" entity type, said model constructor utilizing said entity types and said binary relationships to associate one or more branches with each said entity-relationship model;

a knowledge base that stores said ER models;

an application for interfacing with a user to obtain from said user choices based on said entity-relationship model as a designation of the information to be extracted from said database;

an inference engine that, based upon said designation of information to be extracted from said database, identifies one or more of said database files that contain the desired information and searches said knowledge base to determine one or more linkages connecting said identified files;

a program generator that accesses said linkages obtained by said inference engine and generates a program to extract said desired information from said database; and a query facility connectivity driver that comprises:

a first connectivity interface coupled to said application that conforms to Microsoft open database connectivity (ODBC) standard to interface with said inference engine and said knowledge base; and a second connectivity interface coupled to said inference engine and said knowledge base to interface with said existing database using Microsoft open database connectivity (ODBC) driver.

72. An end user query facility as in claim 71 wherein said binary relationships further comprises:

an "inverse_of_has_children" type that represents a second database file that is not classified as a "pure_lookup" entity type and has a one-to-many relationship with a first database file having a unique key;

an "inverse_of_has_wards" type that represents a first database file that is not classified as a "pure lookup" entity type and has a one-to-many relationship with a second database file having a unique key;

a "pure_lookup" type wherein said second database file is classified as a "pure lookup" entity type; and an "inverse_of_has_subtype" type wherein said second database file has a one-to-one relationship with said first database file, and said first database file is classified as a "subtype" entity type.

73. An end-user query facility as in claim 71 wherein said information scout comprises an interface that displays all or selected ones of said entity-relationship models and that allows a user to formulate a query by picking desired attributes from said entity-relationship model as a designation of the information to be extracted from said database.

74. An end-user query facility as in claim 71 which further comprises a model purifier for a user to alter said database model by defining new keys for database files or by altering existing keys of said database files.

75. An end-user query facility as in claim 71 which further comprises a model purifier for a user to alter said database model by defining one or more new items, one or more new keys or one or more new files using items of said database files.

76. An end-user query facility as in claim 71 which further comprises a program analyzer for analyzing and deriving one or more new items, one or more new keys or one or more new files from source code of applications that access said database model, and for altering said database model using one or more of said new items, one or more of said new keys, or one or more of said new files.

77. An end-user query facility as in claims 75 or 76 wherein said program generator comprises means to generate a source program that produce data from said new items of said new files and wherein said end-user query facility further comprises a compiler for compiling said source program.

78. An end-user query facility as in claim 71 which further comprises a security model specifier to allow a user to input a security model which specifies restrictions on the information a user can obtain from said existing database.

79. An end-user query facility as in claim 78 wherein said security model comprises:

item security which specifies a set of database files and items selected from said database which a user or class of users can access; and value security which specifies a set of conditions to restrict said user or class of users to one or more ranges of values of said database.

80. An end user query facility as in claim 71 wherein said program comprises a source code program.

81. An end-user query facility as in claim 80 which further comprises a compiler to compile said source code program.

82. An end-user query facility as in claim 71 which further comprises a means for a user to modify relationship names in the said set of entity-relationship models.

\* \* \* \* \*